US012359687B2

(12) United States Patent
Oliver

(10) Patent No.: US 12,359,687 B2
(45) Date of Patent: Jul. 15, 2025

(54) ADVANCED ROTATING TENSION LATCH

(71) Applicant: Javier E. Oliver, Dallas, TX (US)

(72) Inventor: Javier E. Oliver, Dallas, TX (US)

( * ) Notice: Subject to any disclaimer, the term of this patent is extended or adjusted under 35 U.S.C. 154(b) by 4 days.

(21) Appl. No.: 17/793,824

(22) PCT Filed: Jan. 27, 2021

(86) PCT No.: PCT/US2021/015318
§ 371 (c)(1),
(2) Date: Jul. 19, 2022

(87) PCT Pub. No.: WO2021/154875
PCT Pub. Date: Aug. 5, 2021

(65) Prior Publication Data
US 2023/0059147 A1    Feb. 23, 2023

Related U.S. Application Data

(60) Provisional application No. 63/039,084, filed on Jun. 15, 2020, provisional application No. 63/024,680, filed on May 14, 2020, provisional application No. 62/966,403, filed on Jan. 27, 2020.

(51) Int. Cl.
*F16B 21/02* (2006.01)
(52) U.S. Cl.
CPC ......... *F16B 21/02* (2013.01); *Y10T 403/7005* (2015.01)
(58) Field of Classification Search
CPC ...... F16B 2/02; F16B 2/04; F16B 5/10; F16B 7/20; F16B 21/02; F16B 21/04; Y10T 403/7005; Y10T 403/7007
See application file for complete search history.

(56) References Cited

U.S. PATENT DOCUMENTS

| | | | | |
|---|---|---|---|---|
| 2,799,344 | A | * 7/1957 | Muse | E21B 23/06 166/123 |
| 3,102,594 | A |   9/1963 | Crowe | |
| 3,211,479 | A |   10/1965 | Brown | |
| 4,483,563 | A | * 11/1984 | van der Heyden | B66C 1/56 294/90 |

(Continued)

FOREIGN PATENT DOCUMENTS

| | | | |
|---|---|---|---|
| GB | 1 528 754 | * 10/1978 | ............ F16B 21/04 |
| WO | 2018223031 A1 | 12/2018 | |

*Primary Examiner* — Michael P Ferguson

(57) ABSTRACT

Provided is a latch member. The latch member, in one aspect, includes an upper portion and a lower portion extending from one or more surfaces and defining a central axis, the lower portion including first and second lower portions circumferentially spaced from one another and axially spaced from the upper portion to form first and second channels, the first and second lower portions having respective first and second leading peaks opposite the first and second channels, the first leading peak axially offset from the second leading peak, wherein the first and second channels are configured to each receive one of two pins of a related hook member and cause the latch member to rotate relative to the hook member, wherein the latch and hook member are configured to alternate between latched and unlatched configurations as the latch member reciprocates substantially along the central axis relative to the hook member.

20 Claims, 43 Drawing Sheets

(56) References Cited

U.S. PATENT DOCUMENTS

| | | | | |
|---|---|---|---|---|
| 7,373,986 B2* | 5/2008 | Pollack | ................... | F16B 21/04 |
| | | | | 166/359 |
| 8,057,121 B2* | 11/2011 | Gallagher | ............... | F16B 21/04 |
| | | | | 403/349 |
| 9,677,590 B2* | 6/2017 | Oliver | .................... | F16B 21/04 |
| 2003/0085574 A1 | 5/2003 | Froment et al. | | |
| 2009/0175690 A1 | 7/2009 | Gallagher | | |
| 2014/0105679 A1 | 4/2014 | Oliver | | |
| 2017/0276161 A1 | 9/2017 | Oliver | | |

* cited by examiner

ADVANCED ROTATING TENSION LATCH

CROSS-REFERENCE TO RELATED APPLICATION

This application is the National Stage of, and therefore claims the benefit of, International Application No. PCT/US2021/015318 filed on Jan. 27, 2021, entitled "ADVANCED ROTATING TENSION LATCH," which was published in English under International Publication Number WO 2021/154875 on Aug. 5, 2021, and has a priority date of Jan. 27, 2020, based on U.S. Provisional Application No. 62/966,403, May 14, 2020, based on U.S. Provisional Application No. 63/024,680, and Jun. 15, 2020, based on U.S. Provisional Application No. 63/039,084. All of the above applications are commonly assigned with this National Stage application and are incorporated herein by reference in their entirety.

TECHNICAL FIELD

This application is directed, in general, to a coupling device or latch and, more specifically, to an advanced rotating tension latch.

BACKGROUND

Fasteners are ubiquitous. A quick trip to the hardware section of any home center will readily reveal the broad selection of fasteners. Screws, bolts, rivets, wall anchors, cotter pins, magnets, latches, etc., serve to enable one object to be fastened permanently or temporarily to another object. Seemingly, the choices are so broad that there is likely a specific fastener for every specific application.

Many assembly line operations use fasteners, such as bolts or screws, to couple two separate parts together. However, in many automated assembly line operations it is desirable to grasp an assembly with a robotic arm and temporarily relocate the assembly to the next station where assembly continues. In some applications magnetic or vacuum forces are employed to grasp the assembly for transport. However, in some applications magnetic forces may be undesirable because of the nature of the assembly which may be adversely affected by magnetism. Similarly, other assemblies may be unsuitable for the use of vacuum force because of insufficient area to affect a secure grasp of the assembly, excessive weight of the workpiece, etc.

In addition, online marketing companies and many of the world's largest package delivery services (Amazon, UPS, DHL, Dominos, etc.) are spending heavily to advance autonomous, drone-based package delivery. As a result, there are numerous working prototypes currently in existence. These prototypes vary widely in where they carry their payloads, how they collect and drop off these payloads, in overall design of the drone, and more. For example, where Amazon Prime Air employs an anchor-dependent (e.g., the package is coupled directly to the drone) delivery drone, Wing employs a tether-dependent delivery drone.

The current methods of drone delivery in the market have several limitations. For example, drones have not been able to pick up packages without the assistance of human workers or intricate external automated devices, which makes it difficult to fully automate the drone delivery process and therefore reduces delivery cost efficiency. The hardware and components required to operate actuators add to the weight of the drone and complicate the process of loading the package onto the drone. Delivery range is limited by the additional weight and energy costs of these designs, and drop-off locations are limited by the capabilities of the type of drop-off system used. Furthermore, if manual loading and unloading is required, delivery times are limited by the availability and location of any customer receiving a package. A system that allows fully automated loading and unloading in a wider range of pick-up and drop-off locations is therefore desirable to industry and solves many of the design challenges currently facing drone delivery systems.

Therefore, there is needed a simple and re-useable mechanical fastener that may be employed in these and other suitable applications.

BRIEF DESCRIPTION

Reference is now made to the following descriptions taken in conjunction with the accompanying drawings, in which:

FIGS. 1 and 2 illustrated one embodiment of a fixed design and a fixed-length tether design according to one or more embodiments of the disclosure;

Figure 26:
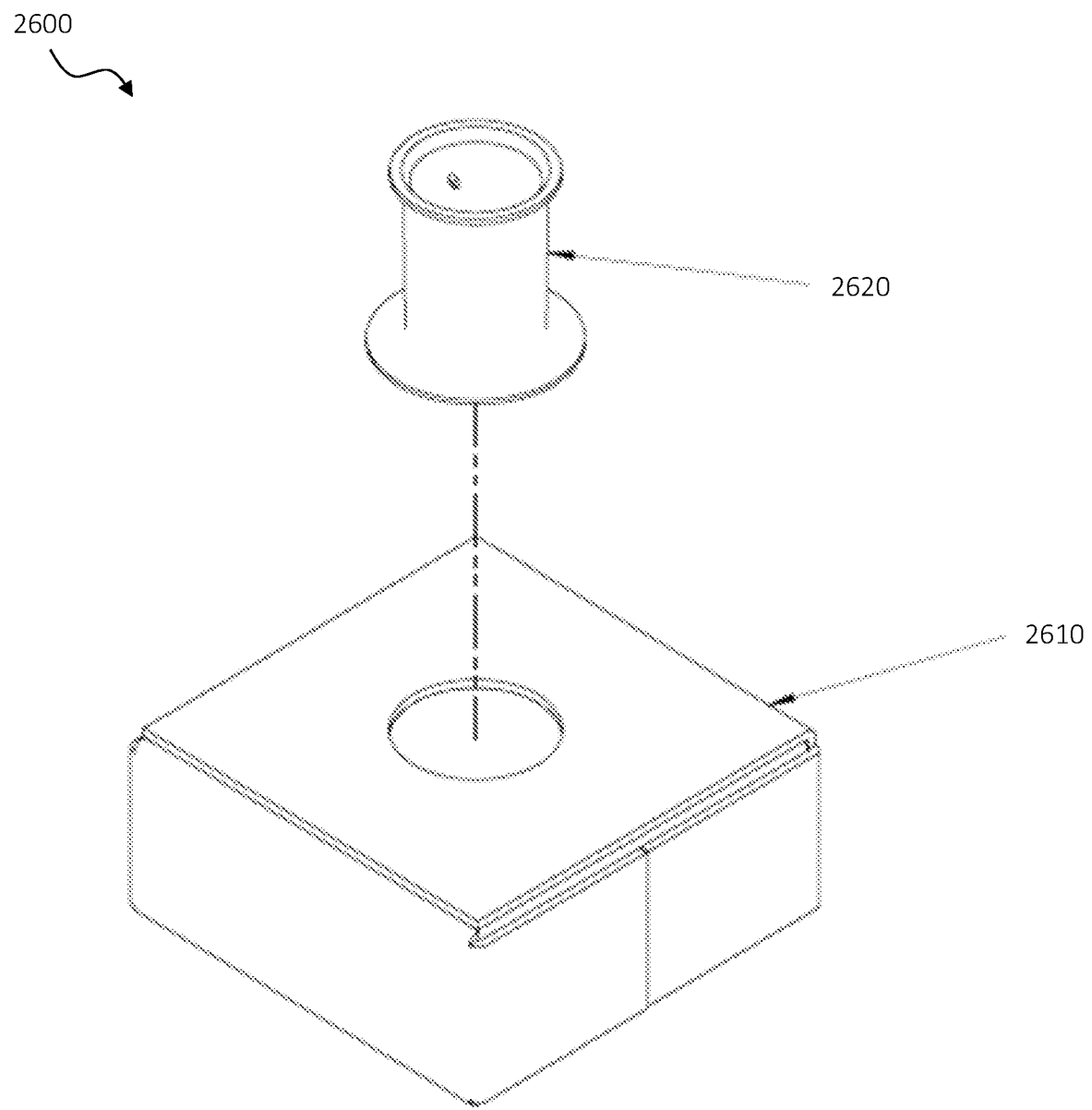
Figure 27:
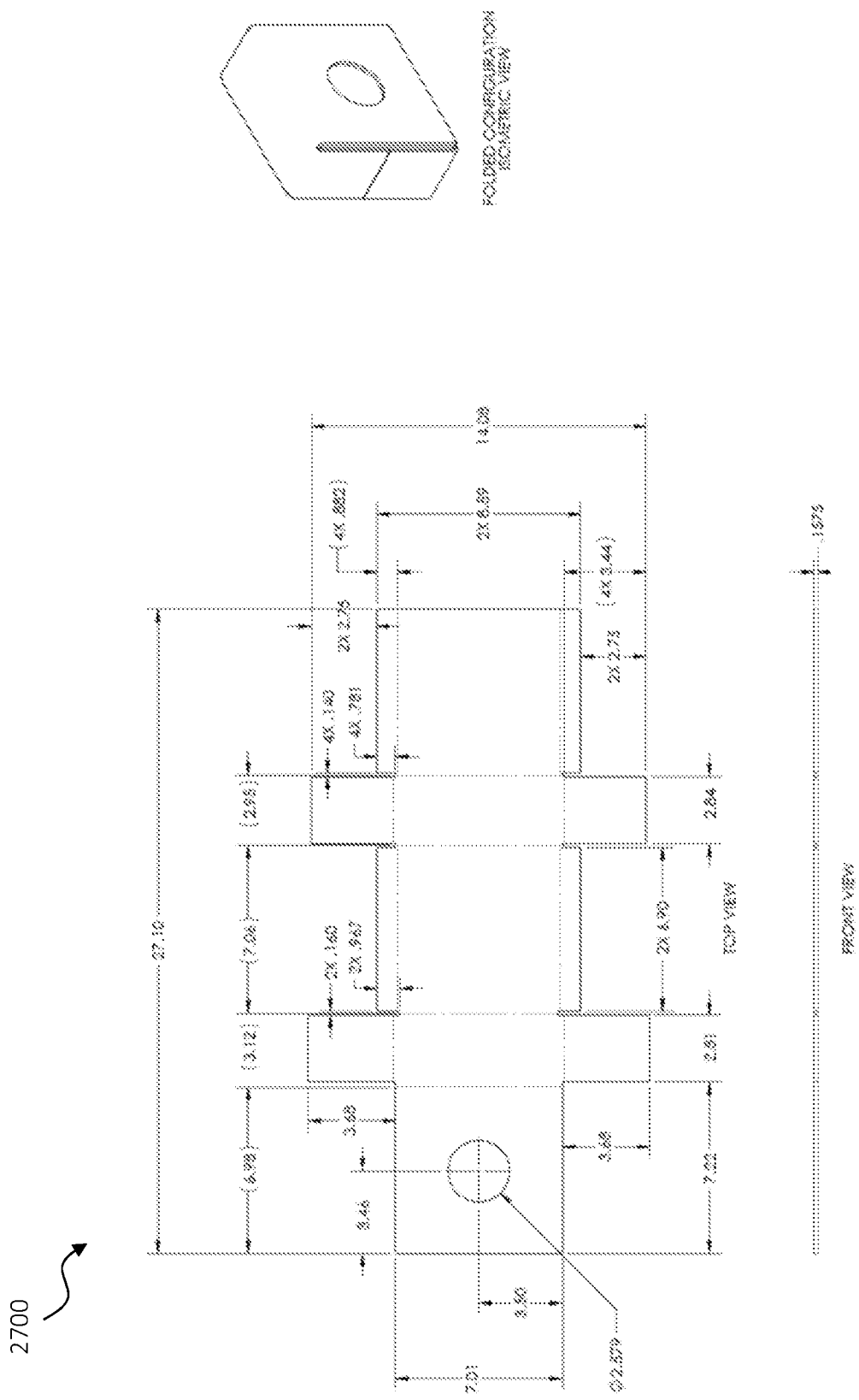
Figure 28:
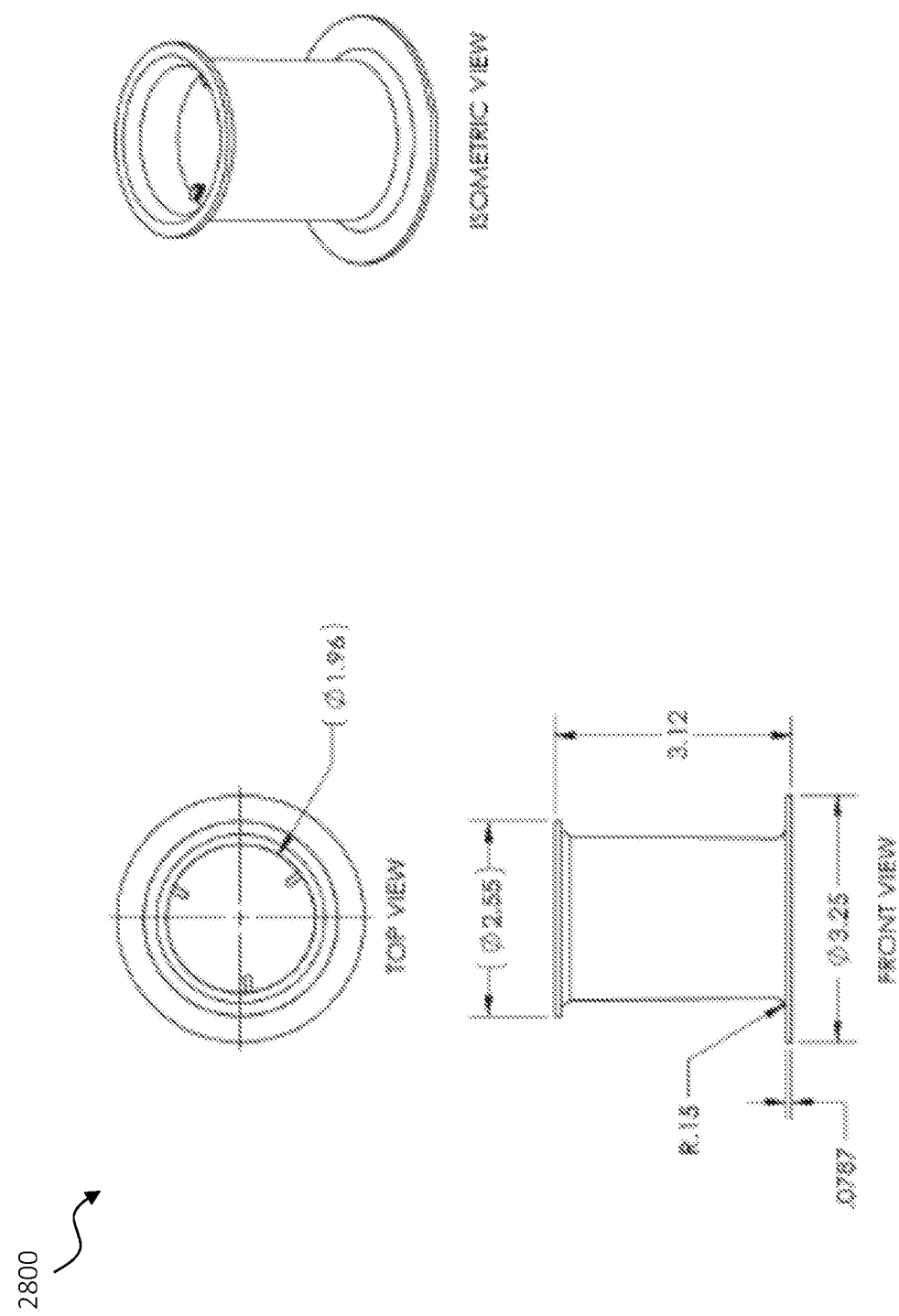
Figure 29:
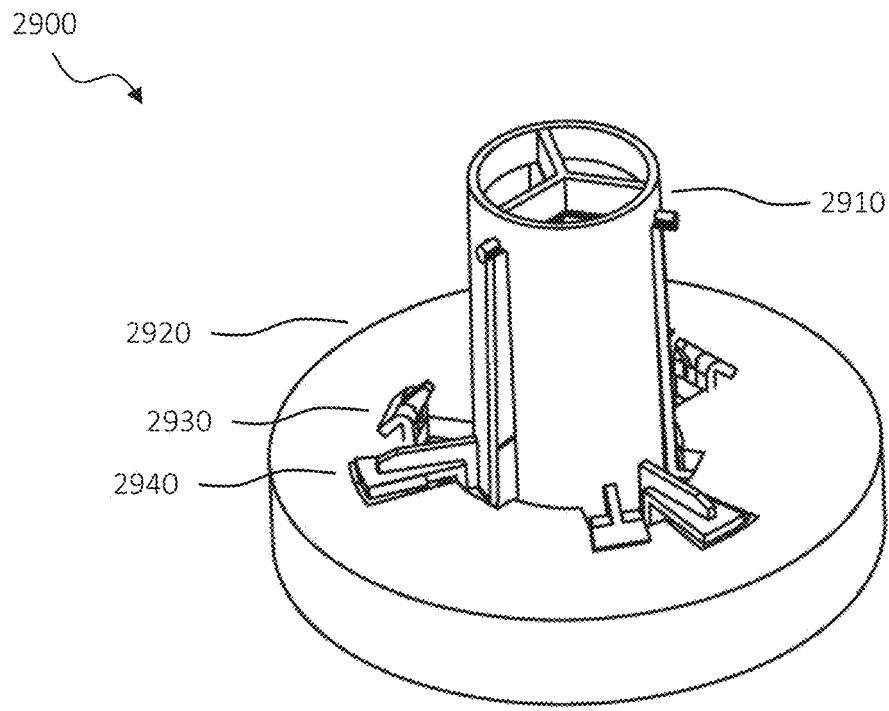
Figure 30:
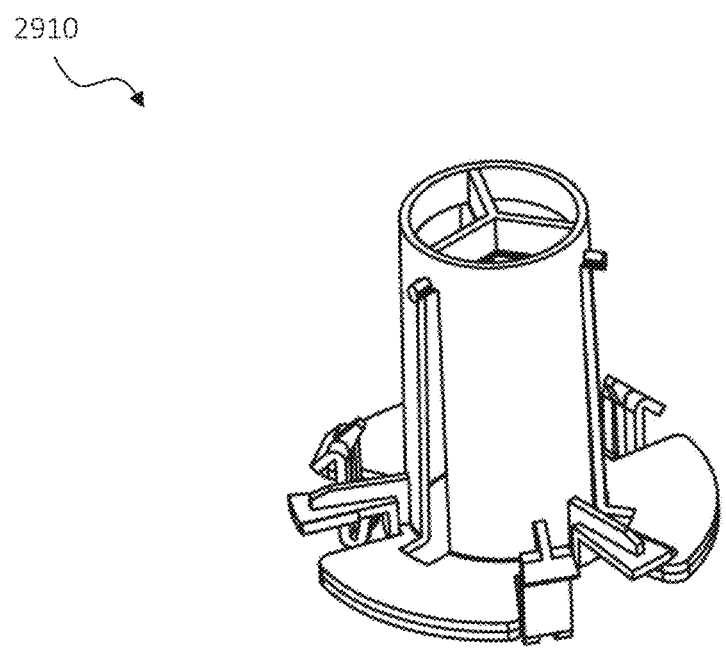
Figure 31:
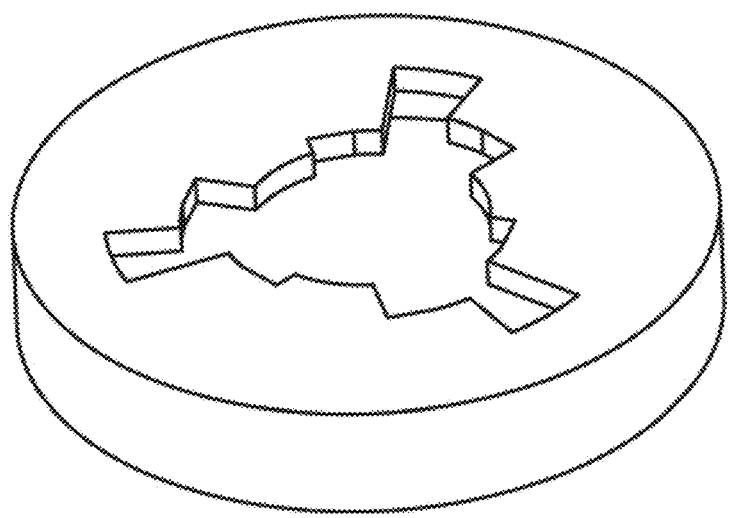
Figure 32:
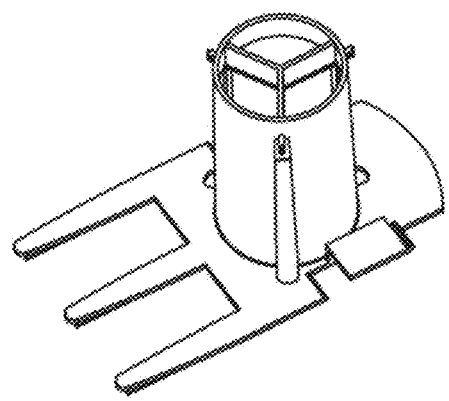
Figure 33:
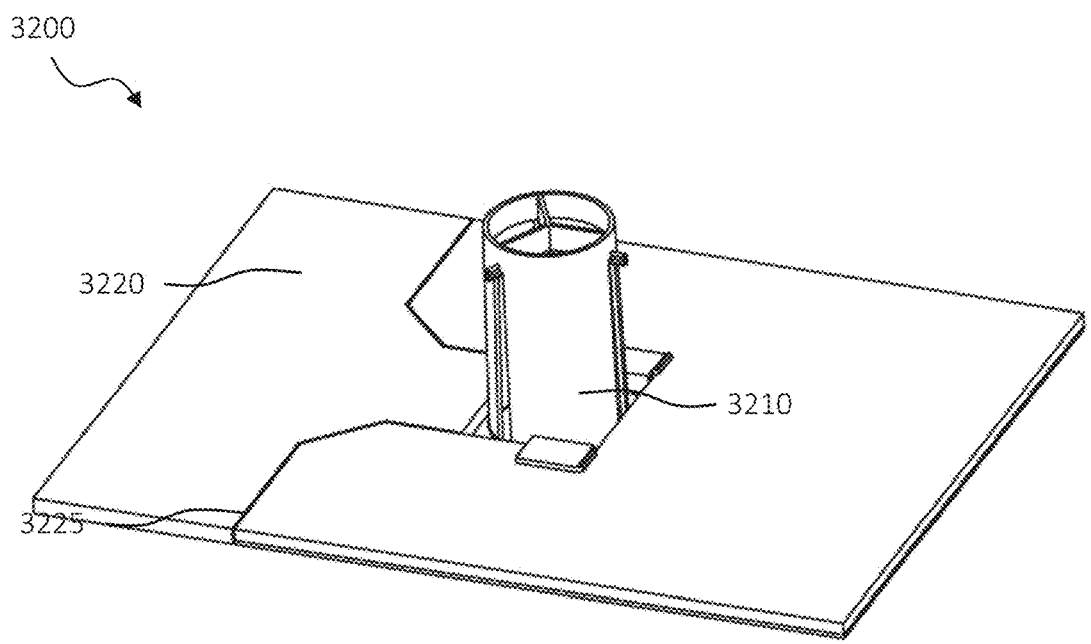
Figure 34:
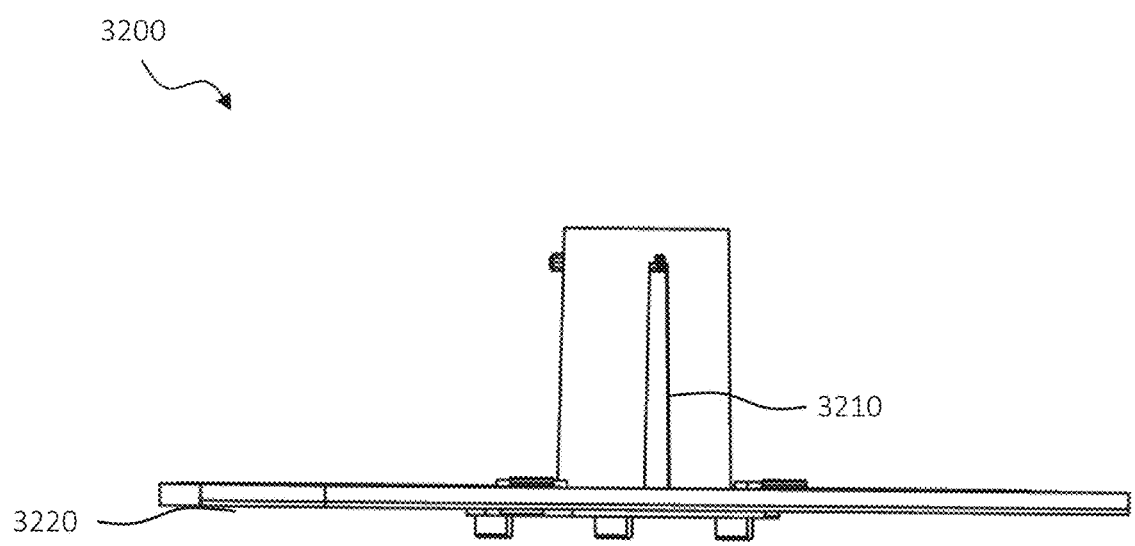
Figure 35:
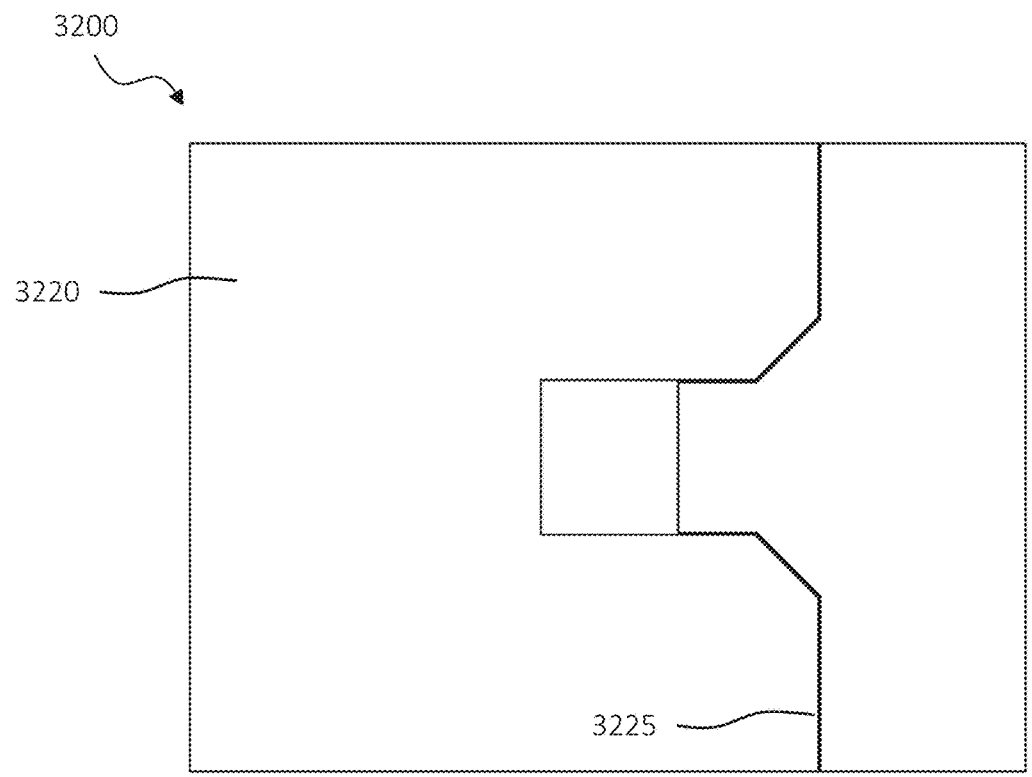
Figure 36:
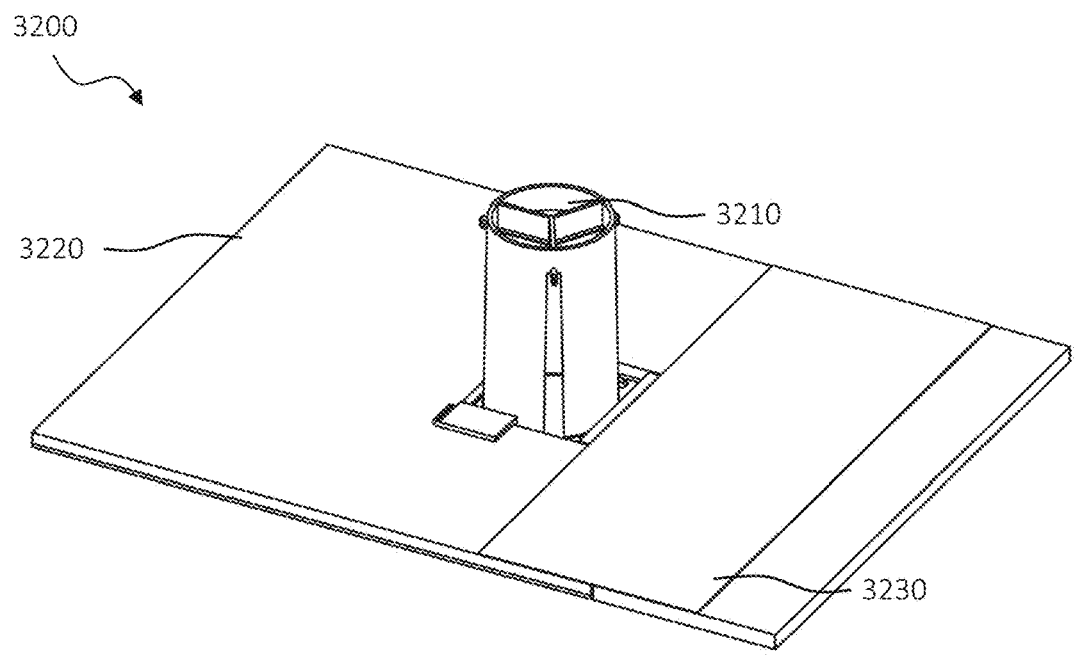
Figure 37:
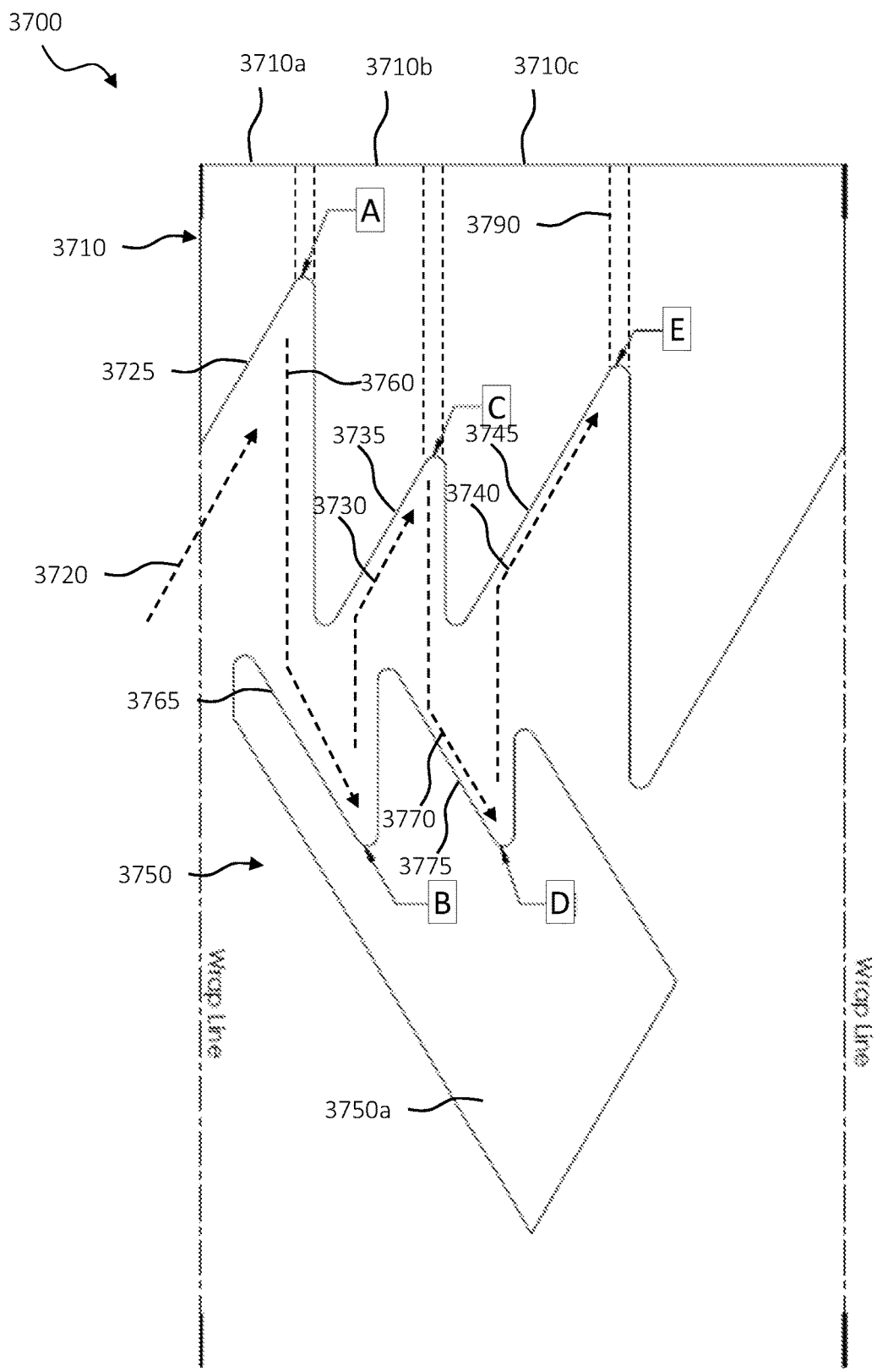
Figure 38:
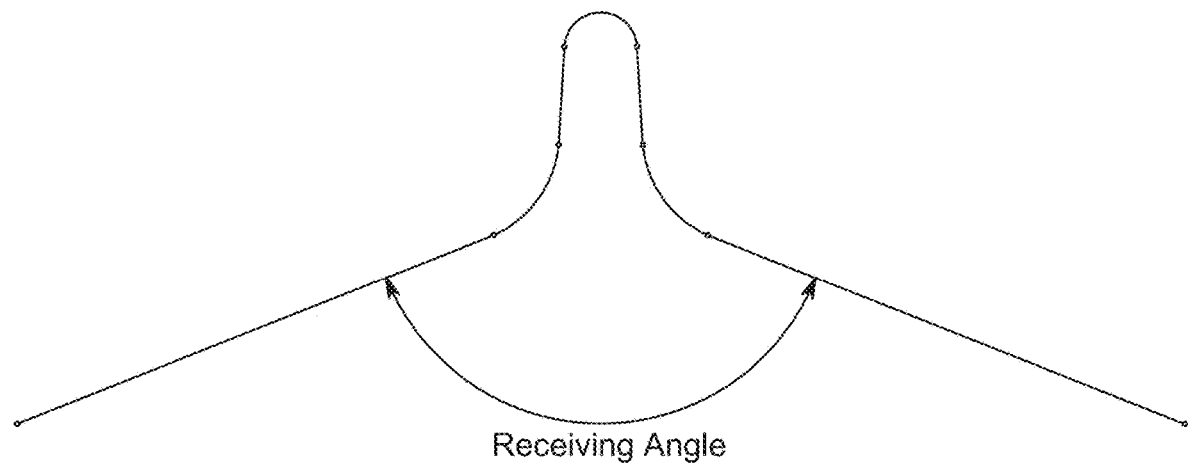
Figure 39:
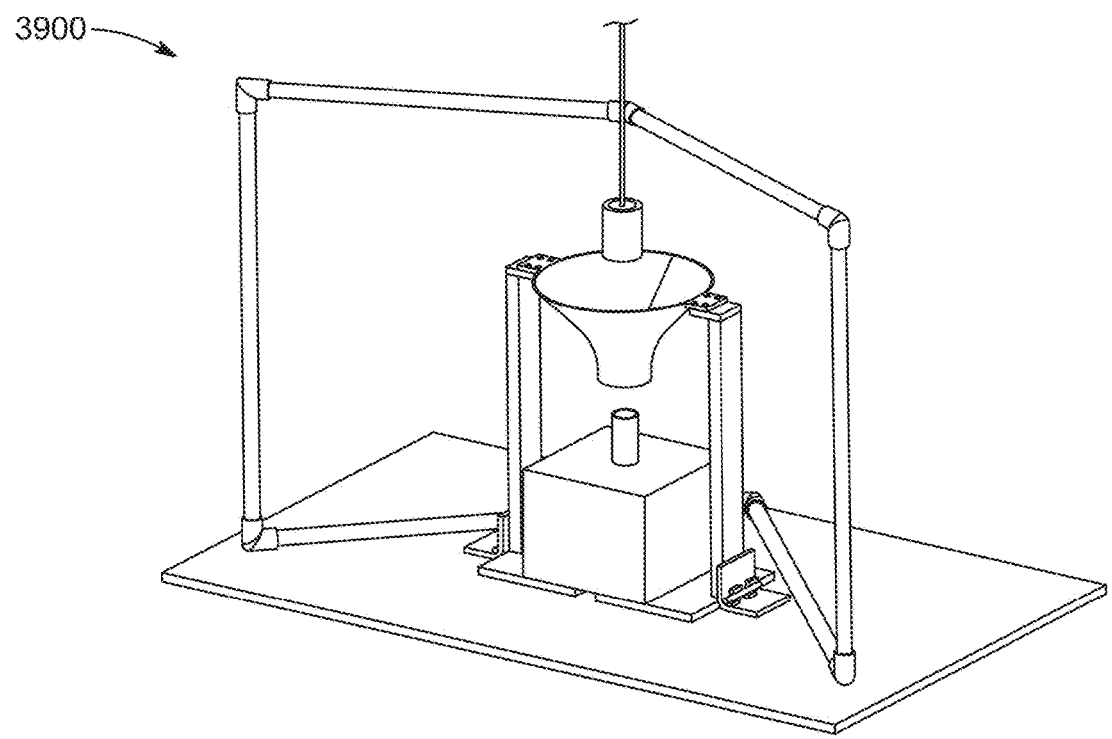
Figure 40:
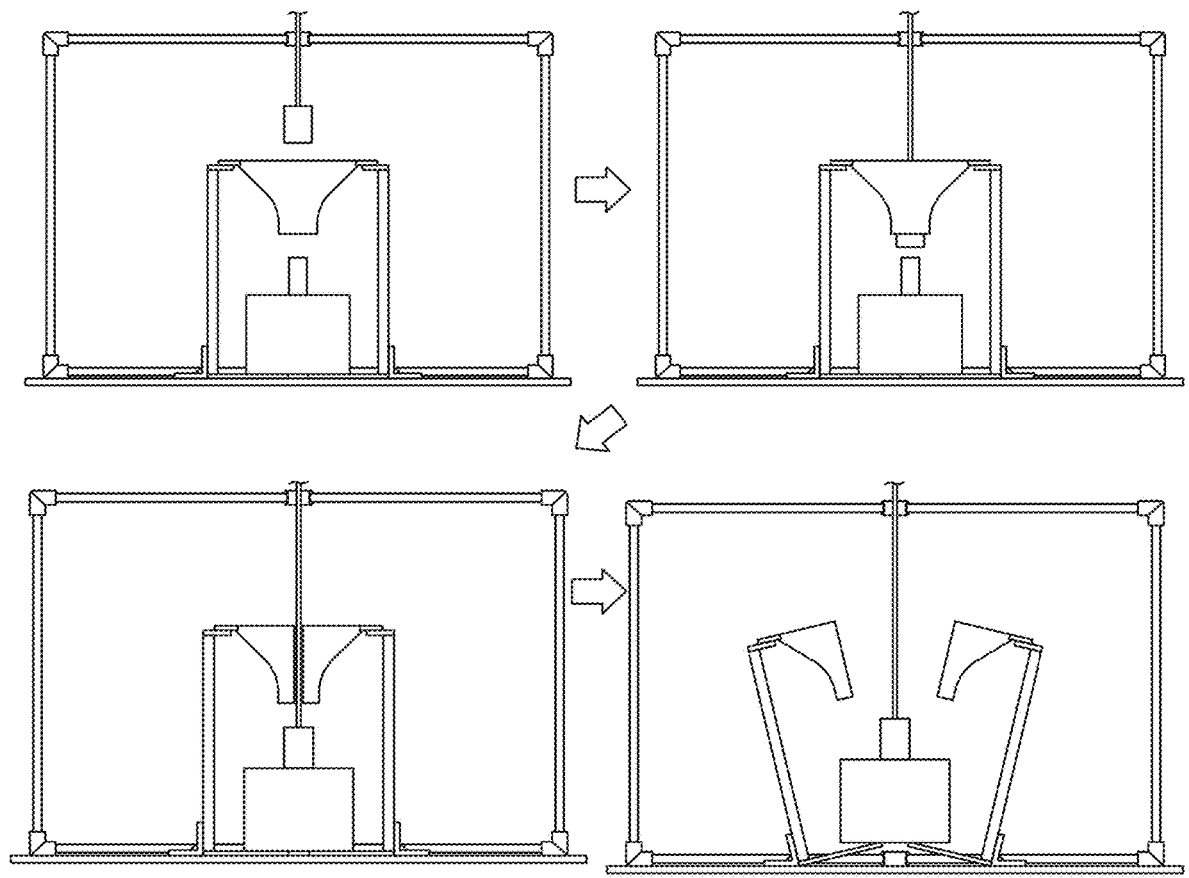
Figure 41A:
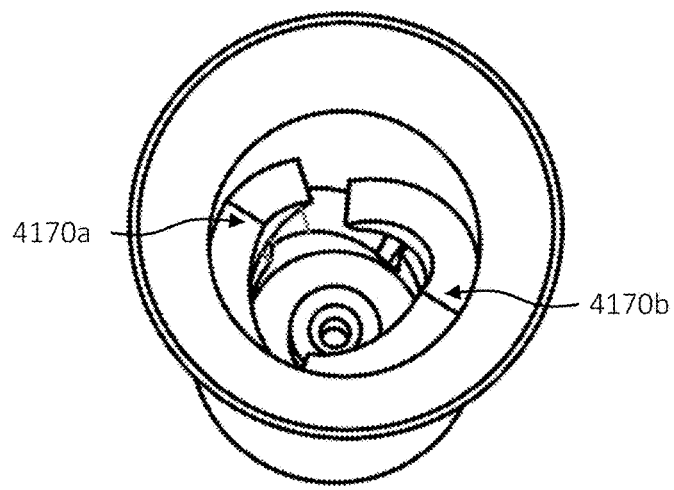
Figure 41B:
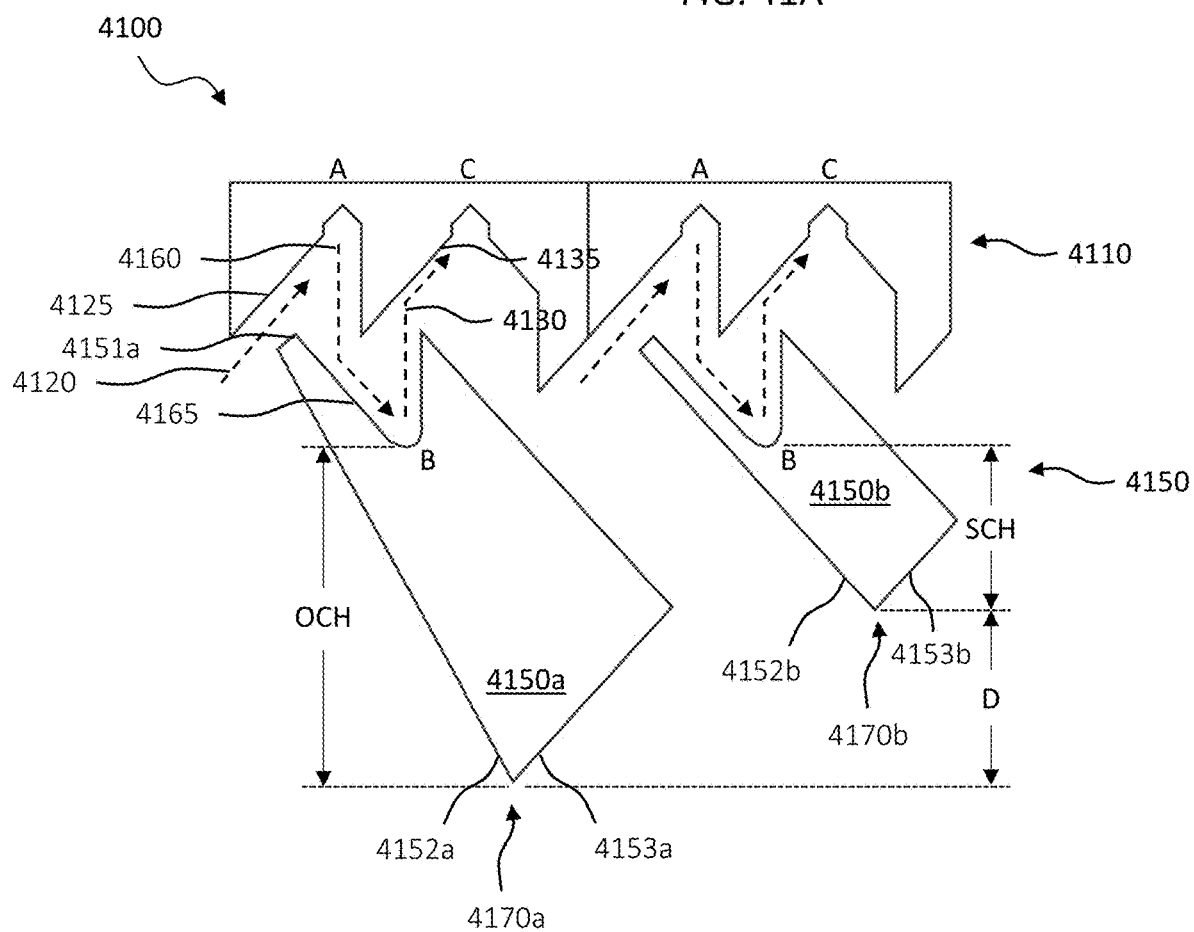
Figure 41C:
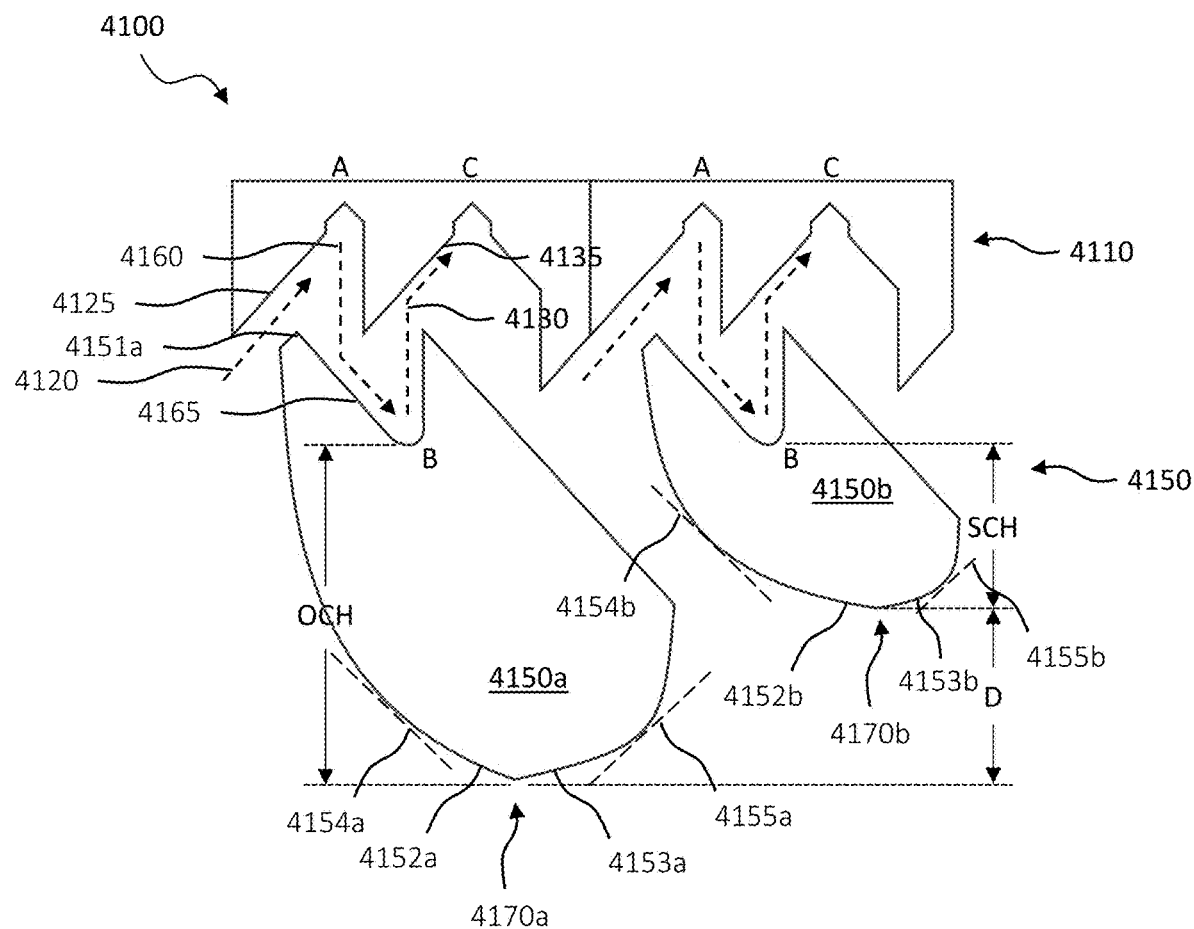
Figure 42A:
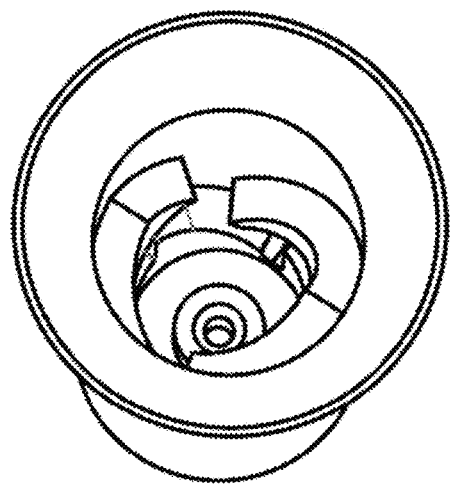
Figure 42B:
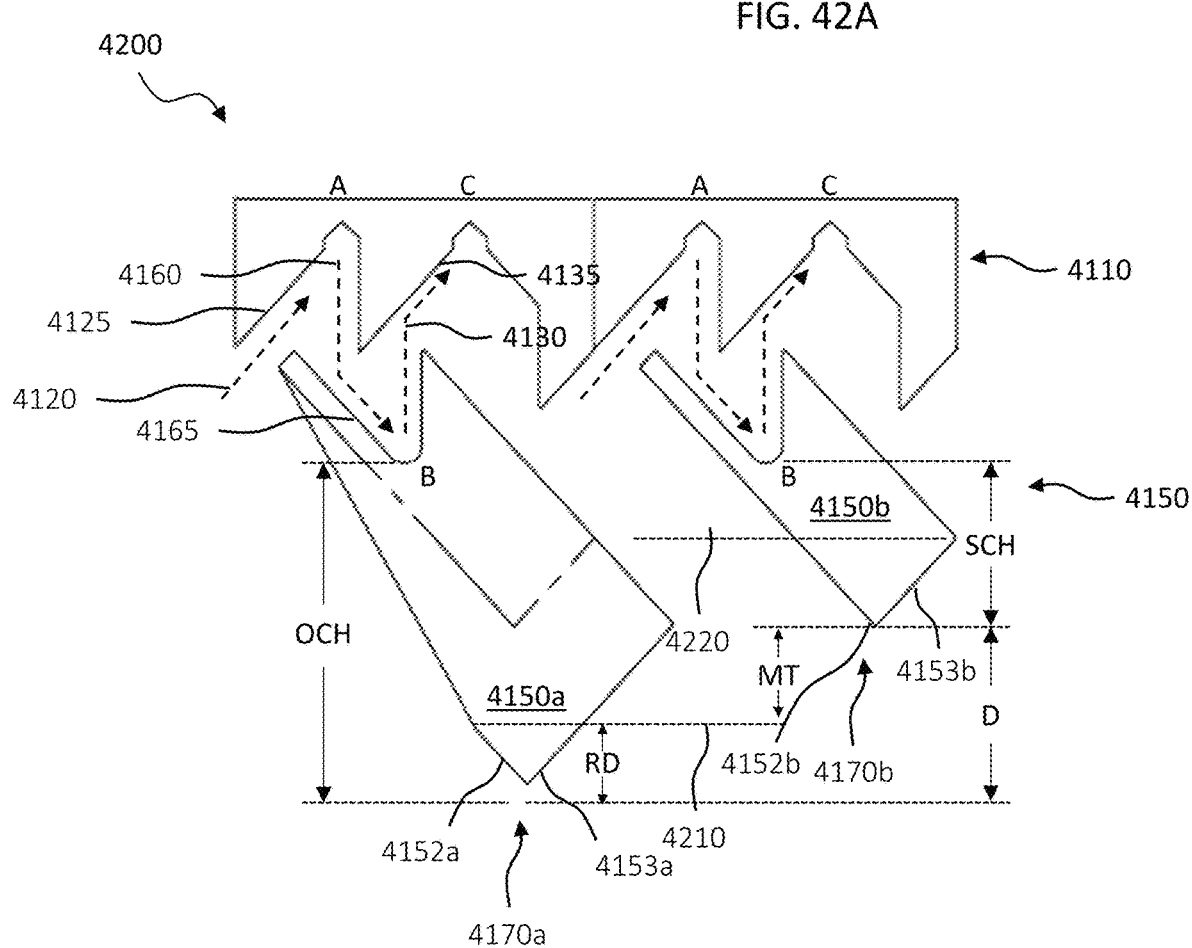
Figure 43:
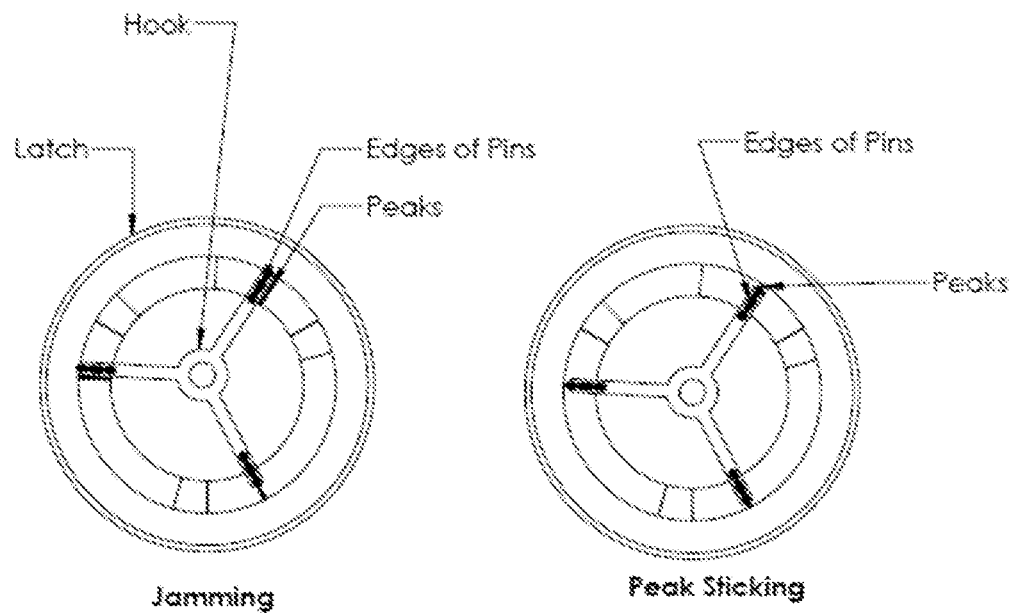
Figure 43:
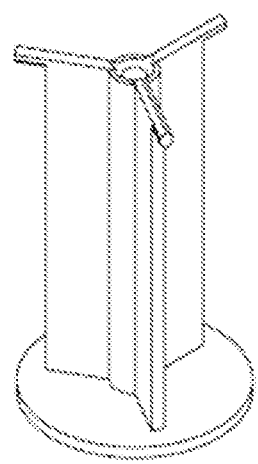
Figure 44:
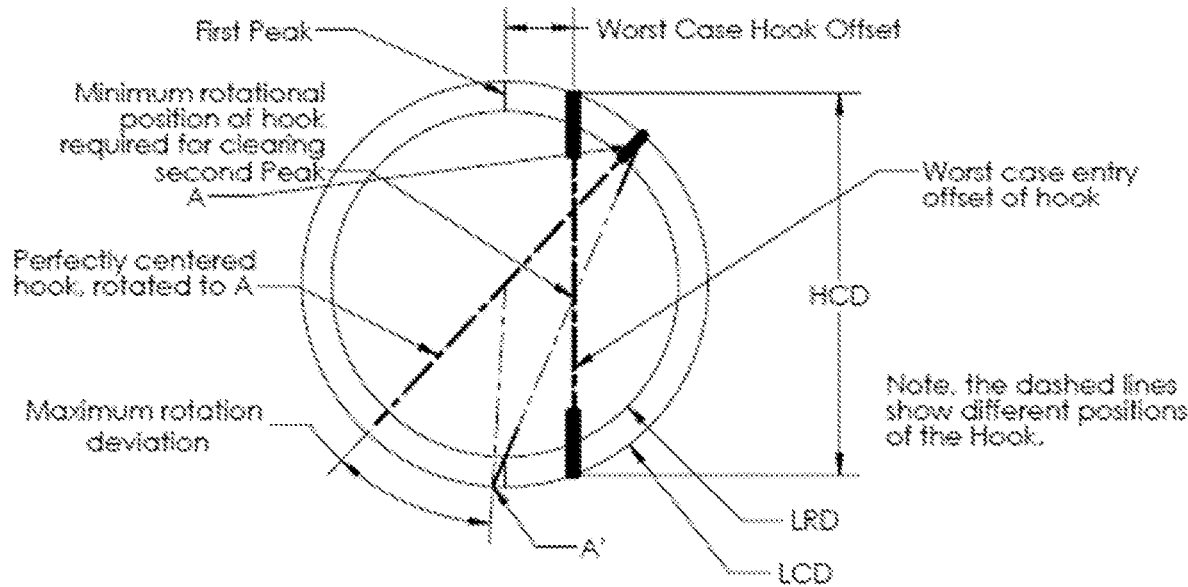
Figure 44:
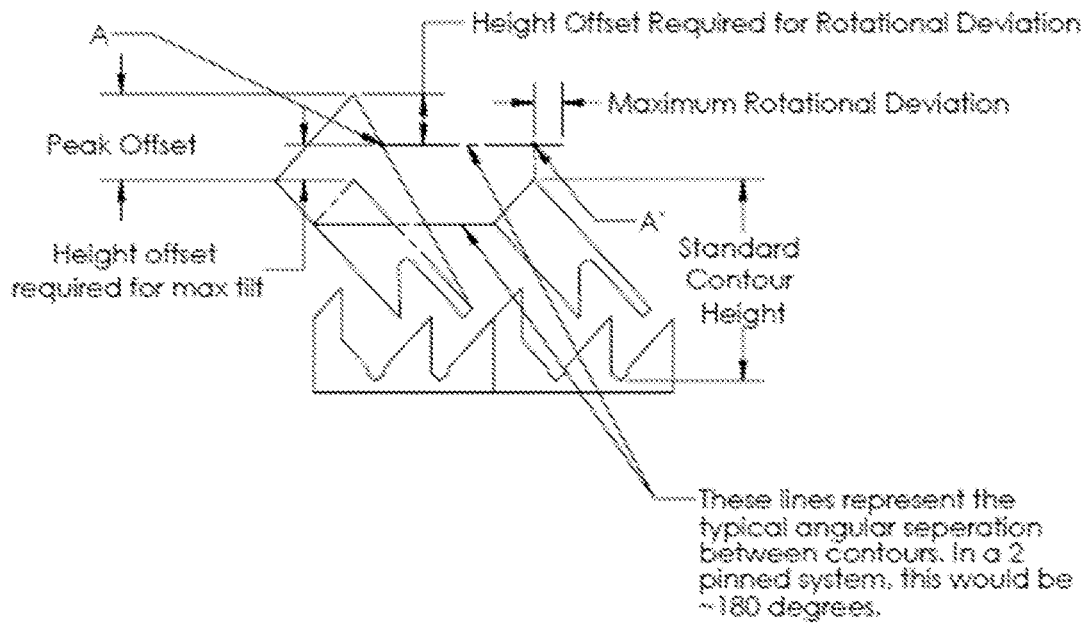
Figure 45:
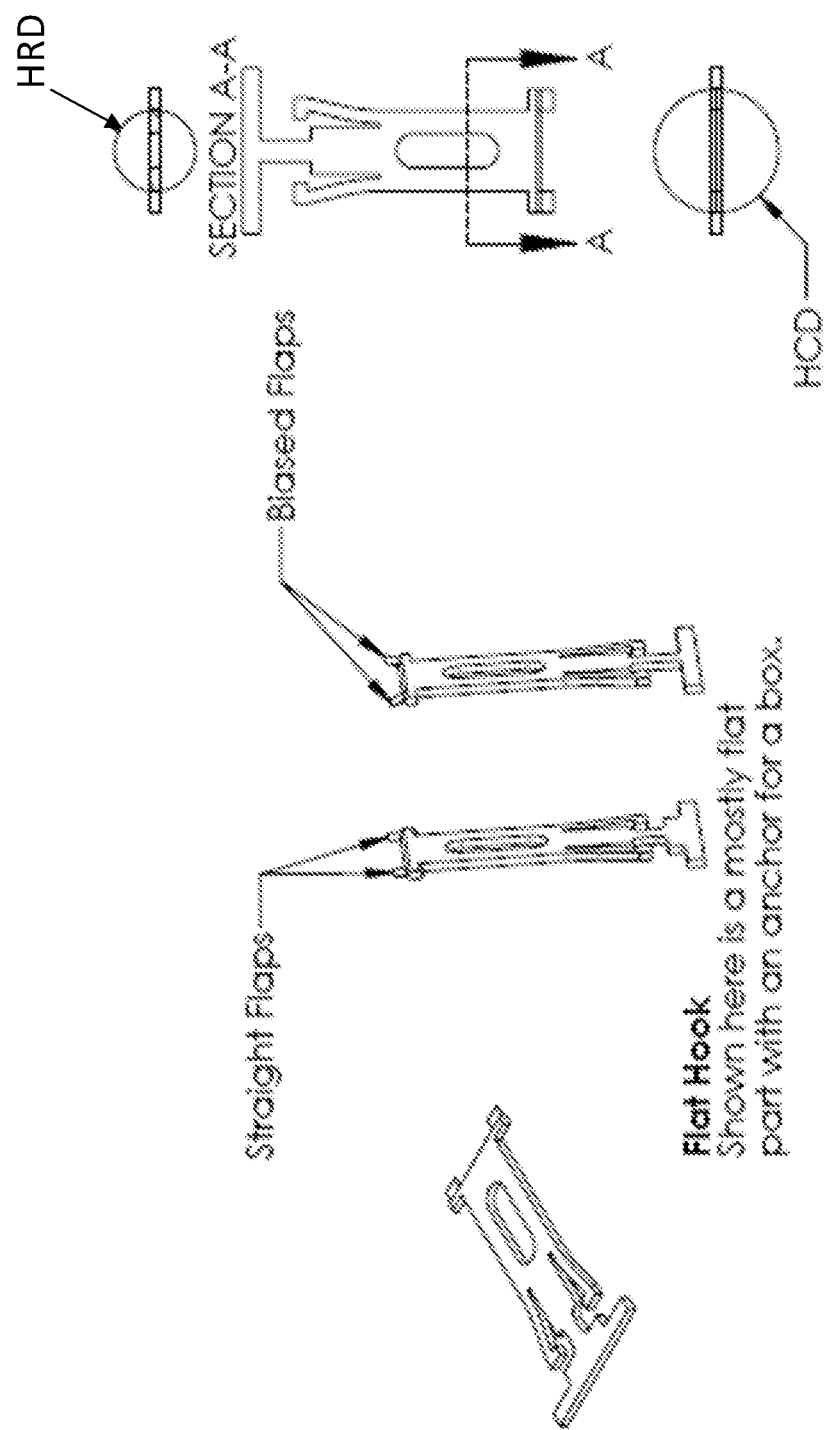
Figure 46:
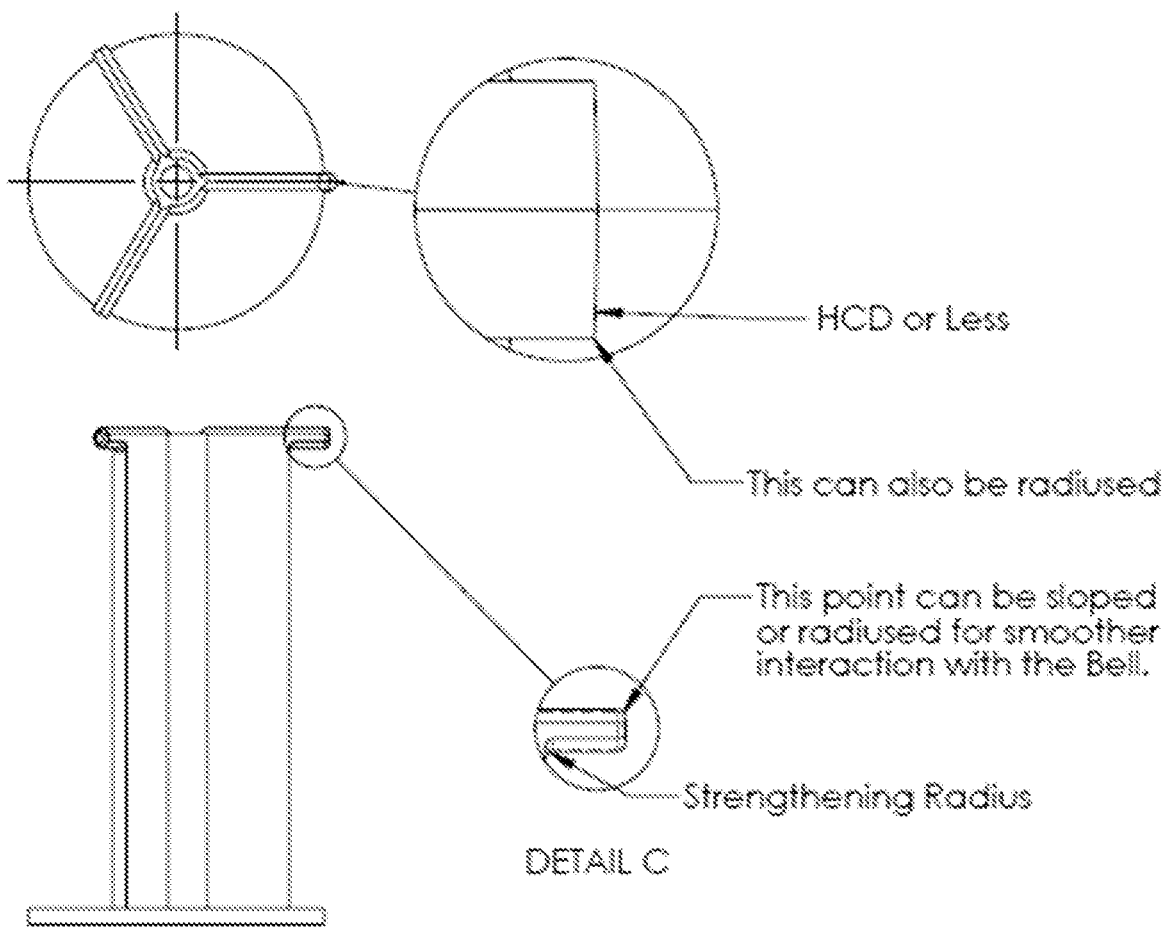
Figure 47A:
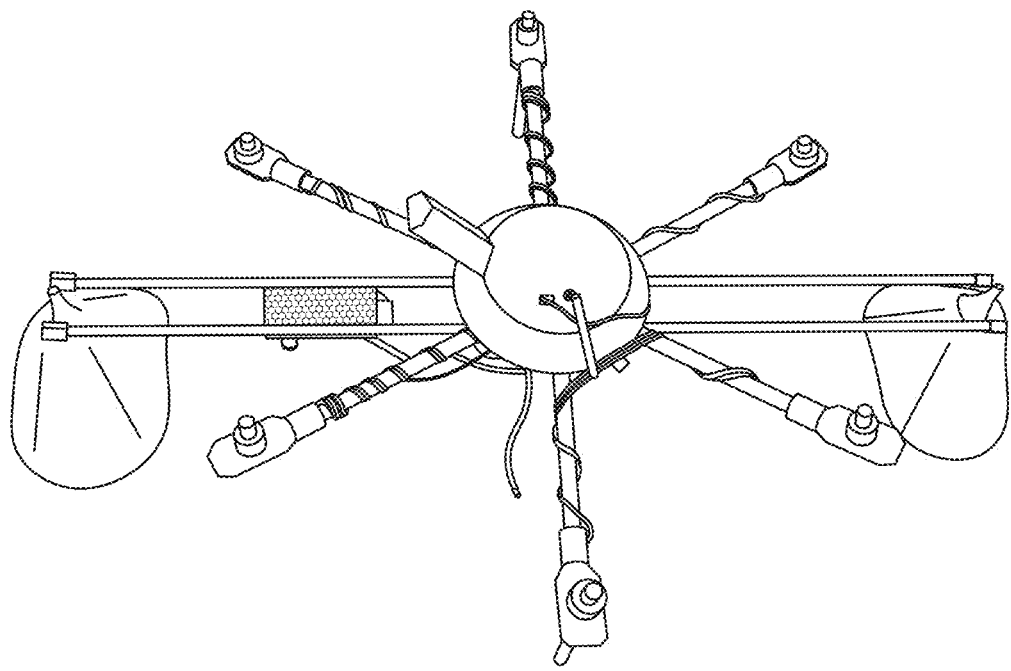
Figure 47B:
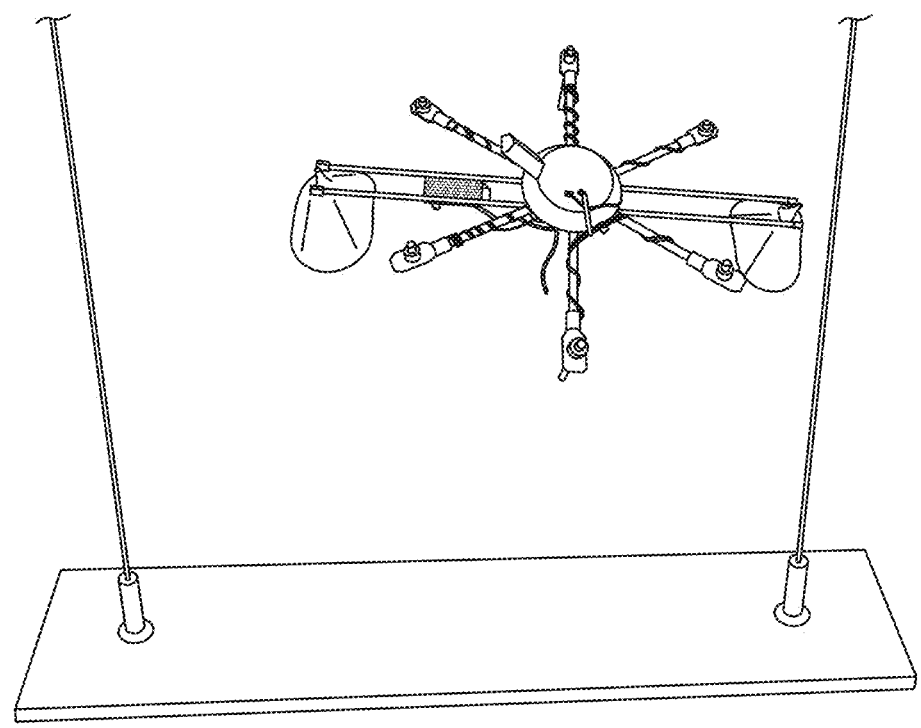
Figure 47C:
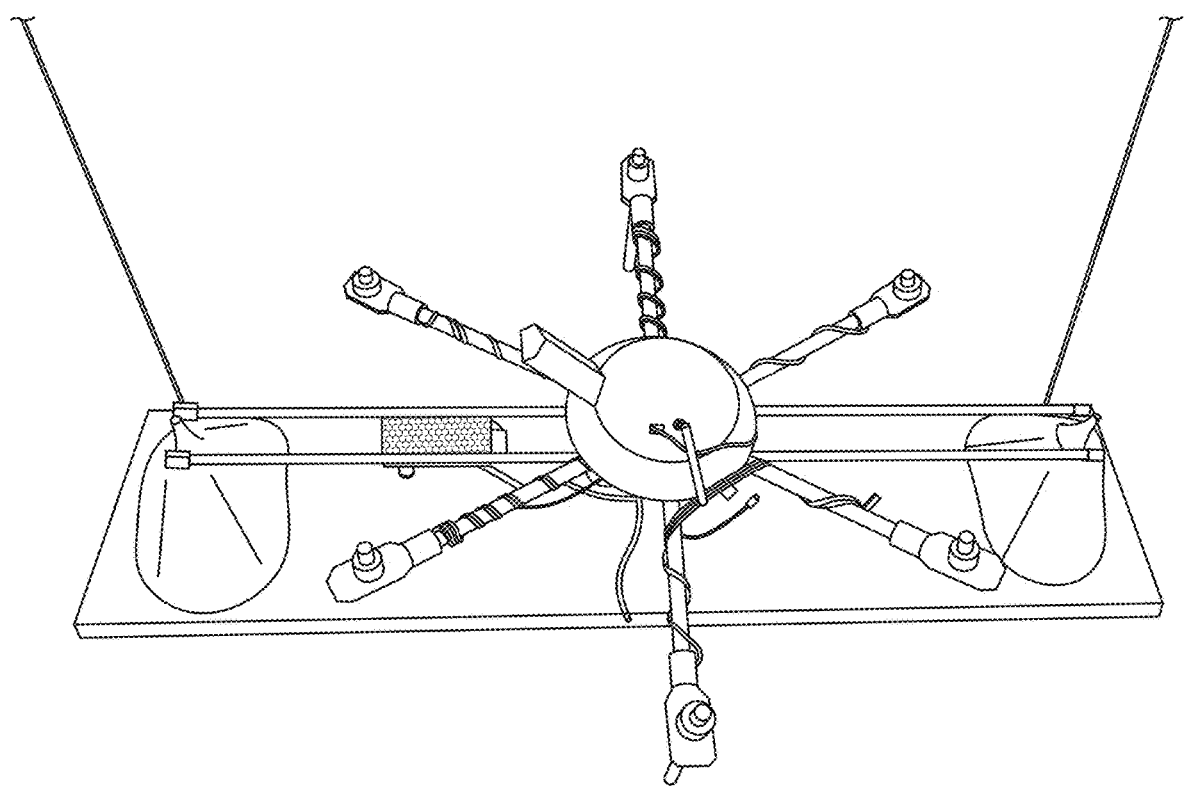
Figure 48A:
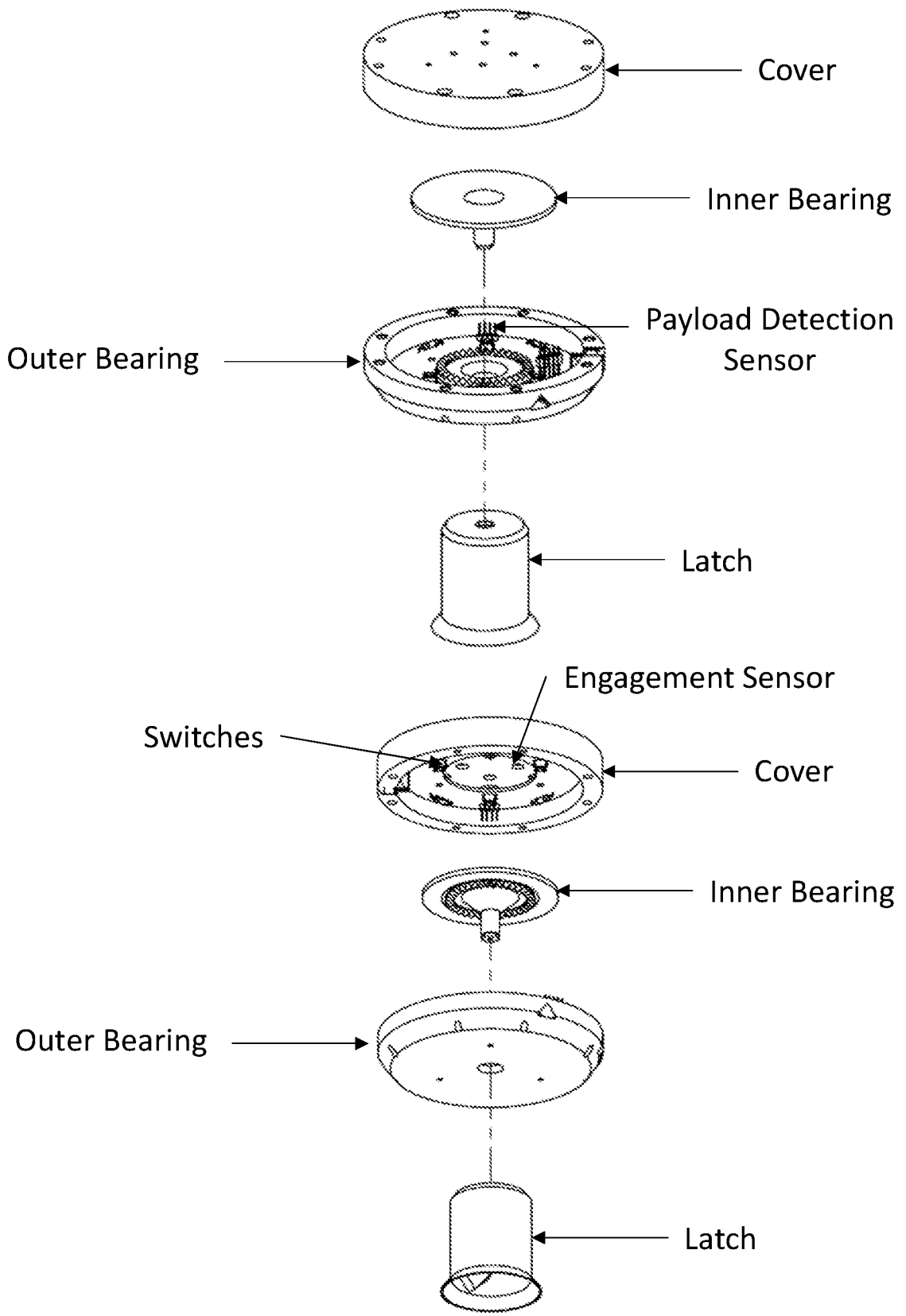
Figure 48B:
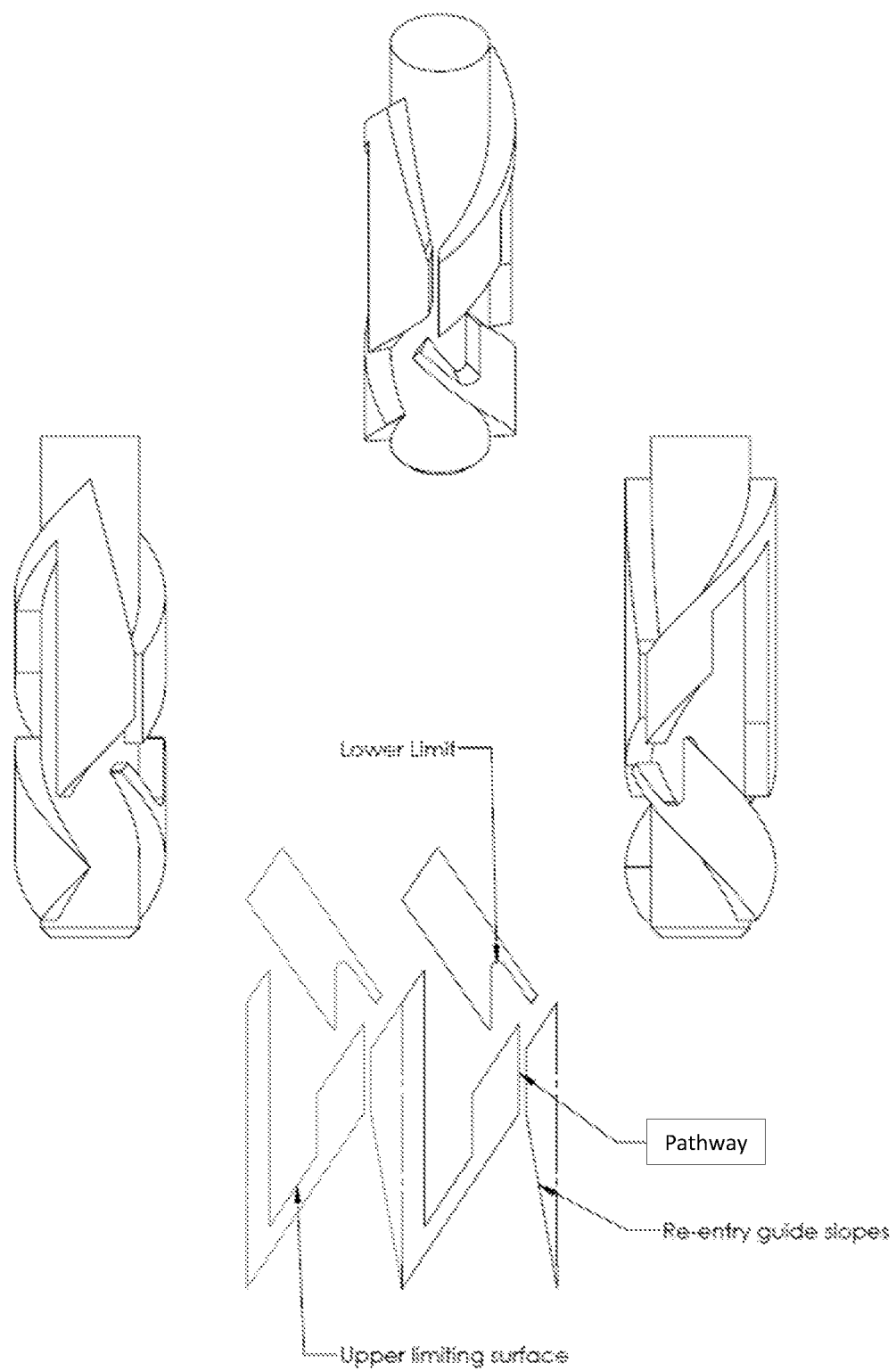
Figure 49:
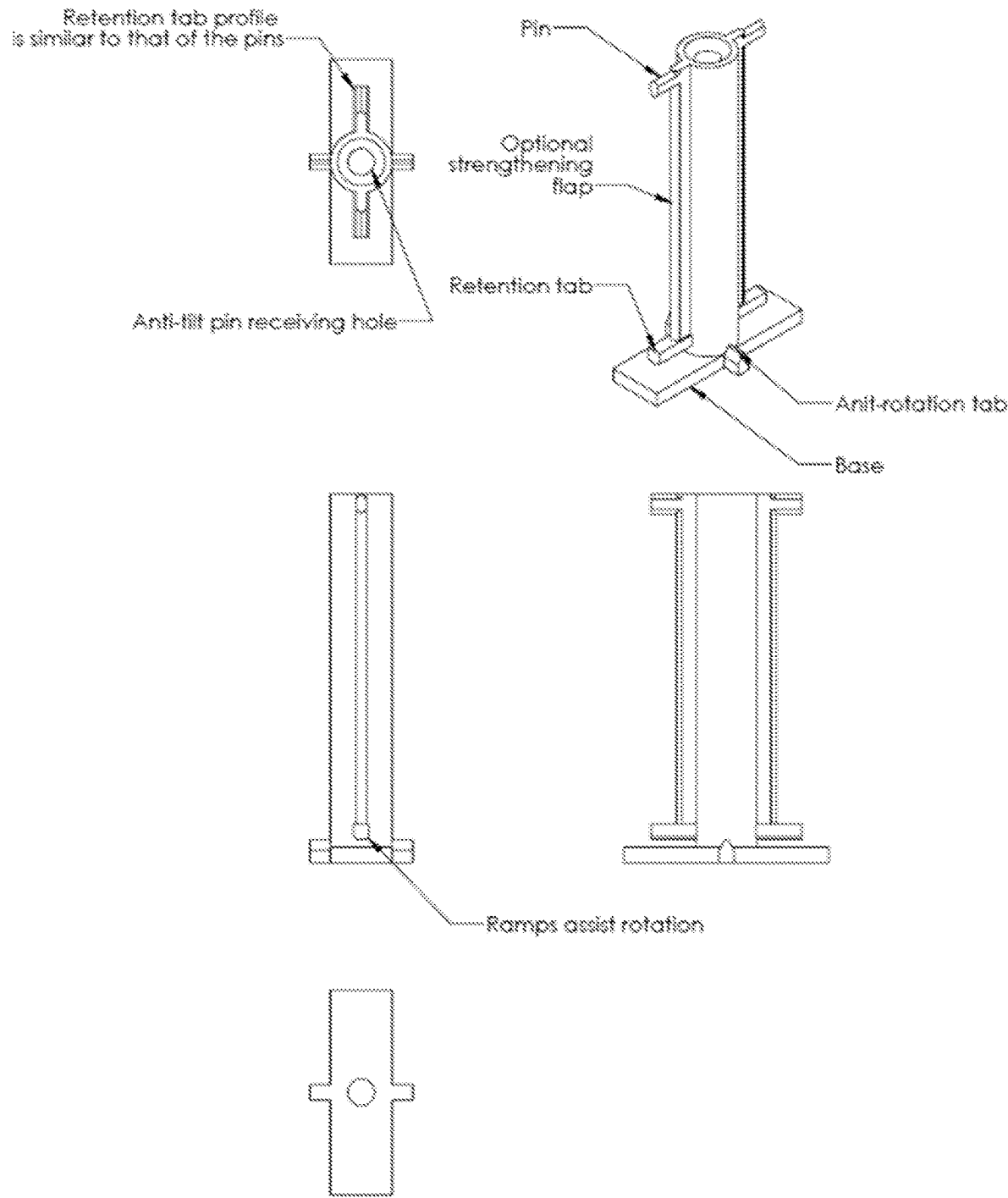
Figure 50:
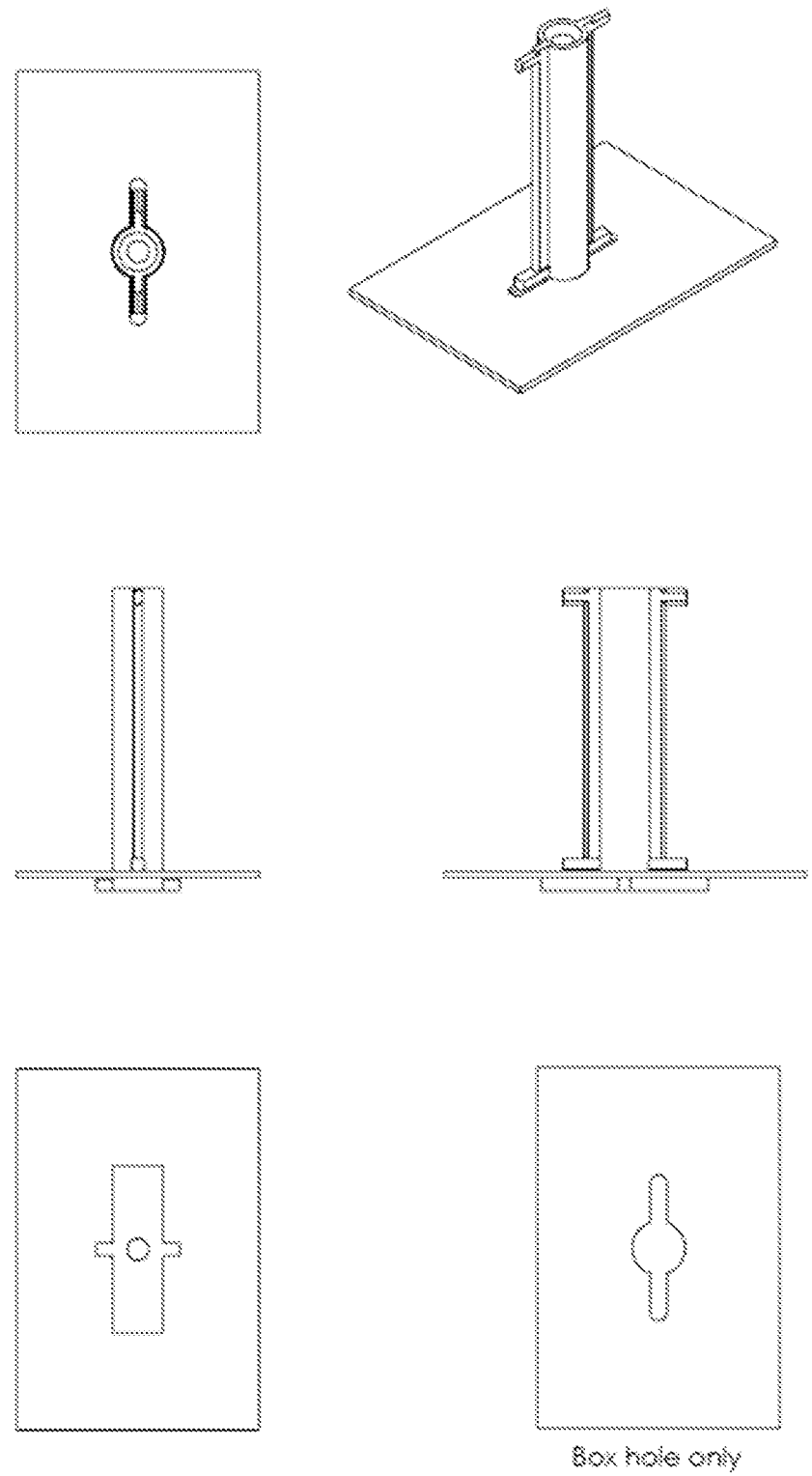
Figure 51:
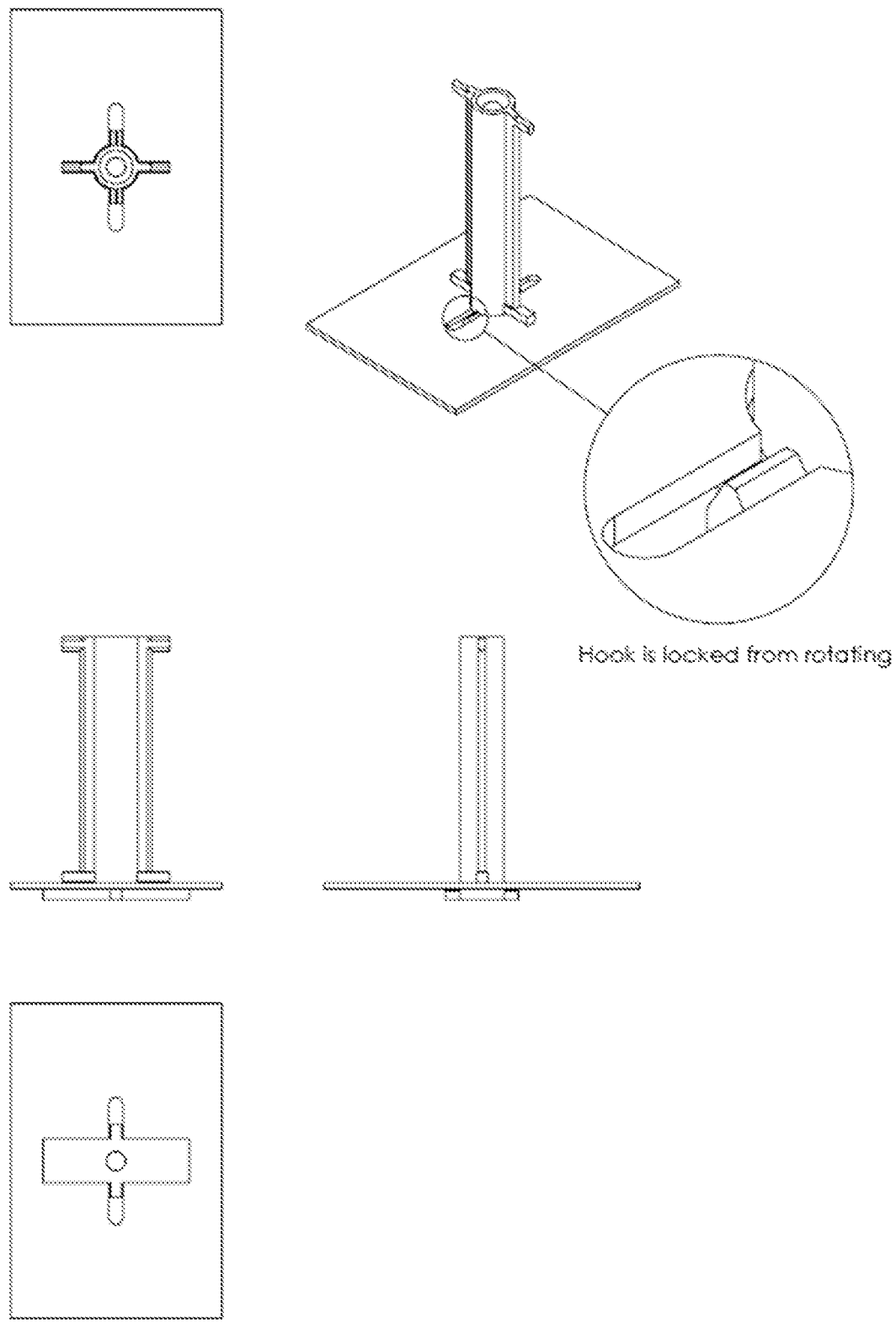
Figure 52:
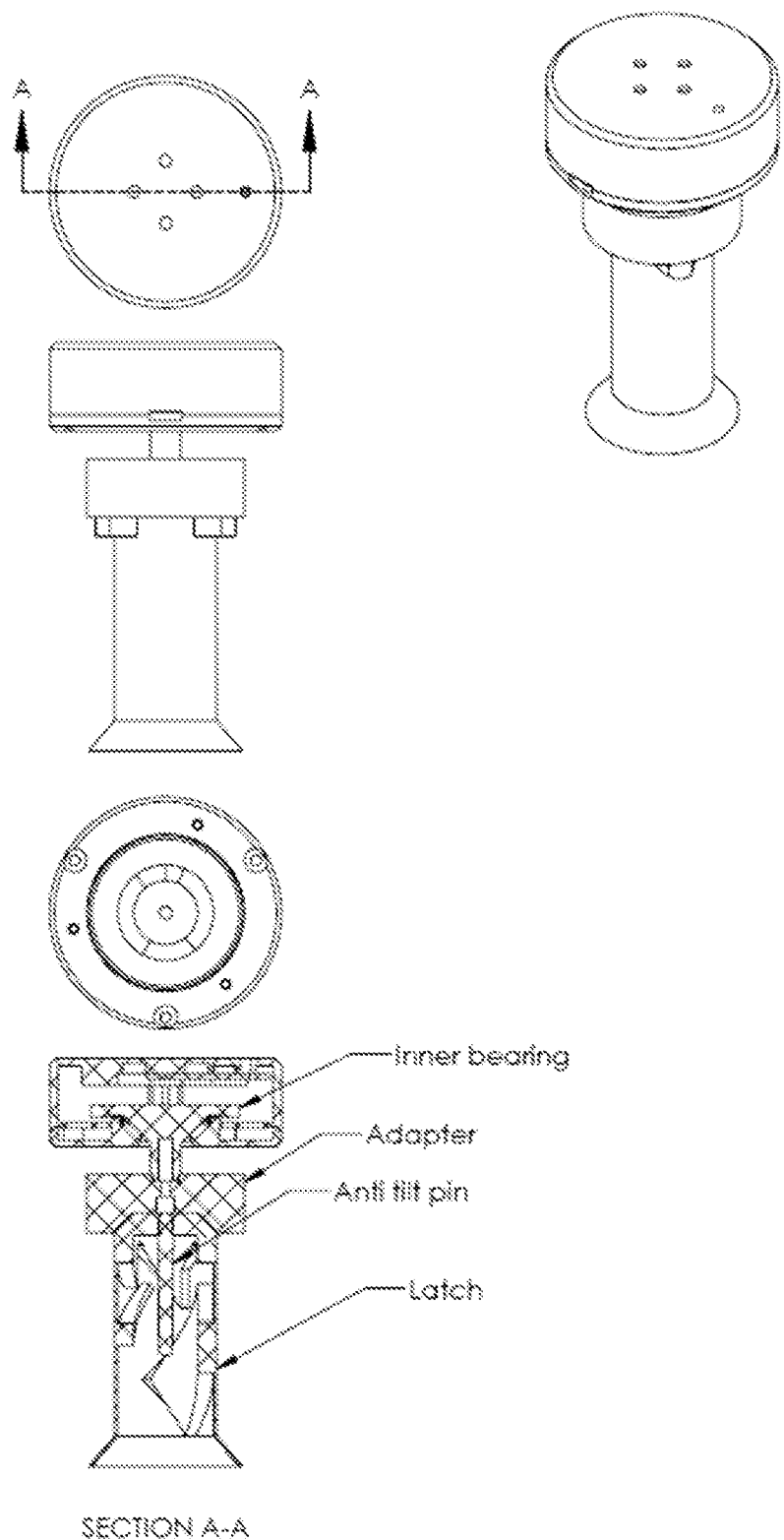
Figure 53:
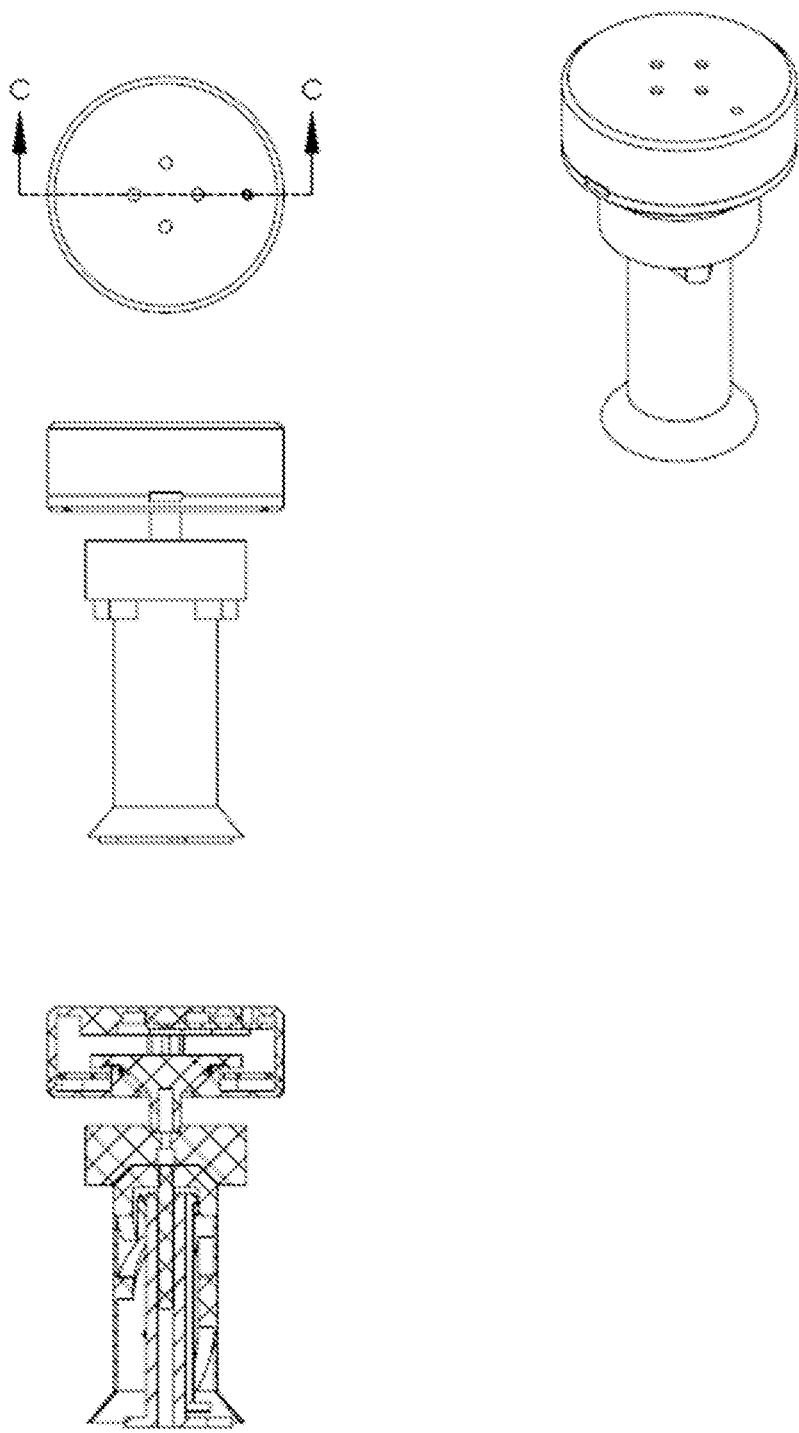
Figure 54:
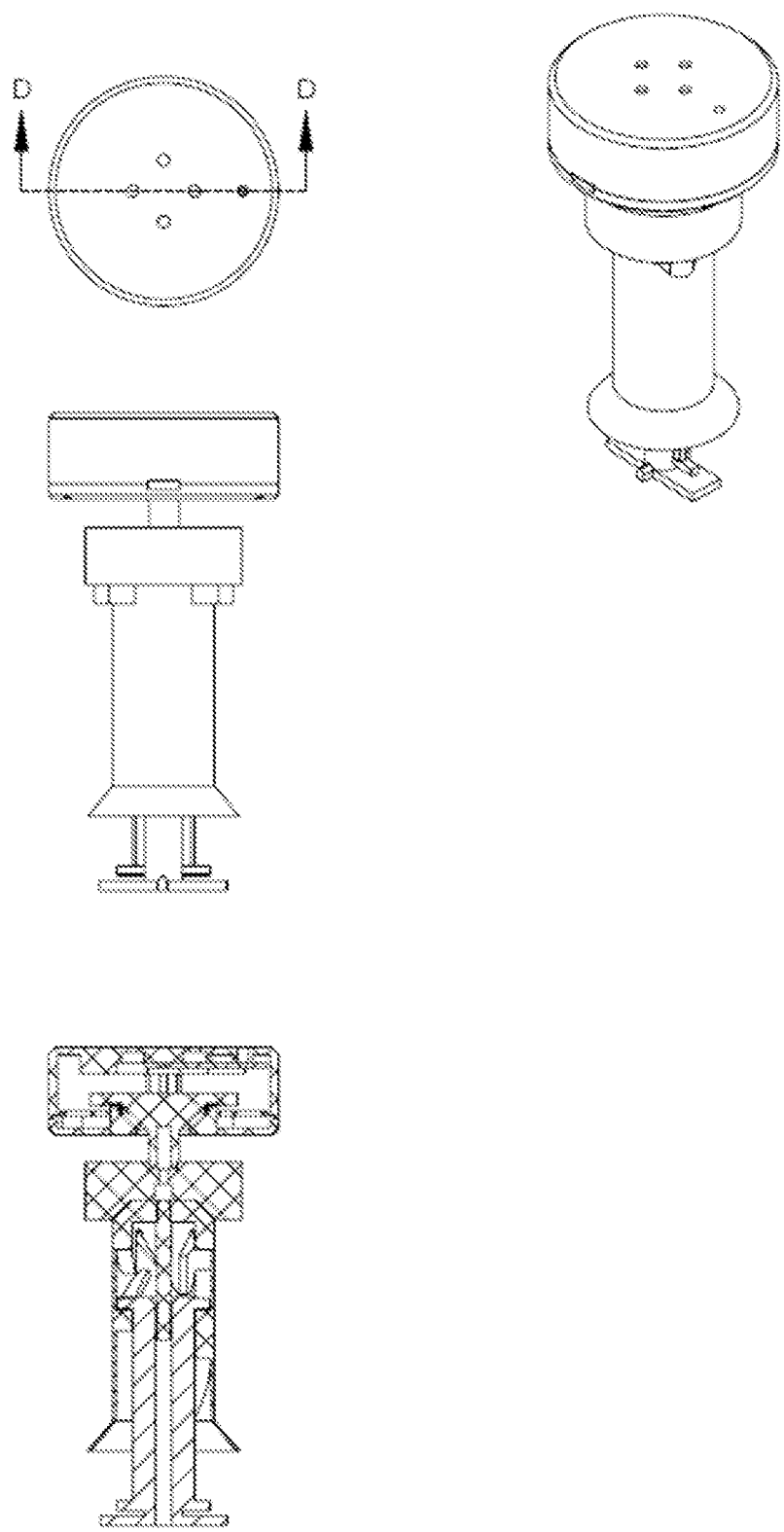

FIG. 26 illustrates one embodiment of a package and hook assembly designed, manufactured, and operated according to one or more embodiments of the disclosure FIG. 27 illustrates an alternative embodiment of one embodiment of a package designed, manufactured, and operated according to one or more embodiments of the disclosure FIG. 28 illustrates an alternative embodiment of one embodiment of a hook member designed, manufactured, and operated according to one or more embodiments of the disclosure FIG. 29 illustrates one embodiment of a Package Attachment designed, manufactured and operated according to one or more embodiments of the disclosure;

FIGS. 30 and 31 illustrate a hook and package separate from one another;

FIGS. 32-36 illustrate a slide and tape method for coupling a hook member to a package;

FIG. 37 illustrates an alternative embodiment of a rotating latch member designed, manufactured and operated according to one or more embodiments of the disclosure;

FIG. 38 illustrates one embodiment of a receiving angle;

FIGS. 39 and 40 illustrate one embodiment of a split cone design designed, manufactured and operated according to one or more embodiments of the disclosure;

FIGS. 41A through 41C illustrate Offset Peak Geometry Drawings, for example to show the geometry of how offset peaks can be configured to prevent Jamming;

FIGS. 42A and 42B illustrate Offset Peak with Changing Slope drawings, showing how one (or both) of the surfaces leading to the Offset Peak can change slope;

FIG. 43 illustrates one example of Jamming and Peak Sticking for a three pin hook;

FIG. 44 illustrates yet another example of possible Jamming or Peak Sticking for a two pin hook;

FIG. 45 illustrates one embodiment of pins according to the disclosure;

FIG. 46 illustrates an alternative embodiment of a three pin hook;

FIG. 47A through 47C illustrate additional landing concepts;

FIG. 48A illustrates an alternative embodiment of a latch assembly designed, manufactured and operated according to one or more embodiments of the disclosure;

FIG. 48B illustrates that the rotating latch assembly need not include upper limits for each of the channels, and thus may include a pathway instead;

FIGS. 49 through 51 illustrate one embodiment of a hook assembly having an anti-tilt opening therein, manufactured and operated according to one or more embodiments of the disclosure; and FIGS. 52 through 54 illustrate one embodiment of a rotating latch assembly having an anti-tilt post configured to engage with an anti-tilt opening in the hook assembly, manufactured and operated according to one or more embodiments of the disclosure.

DETAILED DESCRIPTION

Definitions

Active Time—Time spent in Drone Active Mode in a single Work Cycle.
Allowable Bearing Angle—The maximum title angle allowed by the bearing system.
Angular Misalignment—The angular difference between the central axes of the Hook and the Latch.
Arm—Arm refers to the component of the frame attached to the upper and lower plates and supporting the motors.
Balanced Flight—Flight where the payload is mostly centered with respect to the propellers (not imbalanced).
Base Delivery Truck—A vehicle (truck, van, larger drone, boat) with one or more base stations and a set of packages. The Base Delivery Truck could have some level of robotics to assist drones in picking up the packages, or it could have the packages pre-organized so the drones pick up the packages without assistance.
Base Station—A collection of devices that could facilitate landing of a drone, exchange of a battery, and/or charging of batteries. It could include a power source.
Bearing—The bearing assembly that holds the Latch. Typically this will allow for limited angular, axial, and radial movement.
Bell—This is an extension of the LCD, extending downwards and increasing in diameter. This is configured to contact the Pins when the Hook and Latch are misaligned and help realign the two.
Cam Diameters—On the Latch (LCD), this is the approximate outer diameter of the cam surfaces (which might be conical to some degree, possibly to allow for injection molding). On the Hook (HCD), this is the diameter of a circumscribing circle of the pins on the hooks.
Catch Surface—The surface leading to the Lower Vertical Limit, guiding the Pin from the First Upper Vertical Limit
Charge Station—A Base Station that charges a landed drone directly.
Charge Time—Time spent in Drone Charge Mode in a single Work Cycle.
COM—Center of Mass.
Conventional Drone—A drone with only rechargeable batteries.
Cycle Time—The time it takes a drone to complete a full Work Cycle.
Direction—For the purposes of this explanation, the latch is positioned above the hook with opening of the latch facing downwards to the hook to receiver the pins.
Disengage—When the Latch moves downwards with respect to the hook, moving the pins from the Lower Vertical Limit to the Second Upper Vertical Limit, thus priming the system to release the hook.
Disengagement Failure—This refers to when the Latch attempts to disengage the Hook, but fails. This could happen if the Pins start at the Lower Vertical Limit, and then as the Payload is rested on the ground, there is enough angular momentum back in the direction of the First Upper Vertical Limit that the Pins move towards the First Upper Vertical Limit, rather than the Second Upper Vertical Limit.
Drone—This may refer to a multi or single rotor, unmanned copter, but in most cases, it can also include other robots and even manually operated cranes.
Drone Active Mode—Drone is actively completing desired tasks, draining battery.
Drone Charge Mode—Drone is at a Charge Station.
Drone Efficiency Improvement—The number of additional Conventional Drones a similarly configured Swappable Battery Drone can replace in terms of Active Time.
Drone Return Mode—Drone is returning to or from the base-station, draining battery, but not doing desired tasks or charging batteries.

Drone Swap Mode—Drone is actively swapping a battery at a Swap Station. This is part of the Drone Return Mode because it will swap batteries in the same motion as landing.

Engage—When a Latch receives a Hook and the Pins reach the First Upper Vertical Limit, thus priming the system to be able to lift the Payload.

Engagement Failure—This refers to when the system attempts to engage the Hook, but fails. This can be due to Jamming or Peak Sticking, especially if it falsely triggers the Engagement Sensor.

Engagement Sensor—A sensor (often a switch or array of switches) configured to detect when the pins have reached a Vertical Upper Limit. Different kinds of sensors can be used to detect which Upper Limit was reached, or the same Engagement Sensor can be used for all of the Vertical Upper Limits.

Exit Surface—The surface leading to exit the Latch, guiding the pin out after reaching the Second Upper Vertical Limit.

First Peak—This is the offset peak that is furthest from the Vertical Limits, and thus, likely the first to engage with the Pins.

Height Offset at Max Tilt—This is the vertical offset of the ends of the two pins at Maximum Latch Tilt. This value can be closely approximated by this equation:

Height Offset at Max Tilt=HCD*sin (Maximum Latch Tilt)

Hook—The hook portion of the Rotating Tension Latch. This contains the pins that act as the cam followers. Hook refers to the part of the latch that remains attached to the package and mates with the lifter during engagement of the latch.

Imbalanced Flight—Flight where the payload is substantially (e.g. by 5% or more of the maximum distance between propellers) off centered with respect to the propellers.

Inner Bearing—This part of the bearing if rigidly attached to the latch and contained within the Outer Bearing.

Internal Battery—Here this term is used to describe a battery that cannot be automatically exchanged.

Jamming—When two or more Pins initially engage the Latch in such a way that they urge rotation in opposite directions, preventing rotation and further progression of the Pins through the Latch.

Latch—The latch refers to the system designed to engage and disengage a package, which includes both the lifter and the hook. The latching portion of the Rotating Tension Latch. This contains the contours of the cam.

Leg—Leg refers to the components of the frame that connect to the arms and keep the drone body above the ground, as well as assisting in the pickup system.

Lifter—The lifter refers to the part of the latch that remains attached to the drone and mates with the hook during engagement of the latch.

Lower Vertical Limit—This is the primary engaged position of the Rotating Tension Latch where the hook is held by the latch. A payload that is being carried by a drone would have a latch that is at the Lower Vertical Limit.

Maximum Detection Tilt—This is the maximum angle the latch can be tilted and still trigger the Engagement Sensor.

Maximum Latch Tilt—This is the maximum angle the latch can tilt within. This can be controlled by the bearing, possibly by the Switch or Switch Array.

Maximum Rotational Deviation—Given a pin positioned on the LCD, this is the angle between the other Pin if the Hook if it crossed the central axis of the Latch and a Pin on a hook at Worst Case Hook Offset with respect to the central axis of the Latch Offset Peaks—Peaks where one or more are configured to be different vertical distances from the Vertical Limits.

Outer Bearing—This is the part of the bearing that is attached to the Drone and houses the Inner Bearing. It also may contain the sensors.

Payload—Any package, container, or item that is lifted and moved. It could be a package for delivery, a shipping container, etc. The hook may be on the Payload.

Payload Sensor—A sensor (often a switch) configured to detect the presence of a Payload, often by depressing a switch when the pins are at the Lower Vertical Limit.

Peak—The first point on the cam surface of the latch configured to interact with the pins and support guided rotation.

Peak Sticking—When one or more Pins engage close to or directly with a Peak, and thus do not urge enough rotation to rotate the Latch or Hook. Generally, this can occur when the Peaks are nearly perfectly aligned with the Pins. This differs from Jamming, where the Pins urge rotation, but they oppose each other.

Pins—The cam followers on the hooks. They do not necessarily need to be cylindrical.

Pitch—Rotation of the drone around the side-to-side axis.

Radial Misalignment—The separation between the central axes of the Hook and the Latch.

Receiving Diameters—On the Latch (LRD), this is the approximate inner diameter of the cam surfaces (which might be conical to some degree, possibly to allow for injection molding). On the Hook (HRD), this is the diameter of a circumscribing circle for the supporting portion of the pins that must fit within Receiving Diameter of the Latch. The HRD can be much less than the LRD, though closer values will help with Angular Misalignment and mechanical strength of the hook.

Return Time—Time Spent in Drone Return Mode in a single Work Cycle.

Roll—Rotation of the drone around the front to back axis.

Rotating (Rotation) Tension Latch—one or more embodiments of such described in Patent: U.S. Pat. No. 9,677,590B2, which is fully incorporated herein by reference.

Rotational Alignment—The rotational position between the Peaks and the Pins. A Rotational Alignment of 0 degrees would mean the Pins and Peaks are rotationally aligned, though not necessarily radially aligned.

Should—This term, as used herein, unless otherwise state, should not be construed as "must", but otherwise construed as "can" or "could".

Standard Counter Height—This is the typical vertical distance between a Peak that is not offset, and the First Upper Vertical Limit or the Second Upper Vertical Limit, whichever is greater.

Swappable Battery Drone or Swappable Drone—A drone that has at least one battery that can be exchanged at a Swap Station.

Swap Station—A Base Station that allows swapping of batteries and charges batteries that are not in use.

Swinging—When the Hook swings within the Latch while it is at the Lower Vertical Limit. This might only be an issue for configurations with only two Pins.

Switch—For the purposes of this explanation, this is typically a push-button (e.g., electronic) switch that is normally open. Different kinds of switch logics can be used.

Switch Activation Distance—The distance the button has to travel on a Switch to engage.

Switch Actuation Force—The force required to depress the Switch button.

Switch Array—Multiple Switches configured to, among other things, provide additional reliability. The array may be in series, so that all must be activated for the circuit to close. However, the Switch Array can be in parallel, or can each have its own logic output if desired.

Switch Depression Distance—The distance the button can travel without bottoming out.

Topping Out—When the Inner Bearing is pushed upwards to its limit. This may happen when the Pins are at an Upper Vertical Limit and push upwards on the Latch. This could trigger the Engagement Sensor. However, Topping Out can also happen on Jamming and Peak Sticking, which could also trigger the Engagement Sensor.

Uptime—The percentage of time in a drone's Work Cycle that it is in Active Mode.

Vertical Limits—Limits within the Rotating Tension Latch system that limit vertical movement of the pins. This may include the First and Second Upper Vertical Limit and the Lower Vertical Limit.

Work Cycle—The full cycle of Drone Active Mode to Drone Return Mode to Drone Charge or Swap Mode to Drone Return Mode and back to Drone Active Mode.

Worst Case Hook Offset—This is where the Hook's Pins are both touching the LCD. This gives the maximum offset between the central axis of the Hook and Latch. This value can be approximated using this equation:

$$\text{Worst Case Hook Offset} = \sqrt{\left(\frac{LCD}{2}\right)^2 - \left(\frac{\cos(\textit{Maximul Latch Tilt}) * HCD}{2}\right)^2}$$

Yaw—Rotation of the drone about the vertical axis.

The present disclosure, in at least one embodiment, provides an advanced rotating tension latch. The advanced rotating tension latch may be incorporated onto and/or with delivery drones in place of traditional actuator-based systems to alleviate many of the limitations discussed above. Since the advanced rotating tension latch can engage and disengage with a simple, repeated motion, in addition to the fact that it functions without an actuator and is very lightweight, improved and further automated drone package pick up, flight, and delivery may be enabled. In at least one embodiment, the advanced rotating tension latch includes many features of the rotating latch disclosed in U.S. patent application Ser. No. 17/076,630, entitled "Rotating Tension Latch," filed Oct. 21, 2020, as well as disclosed in U.S. Pat. No. 10,844,894, entitled "Rotating Tension Latch," filed Jun. 12, 2017, the entirety of which are incorporated herein by reference.

Figure 1:
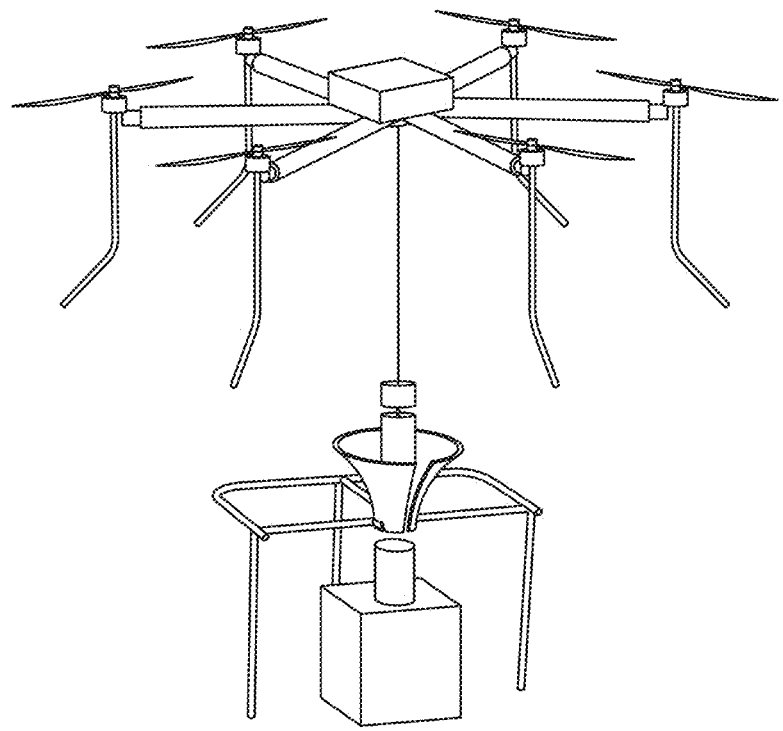
Figure 2:
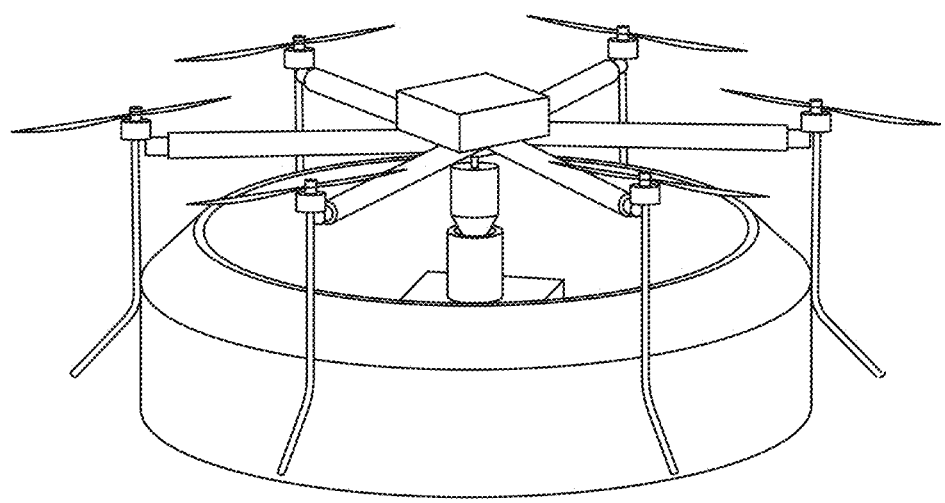

When designing how the advanced rotating tension latch attaches to the drone, there were two primary design categories considered, a fixed design and fixed-length tether design, as well as retractable tether could be used. Turning to FIGS. 1 and 2, illustrated are one embodiment of a fixed design and a fixed-length tether design according to one or more embodiments of the disclosure. Since there is very little readily available research on drones carrying any type of package or excessive weight, the present disclosure performed preliminary testing to validate its theoretical assumptions. Testing was used to gain knowledge on how the location of the package affected flight as well as how the type of attachment affects the drone's ability to mate with a package under different conditions.

The present disclosure recognized that the benefits of the fixed design include better flight performance and a more compact design. Better flight performance includes flight time of the drone, flight speed and more; these improved primarily as a result of increased package stability. The major downsides to the fixed design are increased precision requirements on pickup, drop-off descent requirements and lack of large variability in package size and geometry. All of the challenges caused by fixed latch designs can be solved using a companion pickup system.

The present disclosure recognized that the benefits to the fixed-length tether design include a decrease in pickup precision requirements, as well as the reduced component weight and simplicity of design. The decrease in precision needed was validated through pre-prototype testing using a 3D printed cone as a pickup system. With the cone, the drone's acceptable range of precision for pickup mating increased from a couple millimeters to approximately 15 centimeters. The downsides to a fixed-length tether design are a decrease in flight performance of drone with package, increase sensitivity to wind, and an increase span of the drone with package. A motorized/retractable tether design was also considered however, because of the added weight, increased complexity and sponsor design requests, such a design may be difficult to deploy.

The fixed-length tether design, in one example, was selected for its combination of flight performance benefits and reduced wind sensitivity. Preliminary experiments revealed that oscillation of the package underneath the drone was a major risk factor with a fixed-length tether design. Wind or minor flight disturbances could set the package continuously swinging and the drone was not able to adequately keep up with the necessary throttle corrections. Even with the swinging from the wind, the fixed-length tether design was able to execute connection to package with ease. Though the fixed-length tether design may have performed better in an indoor setting with controlled weather, the fixed-length tether design better suits solving limitations of existing systems.

In selecting the appropriate pickup system there were a number of major factors affecting the choice, some of which conflicted with one another. Three of these major factors include: (1) capability to reduce precision requirements for autonomous navigation, (2) capability to handle variable package sizes and (3) simplicity of design implementation.

Precision is a simple enough concept, meaning that the pickup system could provide the drone with an x, y and z directional tolerance large enough to ensure pickup is consistently achieved. The expectation for necessary tolerance was based on preliminary testing conducted and the results of Ardupilot community (open-source autonomous drone software community) results (ArduPilot Dev Team n.d.). In at least one embodiment, the precision was determined to be a circle with a diameter of approximately 30 cm in the xy plane (parallel to the ground). This means that the drone can be expected to be accurate to within 30 cm of any given point when it begins its descent to engage a package for pickup.

Capacity to handle variable package sizes is also a simple concept. In at least one embodiment, the system should be able to handle multiple package sizes (within reason) without requiring the construction of another custom pickup system.

Simplicity of design implementation is the most abstract concept of the batch, however within this constraint were a few more concrete requirements. These included: 1) Minimal secondary motors/automation outside of package loading, 2) Low-cost design, 3) Portability (The system could reasonably be built/operated in most locations), and 4) the ability to easily reproduce the system.

Figure 3:
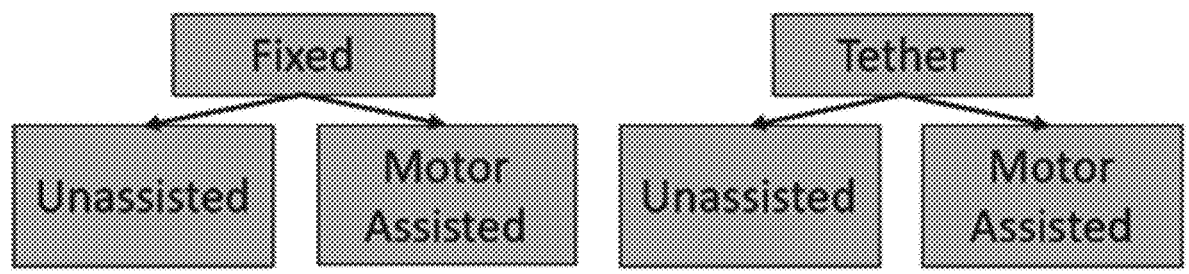
FIG. 3 illustrates four known method of pickup.

In the process of developing a final design for the pickup system, various concepts for each of the four methods of pickup shown in FIG. 3 were generated. These designs are explained as follows:

Fully Motorized Secondary Robots: initial designs explored robotic, automated assistive devices that could manipulate the drone either by directly grabbing and moving it or by moving it via a conveyor belt that it could land on. Though they served as an intuitive starting point for concepts, these did not meet the simplicity of design constraint. These designs could potentially be used for both fixed and tether conditions.

Motorized Cone: In order to meet the simplicity of implementation constraints the present disclosure looked to simplify the design and tried to minimize the complexity of our assistive robot/motor. This resulted in a motorized cone design. This consisted at least in part of a cone allowing the deployment of a fixed or variable length tether into a cone which could then be split apart by a motor. This design could be further developed to a non-motorized version.

Motorless Cone and Inverted Cone Designs: The next iteration of pickup designs focuses again on minimizing motor requirements on the pickup side. Improving on the motorized cone design meant the development of the two designs show in FIGS. 1 and 2. The tethered motorless cone concept of FIG. 2 removed the motor requirement discussed above and the "Inverted Cone" design redefined the concept to apply to a fixed latch method of pickup. Both do not require motors during the pickup process.

Fixed Latch Inverted Cone Alternatives: Following the designs in FIGS. 1 and 2 it was determined that a cone design (or similar concept) could be ideal, best balancing the constraints. While implementation of a tether design might be easier for proof-of-concept, a fixed attachment design could be most useful. However, the original cone design in FIG. 1 addressed tethered latch solutions and so it was desired to adapt this design to work with a fixed latch. This led to the design of alternate versions of the design shown in FIG. 2. The first set of these necessitated a custom package and drone legs to operate. These designs introduced the concept of using the drone legs as part of the pickup system, which could lead to the development of the final version. It was desired to have a pickup system that did not require a custom package and could instead work with any package, even one retrofitted. The design that satisfied this requirement also satisfied other constraints, and was ultimately selected as one design. This design is explored in more detail in the chosen design section.

Many different frames, motors and propellers, flight controller boards, and companion computers were considered throughout the process of finalizing the design. Final decisions were made based upon cost, performance specifications, potential for modification, availability of compatible components and software, and weight.

Figure 4:
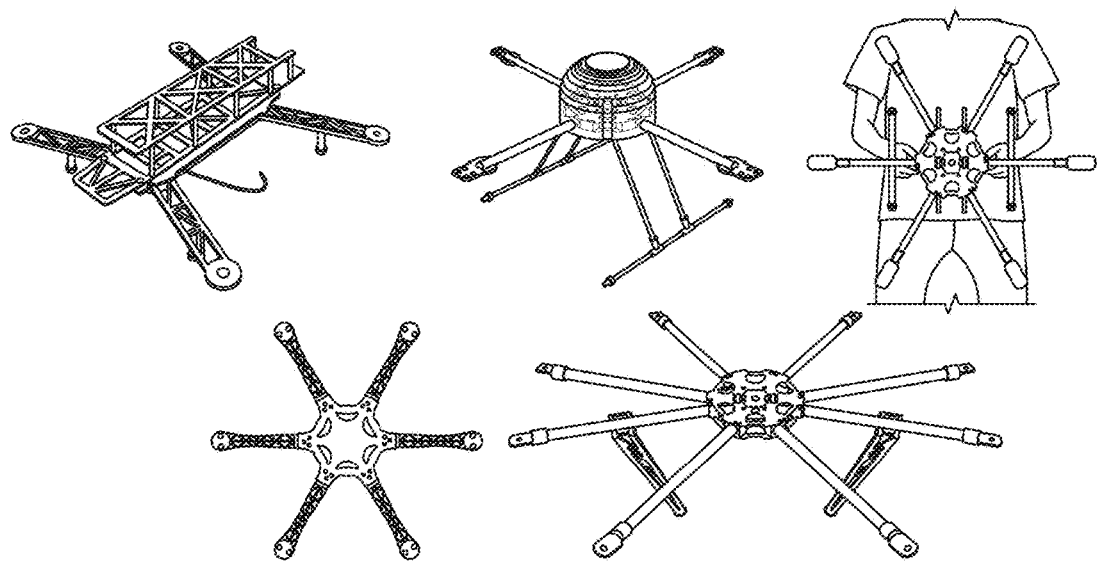
FIG. 4 illustrates several different frames considered.

In deciding on a frame, a quad copter (four arms and motors), hex copter (six arms and motors), and octo copter (eight arms and motors) were compared. Quad frames offer the most commercially available options, due to their popularity with hobbyists and wide variety of applications from drone racing to camerawork. Hex frames are less popular but grant additional control and can fly even in the case of (a single) motor failure. Octo frames are significantly less commercially available and heavier, but they offer the best control and redundancy in case of motor failure. FIG. 4 illustrates several different frames that were considered. Similarly, Table 1 below summarized the specifications for the various different frames in FIG. 4. In Table 1, the style of frame, propeller size, weight, cost, and diagonal prop-to-prop measurements are considered. In FIG. 4, the following drone frame considerations are as follows from top left to bottom right: Dart 450, Turnigy H.A.L., Tarot 680 Pro, Flamewheel 550, and Tarot Iron Man 1000s.

TABLE 1

Considered Drone Specifications

| Frame Name | Style | Propeller Size | Weight | Cost | Diagonal Dimension |
|---|---|---|---|---|---|
| Dart 450 | Quad | 10 inches | 399 g | $ 26.90 | 435 mm |
| Turnigy H.A.L. | Quad | 8-10 inches | 614 g | $ 31.00 | 585 mm |
| Tarot 680 Pro | Hex | 10-13 inches | 810 g | $179.00 | 695 mm |
| Flamewheel 550 | Hex | 8-10 inches | 800 g | $ 36.00 | 550 mm |
| Tarot Iron Man 1000s | Octo | 13-15 inches | 1450 g | $260.00 | 1070 mm |

Any of these frames are capable of supporting a full drone build capable of meeting the minimum requirements. In selecting the frame, one choice is to select the lightest one which can still support the payload. Compared to quad copters, hex copters have increased controllability as well as the ability to fly even if one motor fails. Compared to hex copters, octo copters have a slight advantage in controllability and redundancy of motors, but the advantage is not always worth the increased weight and cost with an octo-copter. Increased weight reduces maneuverability in the air and decreases maximum flight time. The choice of the frame is at least partially tied to the budget. For a total budget of $2000, quad frames might not offer the controllability required for this project, and that quality octo copter frames were too costly for the small benefit they offered over hex copters. In deciding between hex frames, the Tarot and Flamewheel 550 (see Table 1) offered very similar performance specifications in terms of maximum propeller size.

Figure 5:
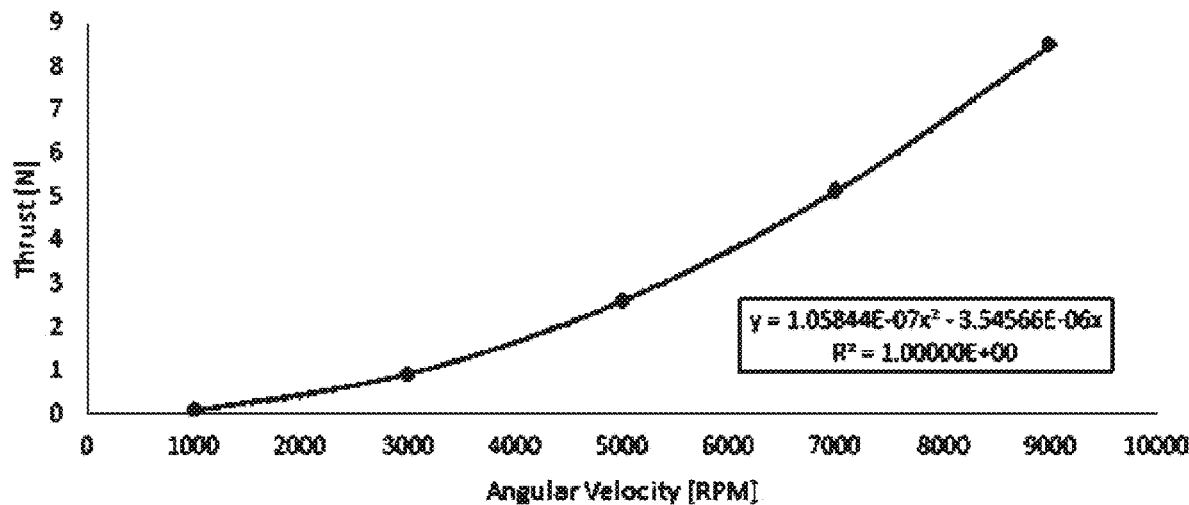
FIG. 5 illustrates a relationship between thrust and angular velocity for the 10-inch propeller.
Figure 6:
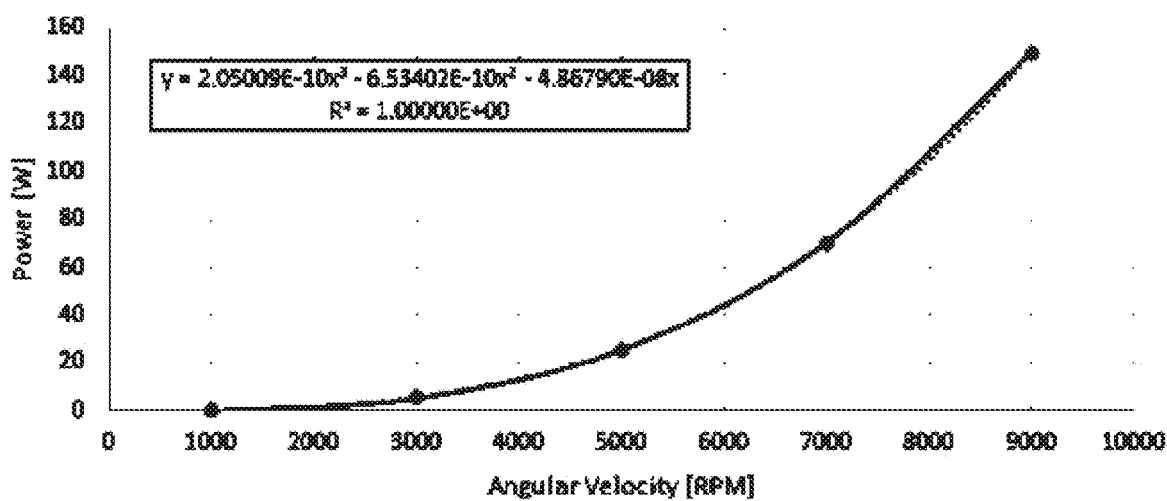
FIG. 6 illustrates a relationship between power and angular velocity for the 10-inch propeller.
Figure 7:
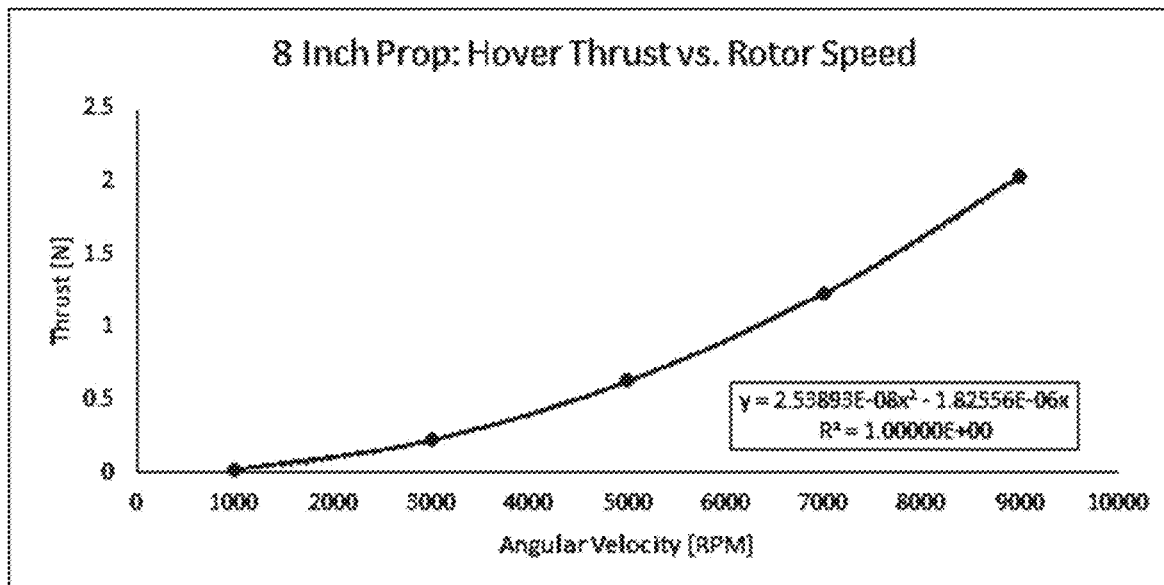
FIG. 7 illustrates a relationship between thrust and angular velocity for the 8-inch propeller.
Figure 8:
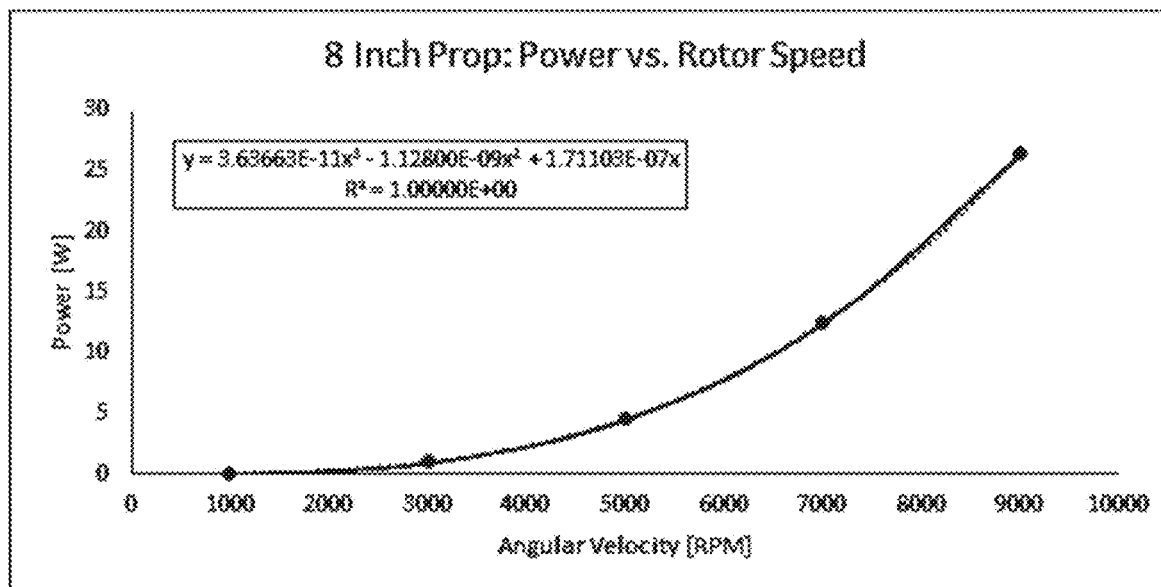
FIG. 8 illustrates a relationship between power and angular velocity for the 8-inch propeller.

After settling on the frame size, a blade-element momentum (BEM) analysis was conducted using an open-source software called JBLADE to estimate the performance parameters of two propeller sizes as well as the required motor performance specifications. Since the geometry of commercially available propellers is not publicly available, generic two-blade propellers were modeled in JBLADE using a fixed pitch of 15° and the NACA 2410 airfoil for the blade cross-section. The first propeller simulated had a diameter of ten inches and a chord length of approximately 0.75 inches. The second propeller simulated had a diameter of eight inches and a chord length of approximately 0.6 inches. The BEM analysis provided estimates of the propeller thrust and the propeller power as functions of the angular velocity during hover. The relationship between thrust and angular velocity for the 10-inch propeller is shown in FIG. 5 while the corresponding relationship between power and angular velocity is shown in FIG. 6. The relationship between thrust and angular velocity for the 8-inch propeller is shown in FIG. 7 while the corresponding relationship between power and angular velocity is shown in FIG. 8.

Simple propeller theory suggests that the propeller thrust and the torque are proportional to the square of the angular velocity of the propeller. Thus, a quadratic regression curve was used to interpolate the values of the propeller thrust from the BEM simulations. Since the propeller power is the product of the torque and the angular velocity, a cubic regression curve was used to interpolate the values of the power from the BEM simulations. These regression curves were used to obtain better analytical models of the thrust and power of the simulated propellers as functions of the angular speed.

The optimal propeller for drone applications is the smallest propeller that produces the required amount of thrust. A smaller propeller is preferred because it has a smaller moment of inertia, which decreases the response time of the motors and therefore improves the maneuverability of the drone. The results from the BEM simulations show that the 10-inch propeller is capable of providing significantly more thrust than the 8-inch propellers. Thus, the 10-inch propellers are likely more suitable for lifting packages.

The BEM analysis of the propellers was used to guide the selection of the motors. In order to achieve the desired thrust from the propellers, the motors had to be capable of a sufficient amount of power. Additionally, the motors needed to compatible with the selected frame so that they could be assembled on the drone. The selected motor that satisfies these constraints is the ReadyToSky 2212 brushless motor.

The motor manufacturer reports that the motor has a speed constant of 920 rpm/V and a maximum operating voltage of 12 V. Thus, the motor has a maximum operating speed of 11,040 rpm. Using the quadratic regression curve from the BEM analysis, the maximum thrust that could be produced by six 8-inch propellers is 18.57 N, which is enough force to lift a total mass of 1.893 kg. Since the drone has a mass of slightly under two kg without a package, the 8-inch propellers are not suitable. Therefore, the 10-inch propellers, which provide significantly more thrust at lower angular velocities, were selected for the final design.

At the operating speed of the motors, the BEM analysis predicts that six 10-inch propellers could produce 77.4 N of thrust, which is enough force to lift a total mass of 7.89 kg. However, the power required per motor to produce this much thrust is approximately 276 W, which exceeds the maximum power output of the motor. The maximum power output of the motor is 105 W. At the maximum power output of the motor, the propeller angular velocity is 8000 rpm. If all six 10-inch propellers spin at 8000 rpm, the total thrust force might be 40.65 N which is enough force to lift a total mass of 4.14 kg. Since the predicted lifting capabilities of the drone using the selected motors and propellers exceeds the minimum requirements specified in the project definition, no further analysis was required.

It is important to emphasize that the results of the BEM analysis are rough estimates, especially since the geometry of the propellers was highly simplified. Since the propellers were relatively inexpensive, sets of 10-inch and 8-inch propellers have been purchased. Initial tests using the 10-inch propellers have confirmed that selected combination of motors and propellers can provide enough power and thrust to easily lift the weight of the drone and the additional weight due to a package. However, further testing might be required to determine the maximum load capacity of the drone using both 10-inch and 8-inch propellers.

As an alternative to the Pixhawk 4, two flight control boards were considered: the Pixhawk 2 and ArduPilot 2.8 Mega. The most essential quality of any flight controller to be considered is that it could be compatible with Mavlink, ArduPilot, and Mission Planner. Without taking advantage of these preexisting protocols and libraries the design of autonomous flight could have required far more time than is available. This software/firmware suite works together to allow for the full automation of drone flight, including takeoff, placement of GPS waypoint marker, optional python scripting to control flight operations, and landing. All three of these flight control boards were initially selected for consideration because they were compatible with this software suite.

The decision between the Pixhawk 4 and Pixhawk 2, was made based on compatibility with ArduPilot and its software/firmware suite. Pixhawk 2 was available to the team for free and was used for preliminary testing. However, initial attempts to load the Pixhawk 2 with the most recent firmware showed that it was difficult to properly format, and older firmware was easily flashed. Once the appropriate firmware was loaded, the Pixhawk 2 was still sluggish in responding to instructions from Mission Planner. This experience confirmed that Pixhawk 4 was the better choice than Pixhawk 2. To decide between the Pixhawk 4 and ArduPilot 2.8 Mega, the number and quality of sensors and processors was considered. The ArduPilot 2.8 Mega is compatible with Arduino, and includes a 3-axis gyrometer, accelerometer, barometric pressure sensor, and a 16 MHz processor. In contrast, the Pixhawk 4 has significantly better computational power: it can communicate with any companion computer capable of I2C communication (including Raspberry Pi, Arduino, and other Linux boards like BeagleBone), includes a 3-axies gryometer, accelerometer, barometric pressure sensor, and a 216 MHz processor. Even though the ArduPilot 2.8 Mega costs $50 and the Pixhawk 4 costs $180, the improved computing and capability of the Pixhawk 4 makes it the best choice. This is especially important, as in order to exert precise control over drone flight, the Raspberry Pi might need to communicate rapidly with the Pixhawk 4 to relay information from external cameras for close-range targeted landing.

The selection of the companion computer was based upon computing power and available resources. All of the models of Arduino and Raspberry Pi were initially considered. Arduino, useful for rapid input and output reads of digital and analog signals, seemed to be well suited to reading in simple sensor data and outputting a signal to the Pixhawk to control the flight. However, the Raspberry Pi is python-based and can therefore utilize a wide availability of python-based libraries designed to interface with the Computer vision system camera and Mission Planner software making it a more ideal choice over Arduino. Additionally, the Raspberry Pi 4 B has a substantial computational advantage over the Arduino boards. The fastest Arduino processor available is on the Arduino Due model, with 84 MHz paired with 96 KB of RAM. By contrast, the Raspberry Pi 4 B has 4 GB of RAM, and a 1.5 GHz processor. There is no significant difference in the cost of the Ardunio Due ($30) and the Raspberry Pi 4 B ($50). In order to handle complex and rapid input from the Computer vision system camera, the Raspberry Pi 4 B was selected over the Arduino Due.

The last portion of the drone design to be considered is the sensors used in close-proximity positioning of the drone as it interacts with the pickup system. GPS positioning alone, based on preliminary tests with the prototype drone, is capable of landing the drone within 30 cm of a target defined by a GPS waypoint. However, in order to pick up a package with the final pickup system, an accuracy of 10 cm is needed. The first sensor considered in aiding close-proximity drone positioning was an IR beacon in combination with IR-lock open source software. This method relies on an IR beacon placed on the target (in this case, the package or pickup system), and a modified camera which picks up the IR beacon's position and directs the drone's flight towards it. This technique has been used by many hobbyists, but is mostly useful for dynamic targets, as it allows drones to follow the IR beacon as it moves. In terms of accuracy, drones utilizing this technology are accurate to within ~20 cm of the IR beacon. Additionally, it is impossible to determine the orientation of the target, since the IR beacon is symmetrical in its output signal.

As an alternative to the IR beacon, an object-recognition camera was proposed. The Computer vision system is an open-source and commercially available camera used for simple object recognition (based upon color and color-code recognition) and can be trained to recognize new colors and spatial orientation. It hosts its own on-board machine learning algorithms which can are trained on user-determined data sets, enabling our design to detect objects, which can be used for precision flight. Although there is no documentation of the Computer vision system for precision landing in the past, it has been widely used for object recognition and implemented into simple automation tasks (PixyCam n.d.). Furthermore, its easy integration with Raspberry Pi and the Pixhawk4 make it ideal for identifying the target landing location. By mapping the number of pixels which are taken up by the target, the objects expected size can be used to calculate the distance from the target object. Lastly, by orienting the coloring of the target in a specific way, the Computer vision system can detect the orientation of the object, allowing for automated control over the yaw of the drone. Thus, the Computer vision system was selected to be the external sensor to aid in close-proximity precision landing of the drone over the IR beacon and IR-lock technology.

Figure 9:
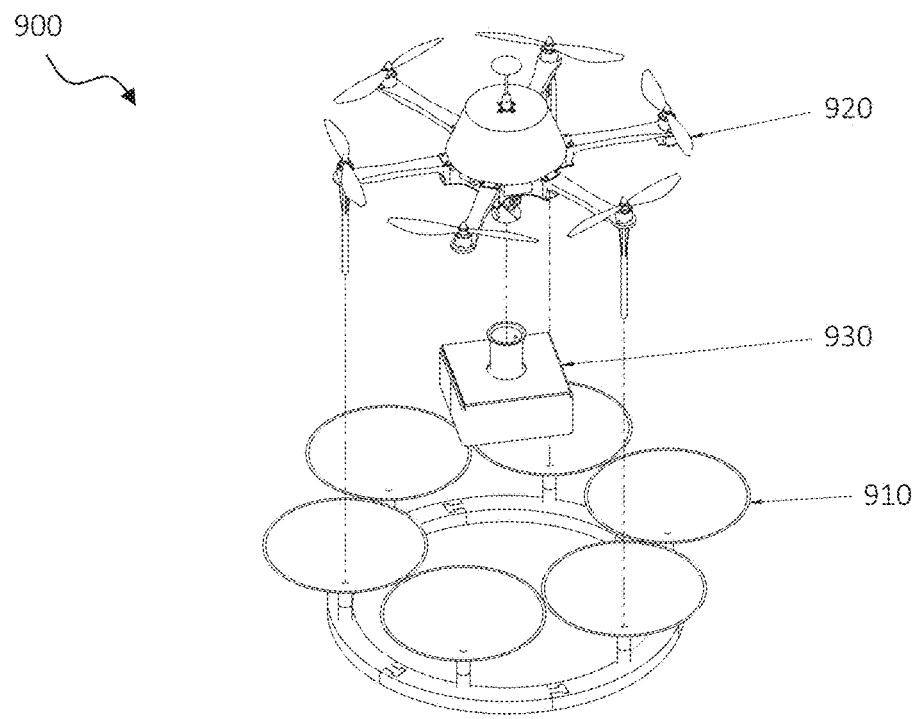
FIG. 9 illustrates an overview of one full assembly designed, manufactured and operated according to the disclosure.

The illustrated design has been broken into three distinct sections. These include (1) the pickup system, (2) the drone itself, and (3) the package. Within each of these major sections are further subsections; each subsection falls into a major section based on the purpose of the subsection. For example, drone components power, maneuver and position the drone, pickup system components are external to the drone but amplify the precision of pickup and package components constitute the payload being mated to the drone and supporting components etc. An overview of the chosen design is shown in FIG. 9, which illustrates one embodiment of a full assembly 900. The full assembly 900 includes a pickup system 910, a drone 920, and a hook assembly 930.

Figure 10:
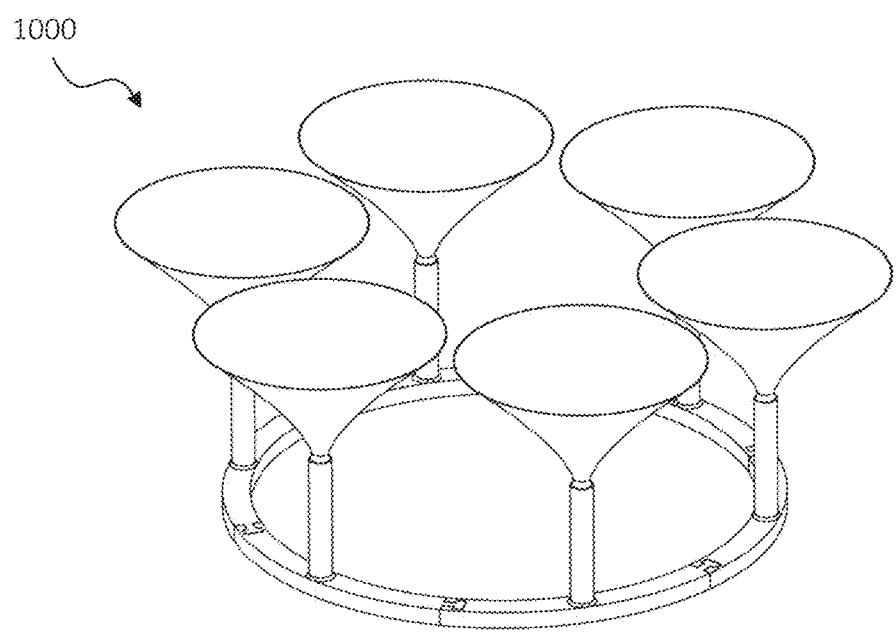
FIG. 10 illustrates an overview of one pickup system designed, manufactured and operated according to the disclosure.

Out of the many ideas for the pickup system, we decided to go with a combination of our top two choices. This final design uses a modular approach which is 3D printable, more cost effective for our sponsor, and is commercially viable. This approach also allows for various cone sizes to be used, which can open up more opportunities for even more package sizes. An overview of the pickup system 1000 is shown in FIG. 10. The pickup system reduces the amount of accuracy needed in lateral and longitudinal positioning of the drone with respect to the package and hook.

The pickup system consists of six base structures (called cone connectors) attached to six 3D printed cones assembled through a dovetail design that allows them to be transported independently before assembly. The size of the circle (275 mm radius) is determined based upon the size of the drone frame body and the placement of the legs. Based upon geometrical calculations (e.g., shown below), the six cones are each 137.5 mm in radius. Using six cones rather than three allows for greater freedom in drone rotational control. The cones are set at a 30-degree angle from the plane parallel to the top of the cone after assumptions of the coefficient of friction and using a conservative approach after calculating minimum angle. A conservative scale factor was added to the calculated minimum angle due to the ridging on 3D printed ABS. The ridges are a natural result of the 3D printing process and might cause the friction factor to be larger than anticipated considering simply ABS on ABS, requiring a conservative factor of safety.

Does not need 6 cones of such large size. 3 cones is sufficient (possibly 2), and they only need to have a diameter large enough to receive the legs for a drone with a given accuracy. The better the drone can control its position the smaller the diameter the cones need to be.

Figure 11:
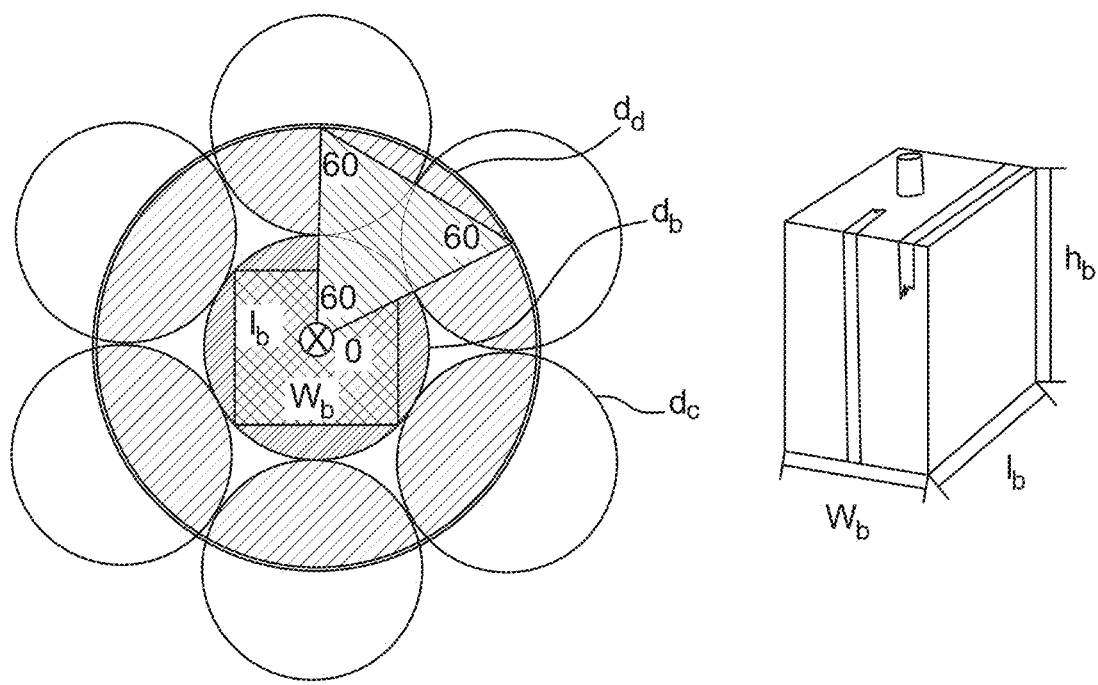
FIGS. 11 and 12 illustrate what the parameters of certain equations are referencing.
Figure 12:
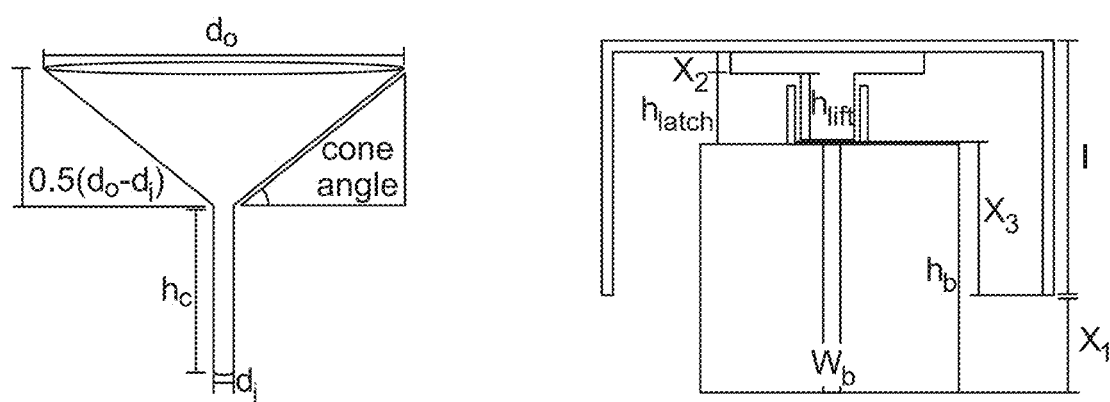

The following are equations to justify cone, leg and package dimensioning: FIGS. 11 and 12 show what the parameters the following equations are referencing. The diameter of the drone ($d_d$) is 550 mm and thus the diameter of each of the cones is 275 mm.

The following are definitions of parameters:
l=Length of leg
$x_1$=Bottom of package to bottom of legs
$x_2$=Height of latch attachment
$x_3$=Lifter to leg distance
$x_4$=Height of top of cone-height of top of hook
$d_c$=Diameter of the cone (of the pickup system)·
$d_d$=Diameter of drone (where legs connect)·
$d_B$=Diameter of box placement area
$d_o$=Outer diameter of cone
$d_i$=Inner diameter of cone
$h_B$=height of box
$w_B$=width of box
$l_B$=length of box Because $\varnothing d_c \leq d_d - \sqrt{w_B^2 + l_B^2}$ and $d_B = \sqrt{w_B^2 + l_B^2}$ we can formulate a restricting equation for the diameter of the cone to be Equation 2: $\varnothing d_c \leq d_d - d_B$ To determine the cone angle, the assumption that the coefficient of friction for ABS on ABS was µ≈0.5. Using $\tan^{-1}(\mu) = \theta$, the minimum of angle for the legs to slide down the cone was calculated according to the following: $\theta = \tan^{-1}(0.5) = 26.56°$.

Because $\leq x_2 + h_{latch} + h_b - x_1$, $x_3 \geq 1/2(d_o - d_i) - x_4$, and $l = x_2 + h_{lift} + x_3$, the relationship between positioning and dimensioning restraints can be simplified from $+h_{lift} + x_3 \leq +h_{latch} + h_b - x_1$ to $x_3 \leq (h_{latch} - h_{lift}) + h_b - x_1$. Using these constraints in an excel document, the package height was set to 52.42 mm and the leg length was set to 195 mm.

The three custom legs that function as the drone's landing gear also guide the drone as it descends onto the pickup system. The legs are cylindrical and have a diameter slightly smaller than the inner diameter of the guide cones. This allows the legs to slide into the cones and prevents the drone from moving in the planar direction as it descends vertically towards the package. Only three legs are required to center the drone on the pickup system (more than three points of contact could be redundant, and it is desirable to reduce weight on the drone) and function as landing gear. The legs attach directly below the drone motors. Ribbing was added to the leg base to improve the stiffness and strength of the leg. The bottoms of the legs are spherical to improve sliding on the surfaces of the guide cones. Lastly, since the legs have a complex geometry, need to be very light, and do not have to be support large forces, they might be 3D printed using nylon.

The leg length was selected to satisfy three constraints. The first constraint is that the bottom face of a package should hang below the bottom of the legs (during flight) by a distance greater than or equal to the distance required to release the latching mechanism. This ensures that the drone might be able to drop off the package without interference from the legs. The second constraint is that the bottom of the legs reach the bottom of the guide cones before the lifter on the bottom of the drone contacts the hook on top of the package during the pickup procedure. This ensures that the drone is centered relative to the package hook before the lifter engages with the hook. Third, the legs should be long enough that they reach the centering tubes before the drone arms or other components hit the cone lip. If they are too short they might not reach the centering tubes. Lastly, the leg length should be minimized (subject to the earlier constraints) to reduce material costs and weight. After applying these constraints, the leg length was set to 195 mm as calculated above.

Figure 13:
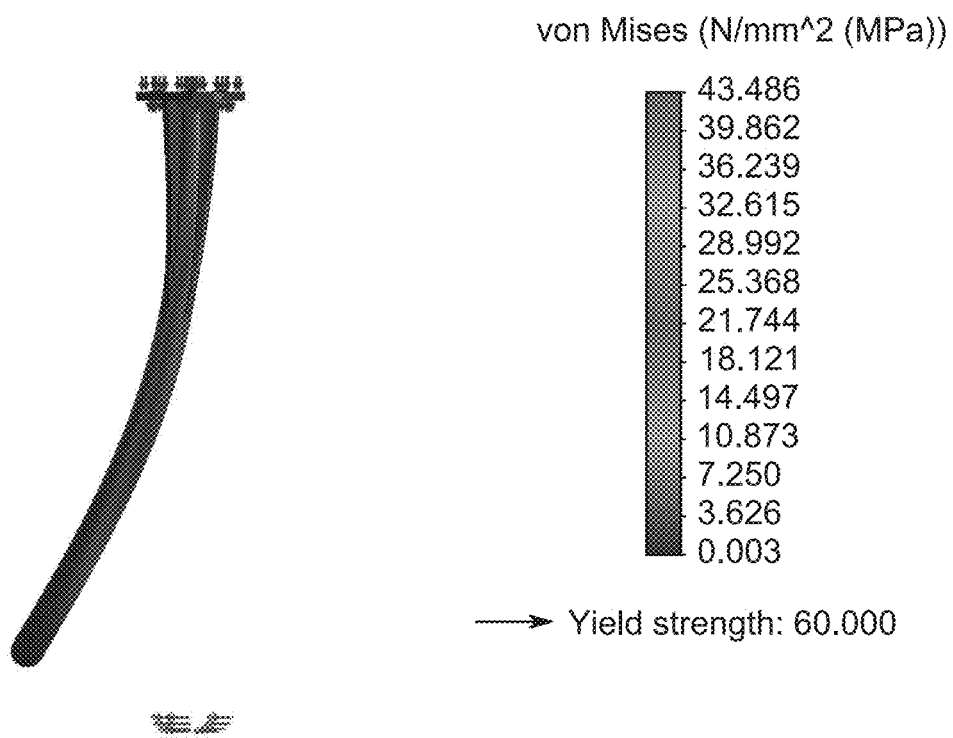
FIG. 13 illustrates certain Von Mises stresses.

The strength and stiffness of the legs was determined using finite element analysis (FEA) using SolidWorks Simulation. To determine the strength of the legs in response to a tip load, a static structural FEA simulation was conducted using nylon as the material. Large deformation analysis was enabled since nylon has a low elastic modulus and tends to have large displacements under load. A tip load of 20 N was applied orthogonal to the axis of the leg and fixed displacement boundary conditions were applied on the screw holes on the leg base. The von Mises stress field is shown in FIG. 13. The results from the static structural FEA show that the maximum von Mises stress is located at the end of the ribs. This indicates that the ribs effectively reduce the maximum bending stress that could otherwise occur at the base of the leg if the ribs were not present. Since a 20 N tip load is much higher than what could be expected in reality and does not cause yielding in the leg, the leg design is sufficiently strong for its intended application.

Figure 14:
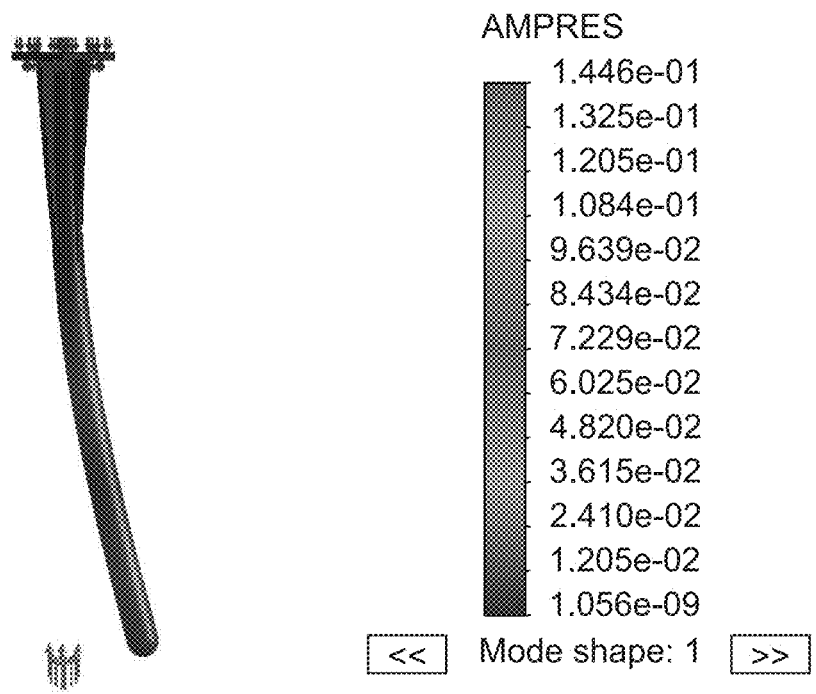
FIG. 14 illustrates the results for a first buckling mode.

Additionally, since the legs might be subjected to compression during landings, a buckling FEA simulation was conducted using SolidWorks Simulation. A traction load of 6.54 N was applied on the end of the leg in the direction of the cylinder axis while fixed displacement boundary conditions were applied at the screw holes at the base of the leg. The traction load was determined by assuming a total drone mass of 2 kg (and hence a weight of 19.62 N) and assuming that the load is equally distributed over the three legs. It is important to note that the drone might not be able to land on its landing gear while carrying a package. Thus, the weight of the drone is considered. The results for the first buckling mode are shown in FIG. 14. The buckling FEA predicted a load factor of 9.207, which means that a load approximately 60.2 N is required to induce the first mode of buckling.

Figure 15:
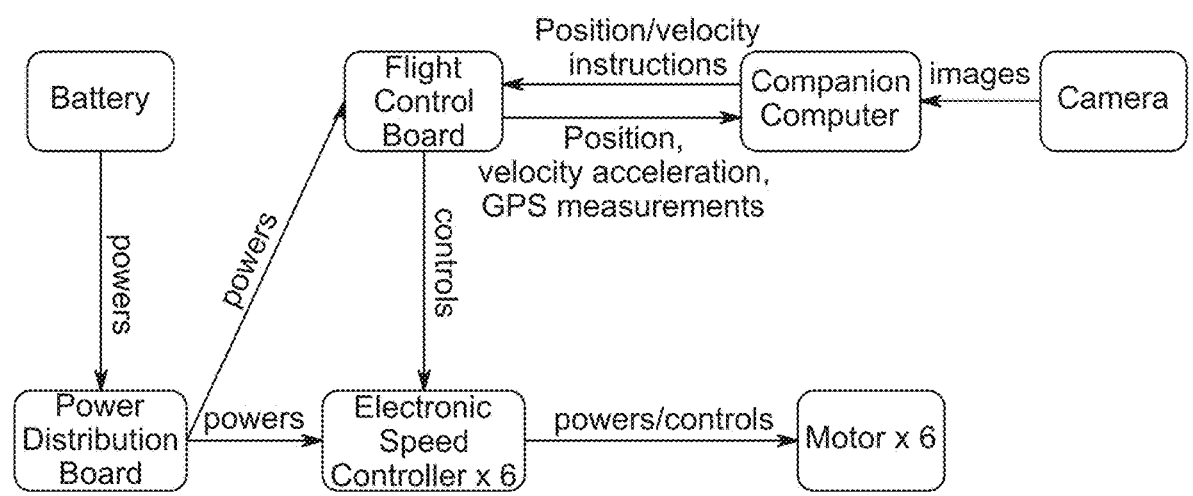
FIG. 15 illustrates a high-level multicopter operation diagram.

A general, high-level multicopter operation diagram is presented in FIG. 15. While there are other components which are necessary to build and operate a multicopter (such as a LiPo battery charger or the radio controller (RC) transmitter/receiver), the diagram is intended to be a simplistic representation of the most important components.

Figure 16:
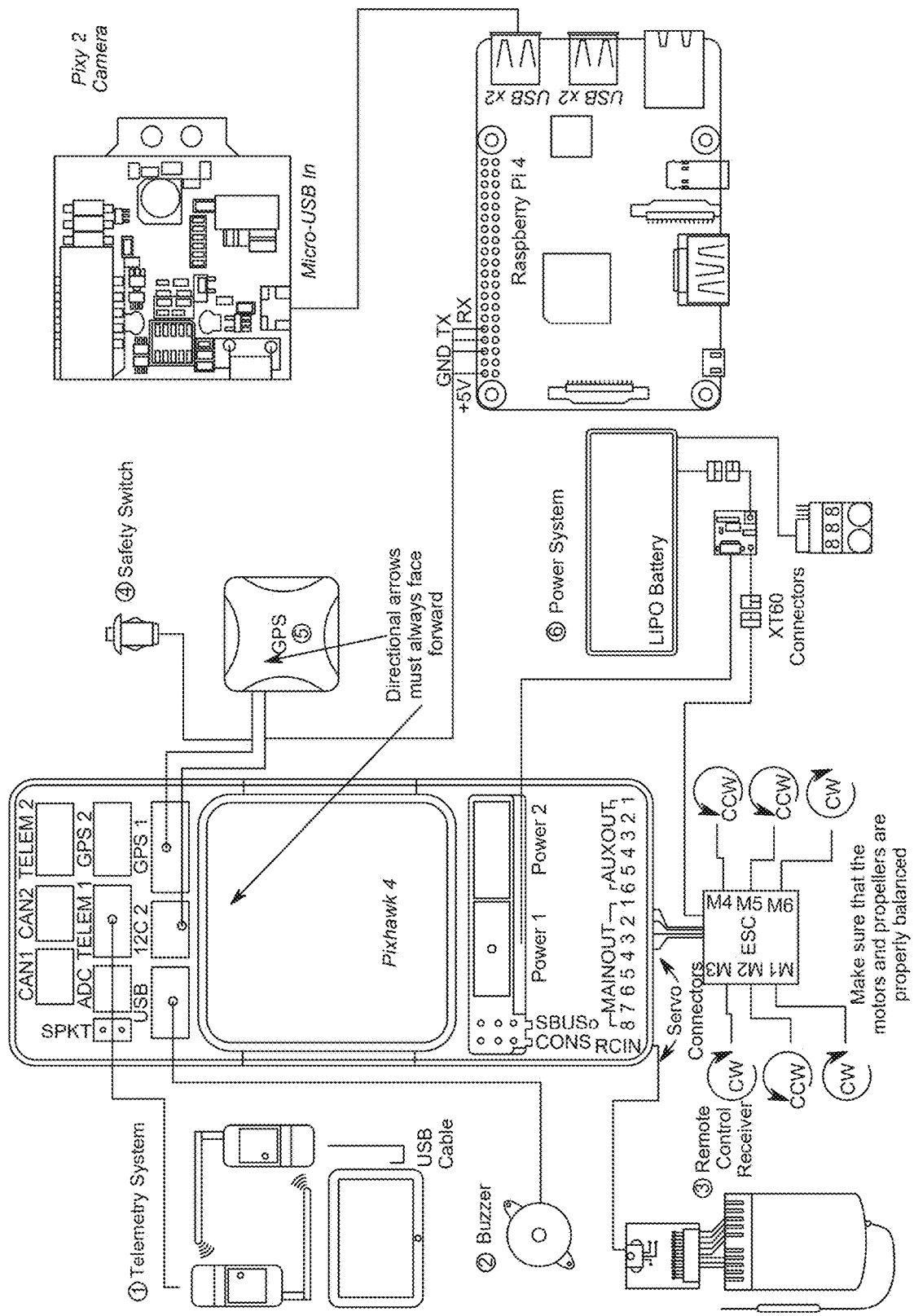
FIG. 16 illustrates electrical schematics.

While the project involves many electrical components, no new circuitry has been designed for the drone, and thus existing electrical systems have been connected according to the instruction manuals included with each component/system. Therefore, we are not including any electrical schematics any more detailed than found in FIG. 16.

Figure 17:
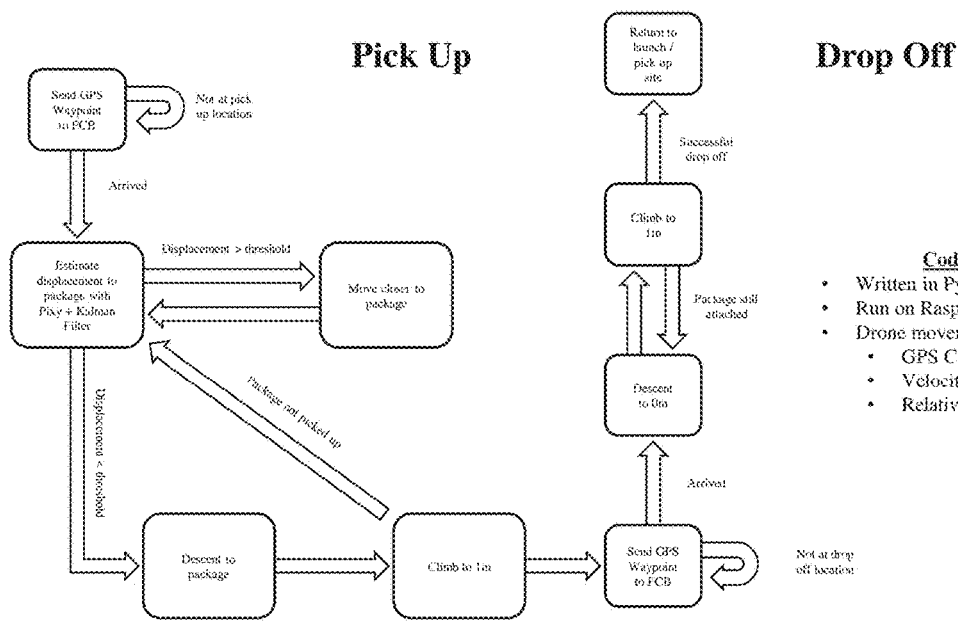
FIG. 17 illustrates the software that might run on the Raspberry Pi on the drone during flight.

FIG. 17 describes the software that might run on the Raspberry Pi or other computer on the drone during flight. The software might be written in Python 3 and interface with the drone through Mavlink. The Mavlink protocol is a low-level framework that provides get and set access to most of the drone's measurements, parameters, settings, and controls.

Figure 18:
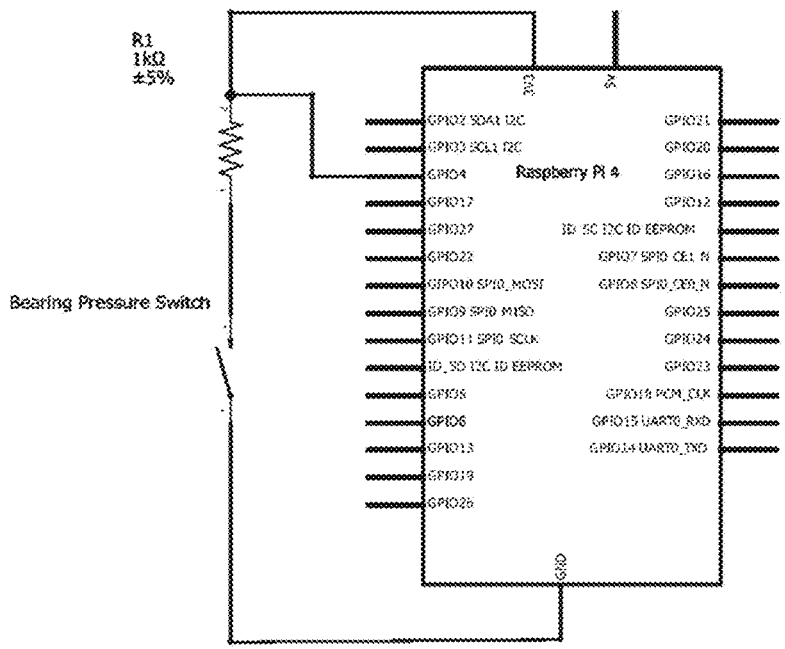
FIG. 18 illustrates how the latch attachment confirmation system is wired to the Raspberry Pi.

FIG. 18 shows how the latch attachment confirmation system is wired to the Raspberry Pi. Simple digital input to the Raspberry Pi might detect a voltage across the 1 kOhm resistor when the switch is closed, indicating the package has been lifted. No voltage signal might be detected when the switch is open, indicating the package has not yet been lifted.

Figure 19:
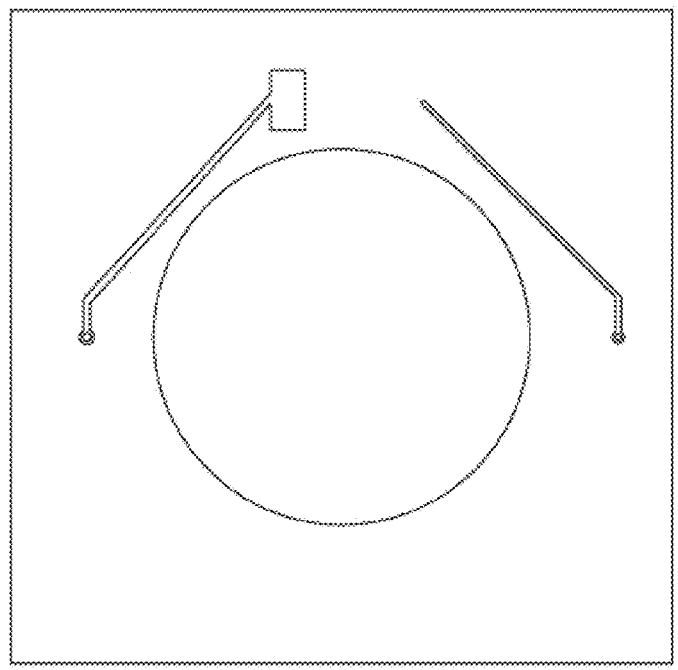
FIG. 19 illustrates the PCB design for confirming package attachment.

FIG. 19 shows the PCB design for confirming package attachment. This component acts as a simple connector circuit with a shield finger switch (BOM Item #36) soldered onto the rectangular patch. A cutout in the center of the PCB allows it to rest within the bearing, and when a package is lifted the bearing pushes down the switch, connecting the two isolated wires.

A critical component in multicopter design is the flight control board (FCB). The FCB has an onboard accelerometer, gyroscope, and compass that together estimate the position of the drone using an Extended Kalman Filter. After passing this estimate and the desired throttle, roll, pitch, and yaw from the RC input through numerous control loops and algorithms, the FCB sends a pulse width modulated (PWM) signal to the electronic speed controllers (ESCs) which in turn control the speed of each motor.

The Pixhawk FCB was chosen, at least in part, because it is the industry favorite. Moreover, the Pixhawk 4 is faster and more updated than its ancestor, the Pixhawk 2.1. The Pixhawk 4 kit also included a PDB, and GPS module. Additionally, the Pixhawk 4 supports Ardupilot, an open source flight automation firmware, and Mavlink, a common protocol used to communicate with external devices such as a Raspberry Pi companion computer.

Also critical to the design is the choice of the companion computer. The companion computer might run the algorithms within the Ardupilot software/firmware suite and onboard Pixy libraries that do the autonomous decision making. Like above, both our research and Dr. Summers pointed to the Raspberry Pi as the best candidate for our onboard computer. We chose the Raspberry Pi 4, 4 GB RAM model to ensure that it is fast enough to run the control algorithms without slowing down/filling up RAM midflight. The Raspberry Pi has been demonstrated to interface well with the Pixhawk 4 and is listed as a recommended companion computer on the ArduPilot (Pixhawk firmware) website (ArduPilot Dev Team n.d.).

A camera may be needed to recognize the pickup site and determine its location relative to the current position of the drone in flight. We opted for the Computer vision system camera as it has onboard machine learning that easily allows users/students/researchers to program it to reliably recognize objects based on a single training instance of the object. The on-board algorithms heavily rely on contrasting color signatures so our design suggests paining or otherwise coloring the pickup site with a unique color in contrast with the surrounding environment (which will most likely be grass or concrete).

Lastly, the remaining components (frame, motors, ESCs) were selected as recommended by DJI in the Flamewheel kit. Additional considerations and metrics used to finalize selection of the frame, motors, propellers, and companion computers are discussed below. We chose a 6-armed multicopter (hex copter) as hex copters provide more thrust than an equivalent quad copter (allowing for heavier packages to be carried), are generally more stable than quad copters and are typically larger, allowing larger packages to fit under the propellers without interfering with thrust.

The fixed attachment was designed to fit underneath the drone and hold a bearing which attaches to the lifter. This design allows the bearing and lifter to freely rotate, preventing any torsional force on the drone and allowing the lifter and hook to mate, as the hook is fixed rotationally within a package.

A mechanism to verify that the package has mated with the latch was developed to improve system performance and reduce risk. This mechanism consists of a spring powerful enough to overcome the weight of the lifter, but not the weight of the package.

Spring for fixed latch attachment justification equations are shown below where F is the force due to the weight of bearing and lifter, Δx is the distance the latch travels to compress spring and k is the spring constant. The desired range of spring constants was calculated in order to justify the selection of a particular spring and validate that it could meet project requirements.

Hooke's Law: Force=Δx*k.  Equation 1:

Applying Equation 1 to the minimum value to activate the switch:

$$0.494(N) = 6.7(\text{mm}) * K\left(\frac{N}{\text{mm}}\right)$$

$$K = \frac{0.494}{6.7} = 0.074\left(\frac{N}{\text{mm}}\right) - MinK \text{ value to activate switch}$$

Applying Equation 1 to the maximum value to activate the switch:

$$1.5(N) = 6.7(\text{mm}) * K\left(\frac{N}{\text{mm}}\right) - MaxK \text{ value to still activate with small box}$$

$$K = \frac{1.5}{6.7} = 0.22\left(\frac{N}{\text{mm}}\right)$$

Combining the minimum and maximum values to develop a range:

$$0.074\left(\frac{N}{\text{mm}}\right) < K < 0.22\left(\frac{N}{\text{mm}}\right) - \text{Range of usable spring constants}$$

Figure 20:
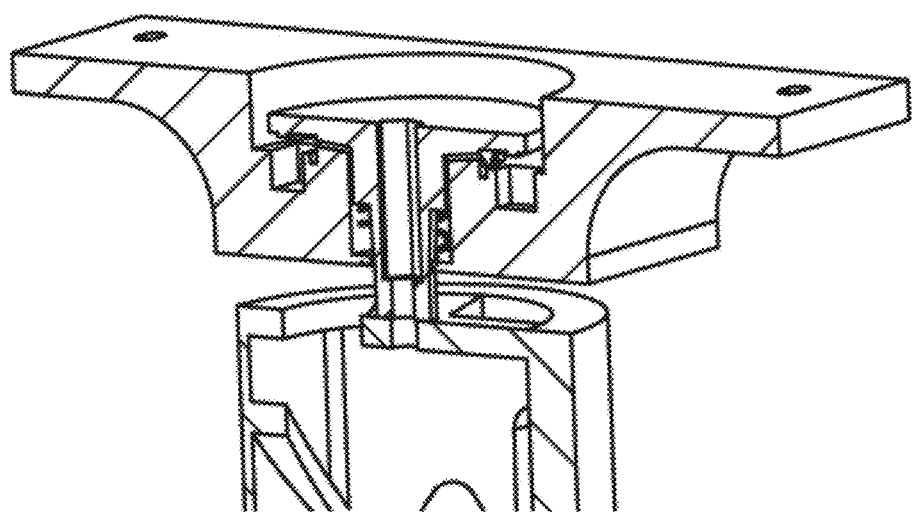
FIG. 20 illustrates a cross-section of a full assembly designed, manufactured and operated according to one or more embodiments.

When the package is attached the spring might be compressed and the bearing might make contact with a spring switch. This spring switch is in connection with a printed circuit board (PCB) that completes a circuit connected to the Raspberry Pi 4 B. The dimensions of the spring were constrained from the design of the latch attachment while the spring constant was calculated above. The full assembly is shown as a cross section view in FIG. 20, with the spring being compressed by the bearing. Once this circuit is complete upon contact, the Raspberry Pi 4 B might complete a circuit with the spring switch, confirming that the hook and lifter have mated, as shown in FIG. 19.

Figure 21:
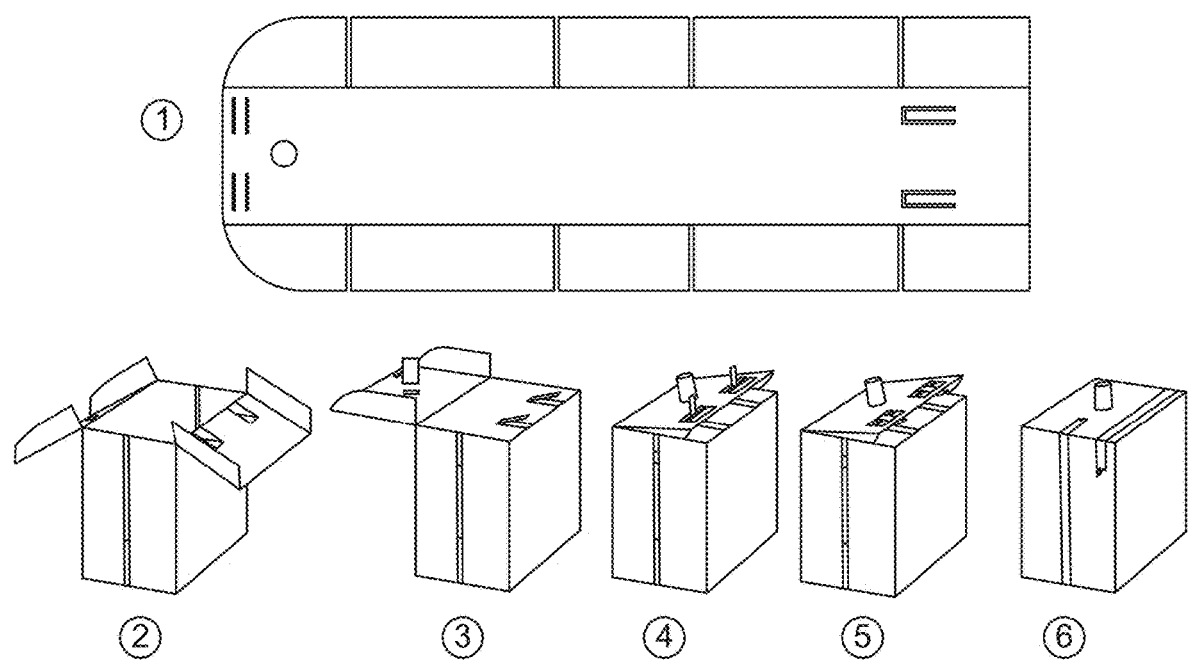
FIG. 21 illustrates a cardboard package design according to the disclosure.

In order to attach the hook to the package and retain simplistic manufacturing techniques, the cardboard package design shown in FIG. 21 was created. This design is unique in that it uses the overlapping top face to keep the hook from sliding out of the package and the first top face to keep the hook from falling into the package. The overlapping top flap (the left most panel next to the flattened package cutout in FIG. 21) also ensures that less tape needs to be used to close a side edge of the package. The package height is restricted by the height of the cones in the pick-up system, the height of the legs, and the dimensions in the latch as shown in FIG. 11. According to calculations discussed above, the minimum package height is 52.42 mm. This package design utilizes cut out flaps and insert slots on the top faces as an additional reinforcement mechanism for maintaining the package closure which is needed because the entire weight of the package is lifted from a singular point of the latch mechanism. Packing tape is also used to both secure this additional cardboard cut-out support and to close the sides of the package.

Figure 22:
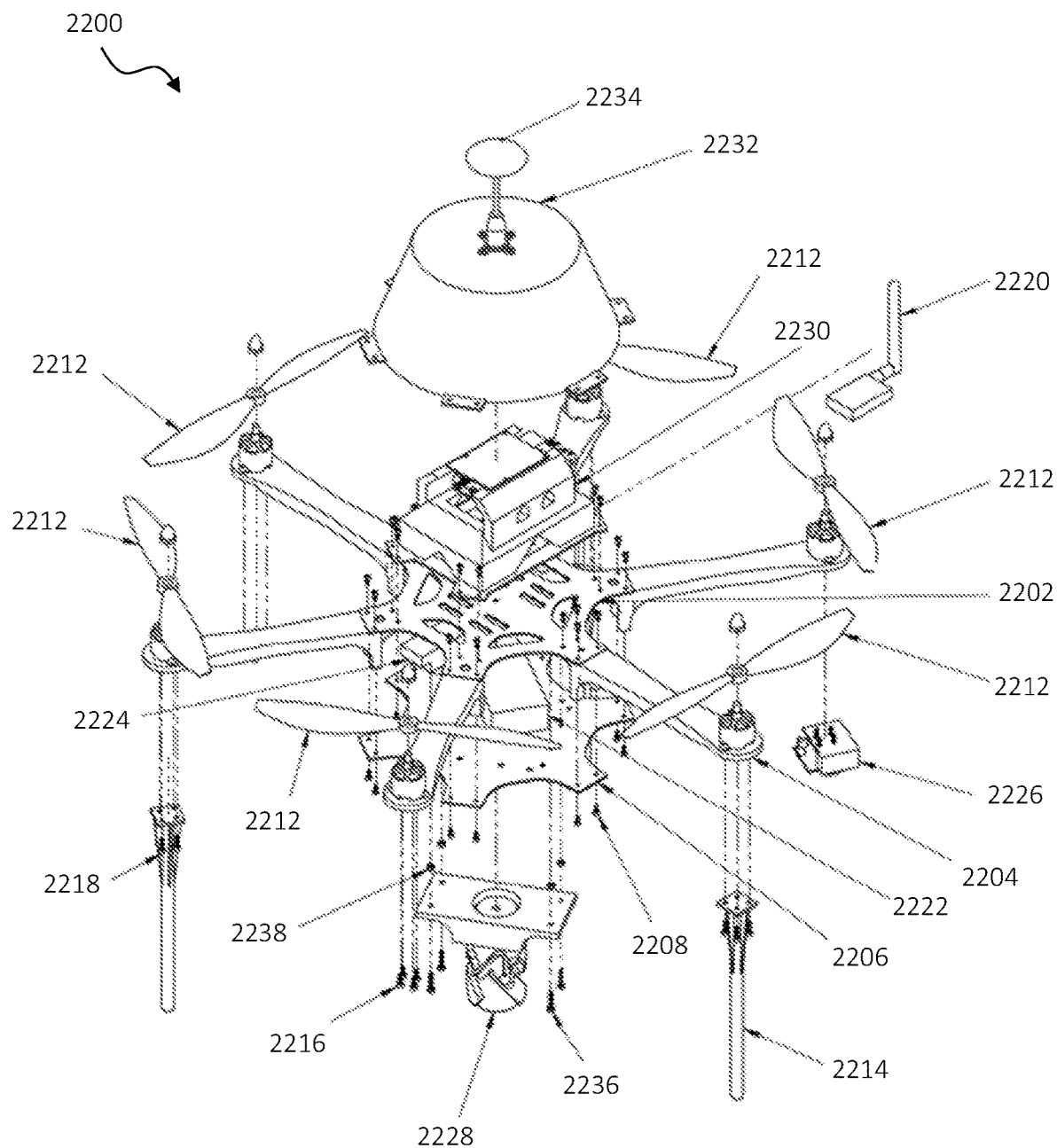
FIG. 22 illustrates one embodiment of a drone assembly designed, manufactured, and operated according to one or more embodiments of the disclosure.

Turning to FIG. 22, illustrated is one embodiment of a drone assembly 2200 designed, manufactured, and operated according to one or more embodiments of the disclosure. The drone assembly 2200 in FIG. 22 includes, without limitation, the following parts:

| Part Number | Name | Full Name | Cost/Unit | QTY | Description | Vendor | Cost + Shipping | Part Number |
|---|---|---|---|---|---|---|---|---|
| 2202 | Upper Plate | USAQ F550 550 mm Hexacopter Drone Frame Integrated Power Distribution Board (PDB) | $0 | 1 | Upper plate of the drone hub; supports electronics | See Frame Kit | $ — | SD93904002 |
| 2204 | Arm | USAQ F550 550 mm Hexacopter Drone Frame Integrated Power Distribution Board (PDB) | $0 | 6 | 6 arms of the drone, connecting the upper and lower plates | See Frame Kit | $ — | SD93904003 |
| 2206 | Lower Plate | USAQ F550 550 mm Hexacopter Drone Frame Integrated Power Distribution Board (PDB) | $0 | 1 | Upper plate of the drone hub; supports electronics | See Frame Kit | $ — | SD93904001 |
| 2208 | Arm to plate screws | 91290A101_BLACK-OXIDE CLASS 12.9 SOCKET HEAD SCREW | $0 | 1 | Pack of 50, only need 34. Connects arms to upper and lower plates. Came with frame kit. | Amazon, but additional backup is McMaster | $ — | SD93904004 |

-continued

| Part Number | Name | Full Name | Cost/Unit | QTY | Description | Vendor | Cost + Shipping | Part Number |
|---|---|---|---|---|---|---|---|---|
| 2210 | Motors (Packs of 4) | Readytosky 2212 920 KV Brushless Motors CW CCW for F330 X525 F450 S500 F550 S550 DJI Phantom Quadcopter(4 PCS) | $32.00 | 2 | 6 × 2212 920 kV motors | Amazon | $64.00 | SD93903010 |
| 2212 | Propellers | Genuine Gemfan 1038 (10 × 3.8) Propellers by RAYCorp. 8 Pieces(4CW, 4CCW) Black - Carbon Nylon 10-inch Quadcopters and Mutlirotors Props + RAYCorp Battery Strap | $17.00 | 1 | 10 × 3.8 (8 pcs) | Amazon | $17.00 | SD93904006, SD93904007 |
| 2214 | Leg Extensions | Legs (Manufactured Part) | $ 0.28 | 3 | Legs to assist in pickup system and allow variable package sizes | Sponsor Provided | $0.83 | SD93905001 |
| 2216 | Motor Screws for "no-leg arms" | 91290A113_BLACK-OXIDE CLASS 12.9 SOCKET HEAD SCREW | $ 0 | 1 | Pack of 50, only need 8. Connects motor to arms without legs below. Came with frame kit | Amazon, but additional backup is McMaster | $ — | SD93904008 |
| 2218 | Screws for Leg Extensions | 91290A113_BLACK-OXIDE CLASS 12.9 SOCKET HEAD SCREW | $ 0 | 1 | Pack of 50, only need 8. Connects motor to arms without legs below. Came with frame kit | Amazon, but additional backup is McMaster | $ — | SD93904008 |
| 2220 | Telemetry | 3DR 100 MW Radio Telemetry Kit 915 Mhz 915 Kit Air and Ground Data Transmit Module for APM2.6 APM2.8 PX4 Pixhawk | $23.00 | 1 | Onboard component used to communicate with ground station | Amazon | $23.00 | SD93903005, SD93903006 |
| 2222 | Battery | Zeee 3S 11.1 V 6000 mAh 60 C RC LiPo Battery with (XT60 and Deans Connector) for RC Plane, DJI F450 Quadcopter, RC Airplane, RC Helicopter, RC Car/Truck, RC Boat | $39.00 | 1 | 3S 6000 mAh battery | Amazon | $39.00 | SD93903001 |
| 2224 | Electronic Speed Controllers (ESCs) (Packs of 4) | NIDICI BLHeli-32 30A ESC 32 bit Brushless Electric Speed 2-4 s Controller for DShot1200 FPV Racing Drone (Pack of 4) | $42.00 | 2 | Blheli 20A ESCs | Amazon | $84.00 | SD93903002 |
| 2226 | Pixy Mount | N/A | N/A | 1 | N/A | N/A | N/A | N/A |
| 2228 | Lifter Assembly | N/A | N/A | 1 | N/A | N/A | N/A | N/A |
| 2230 | Electronic Mounts | N/A | N/A | 1 | N/A | N/A | N/A | N/A |
| 2232 | Cover for Electronics | N/A | N/A | 1 | N/A | N/A | N/A | SD93905004 |
| 2234 | GPS | PX4 Pixhawk 4 FMUv5 Autopilot with NEO-M8N GNSS and PM07 Power Management Board | $ 0.00 | 1 | GPS and GPS mount were part of the FCB, so the cost is 0 | Amazon | $ — | SD93903003 |
| 2236 | Screws for Lifter Assembly | N/A | N/A | N/A | N/A | N/A | N/A | SD93904012 |
| 2238 | Washers for Lifter Assembly | N/A | N/A | N/A | N/A | N/A | N/A | SD93904013 |

Figure 23:
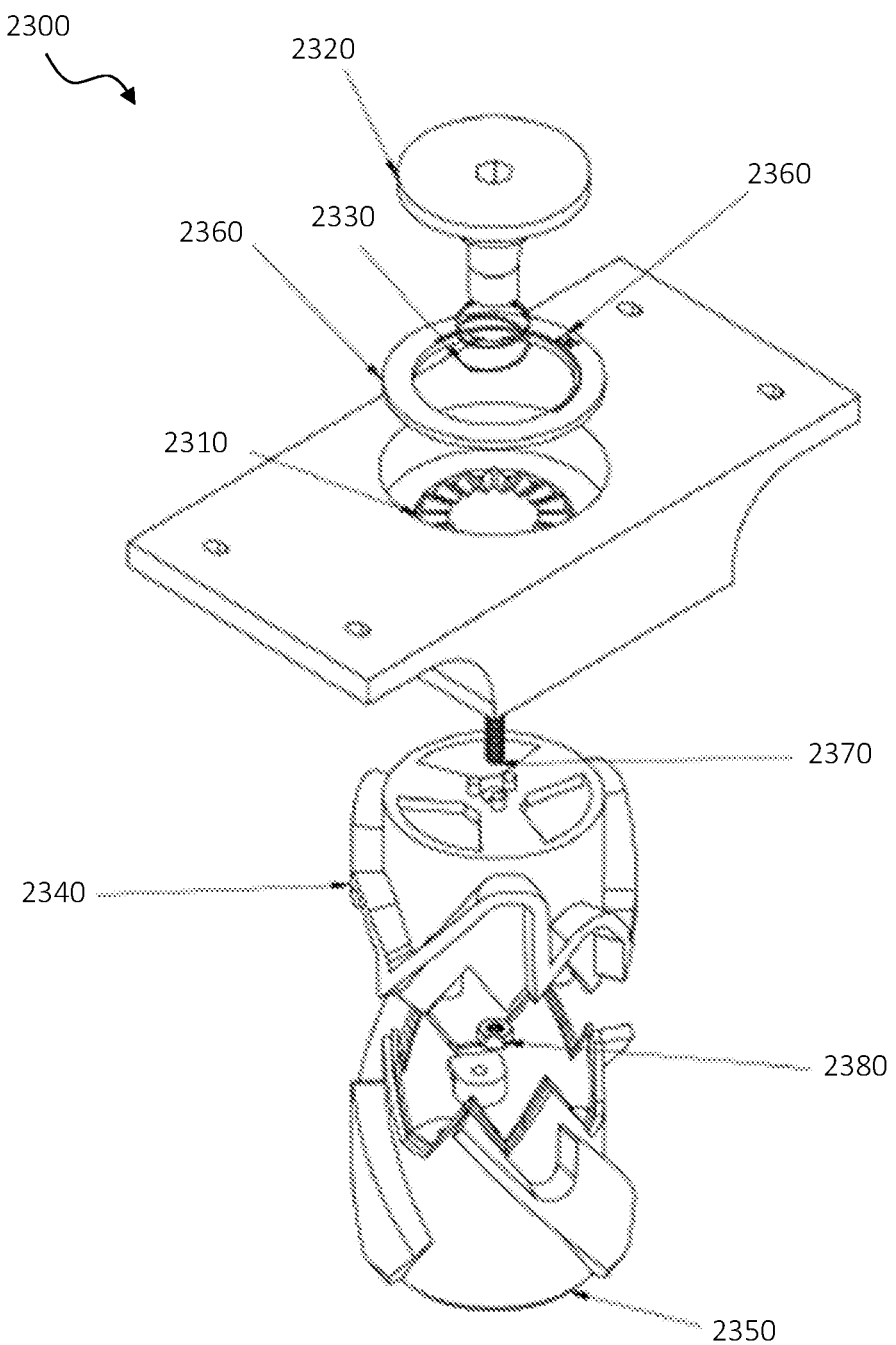
FIG. 23 illustrates one embodiment of a lifter assembly designed, manufactured, and operated according to one or more embodiments of the disclosure.

Turning to FIG. 23, illustrated is one embodiment of a lifter assembly 2300 designed, manufactured, and operated according to one or more embodiments of the disclosure. The lifter assembly 2300 may be similar, in certain respects, to the lifer assembly 2228 in FIG. 22. The lifter assembly 2300 in FIG. 23 includes, without limitation, the following parts:

| Part Number | Name | Full Name | Cost/Unit | QTY | Description | Vendor | Cost + Shipping | Part Number |
|---|---|---|---|---|---|---|---|---|
| 2310 | Fixed Latch Attachment | Latch Attachment (Manufactured Part) | | 1 | | | | SD93901002 |
| 2320 | Bearing Assembly | Latch Bearing (Manufactured Part) | $0.13 | 1 | Bearing to allow latch lifter to function | | $0.13 | SD93901001 |
| 2330 | Spring | | | | | | | SD93901009 |
| 2340 | Latch top piece | | | | | | | SD93901006 |
| 2350 | Latch bottom piece | | | | | | | SD93901005 |
| 2360 | Sensor PCB | | | | | | | SD93901012 |
| 2370 | Screws for Lifter Assembly | N/A | | N/A | N/A N/A | N/A | N/A | SD93904012 |
| 2380 | Nut for Lifter Assembly | N/A | | N/A | N/A N/A | N/A | N/A | SD93904013 |

Figure 24:
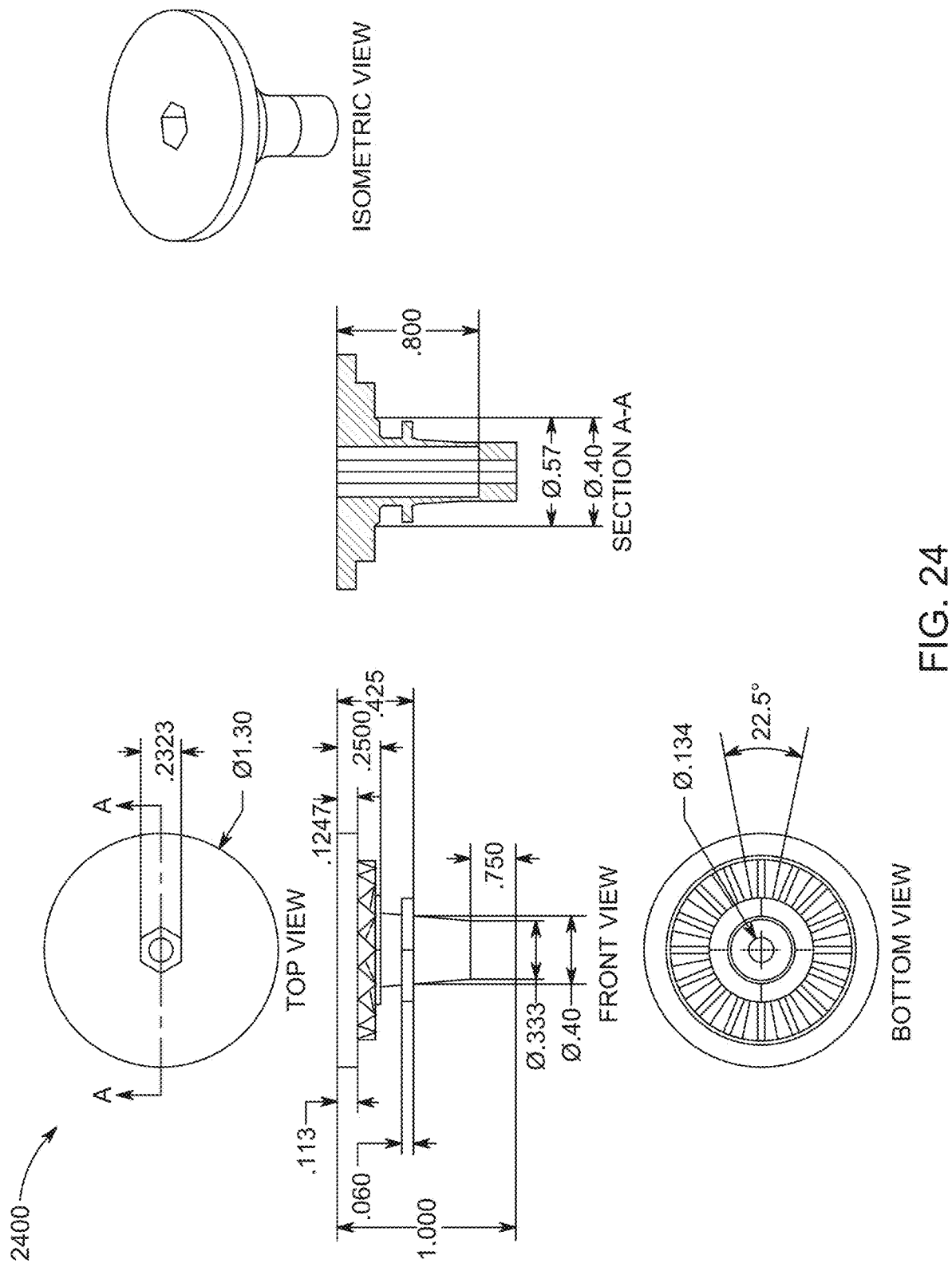
FIG. 24 illustrates one embodiment of a bearing assembly designed, manufactured, and operated according to one or more embodiments of the disclosure.

Turning to FIG. 24, illustrated is one embodiment of a bearing assembly 2400 designed, manufactured, and operated according to one or more embodiments of the disclosure. The bearing assembly 2400 may be similar, in certain respects, to the bearing assembly 2320 in FIG. 23.

Figure 25:
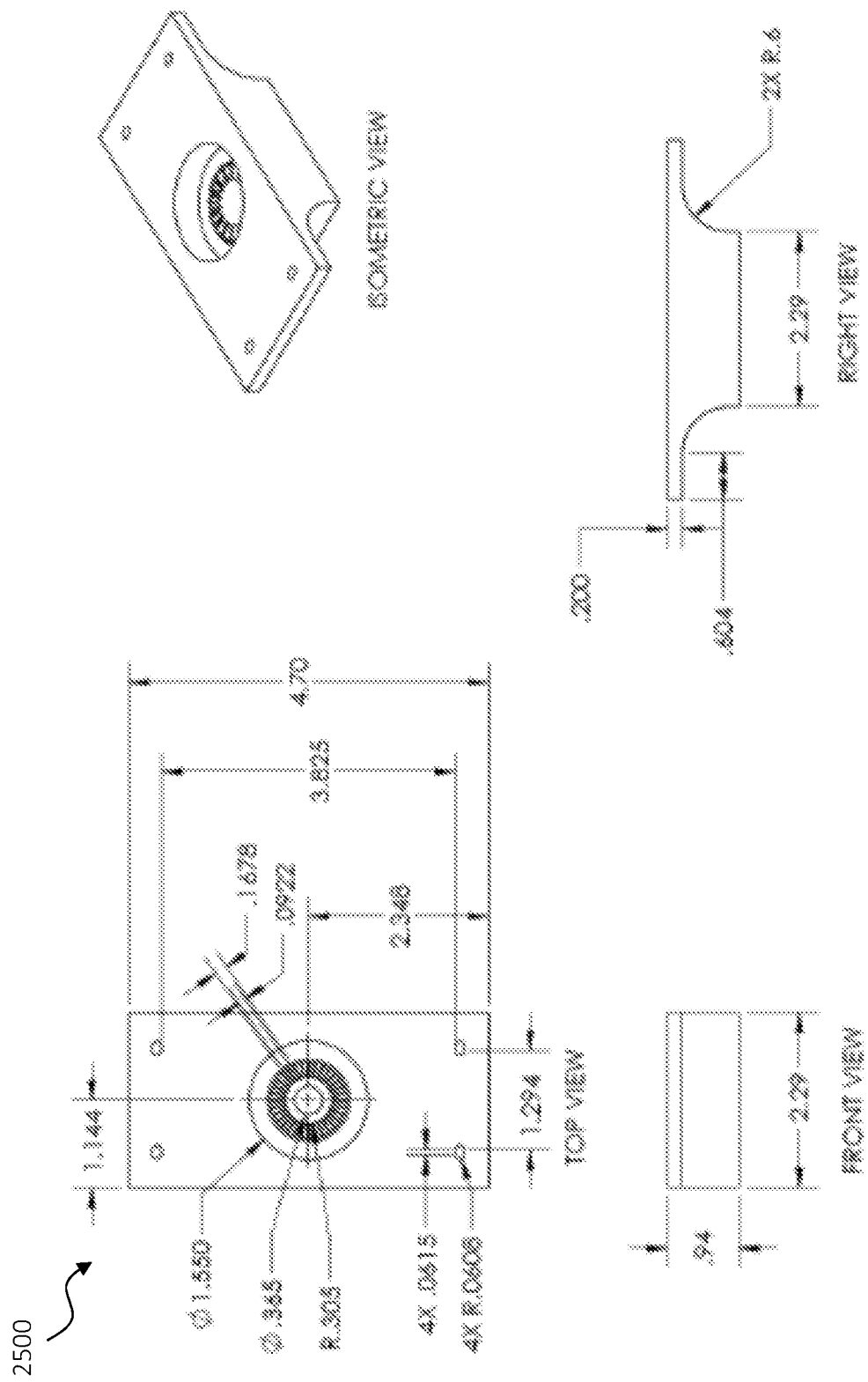
FIG. 25 illustrates one embodiment of a fixed latch attachment designed, manufactured, and operated according to one or more embodiments of the disclosure.

Turning to FIG. 25, illustrated is one embodiment of a fixed latch attachment 2500 designed, manufactured, and operated according to one or more embodiments of the disclosure. The fixed latch attachment 2500 may be similar, in certain respects, to the fixed latch attachment 2310 in FIG. 23.

Turning to FIG. 26, illustrated is one embodiment of a package and hook assembly 2600 designed, manufactured, and operated according to one or more embodiments of the disclosure. The package and hook assembly 2600 includes, without limitation, a package 2610 having an opening therein, as well as a hook member 2620 operable to seat within the opening in the package 2610 and latch with a latch member of a lifter assembly, such as the lifter assembly 2300 illustrated with respect to FIG. 23.

Turning to FIG. 27, illustrated is an alternative embodiment of one embodiment of a package 2700 designed, manufactured, and operated according to one or more embodiments of the disclosure. The package 2700 may be similar, in certain respects, to the package 2610 in FIG. 26.

Turning to FIG. 28, illustrated is an alternative embodiment of one embodiment of a hook member 2800 designed, manufactured, and operated according to one or more embodiments of the disclosure. The hook member 2800 may be similar, in certain respects, to the hook member 2620 in FIG. 26. In the illustrated embodiment, the hook member 2600 is a female hook member configured to engage with a male latch member.

A major limitation of automated drone use is their limited flight to charge time ratio (about 1:3, at best 1:2). The batteries used in quadcopters, hexacopters, and octocopters discharge in use faster than they charge. Thus, a system reliant on automated drones with internal batteries would require multiple drones and charging stations for continuous work.

However, if drones were able to easily exchange external batteries at a base station, refueling time would be dramatically reduced. Batteries could be charged while a drone is in flight, using a different battery. A single drone could provide nearly continuous up-time, and two drones could overlap to provide truly continuous up-time. Truly continuous operation is desirable for many applications, including surveillance.

Battery exchange could also allow propeller drones to carry payloads across larger distances. They would not be limited by a single charge in their maximum delivery distance. They could stop at a base-station, exchange a battery, and continue to complete the payload delivery or to another base station. They would complete such a route much faster than if they needed to fully recharge at each station.

A rotating tension latch mechanism integrated into an external battery allows for fast exchange of batteries without the need for additional actuators. This is beneficial from the perspective of the drone because it limits power consumption and weight. This is beneficial from the perspective of the base station because it is economical. The rotating tension latch does not require rotational accuracy, which allows for flexibility in the designs of both the base stations and the drones.

Other latching mechanisms are feasible for battery exchange if the drone can accurately align with the base station.

Battery exchange will allow for two new methods of delivering payloads or packages. First, with multiple base stations along a route, a drone could deliver packages across longer distances without needing to stop to charge. The drone would simply need to reach a base station with a charged battery, change batteries, and continue along its delivery route. It could stop at multiple base stations.

Second, battery exchange would allow Base Delivery Trucks to use one or more drones to finish delivery of packages or payloads. The drones would be able to deliver packages nearly continuously because they would be able to exchange batteries and continue flying, rather than docking and recharging.

Automated drones could be used for security or surveillance more efficiently because they would have very little downtime. Drones could provide a high-altitude perspective of an area until the battery is near depletion, then exchange batteries and return to the skies. Two drones could reach 100% uptime so long as one drone is always in the air while the other is exchanging batteries.

Battery exchange is even more valuable in scenarios that require multiple drones for surveillance. If, for example, two separate regions, Region 1 and Region 2, needed surveillance, three drones (Drone A, Drone B, and Drone C) would provide 100% uptime by cycling. Drone A could start in Region 1, and Drone B would start in Region 2. Drone C would, after some time, replace Drone A in Region 1, allowing Drone A to exchange its battery. It would then replace Drone B in Region 2, allowing Drone B to exchange its battery before relieving Drone C, and so on. So long as the travel and battery exchange time allow, the only one additional drone would be needed to surveil any number of regions.

Many automated tasks will become more economically viable with the use of battery exchange on a drone. The best ratios of flight to charge ratio are 1:2-a 60-minute charge could give 30 minutes of flight. Assuming the typical Drone Return Mode time is 3 minutes (total, in both directions), a full Work Cycle for a Conventional Drone would look like this:

Drone Active Mode—27 minutes
Drone Return Mode—1.5 minutes
Drone Charge Mode—60 minutes
Drone Return Mode—1.5 minutes Such a drone would have 30% Uptime.

A full Work Cycle for Swappable Battery Drone would look like this:

Drone Active Mode—27 minutes
Drone Return Mode—1.5 minutes
Drone Swap Mode—0 minutes (incl. in the Return Drone Mode)
Drone Return Mode—1.5 minutes Such a drone would have 90% Uptime.

In this scenario, a Swappable Battery Drone would be able to do 3 times more work than a Conventional Drone provided the Swap Station has enough batteries. So, the Drone Efficiency Improvement in this scenario is 2.

A simple equation that can be used for determining the Uptime of a Conventional Drone is:

$$Uptime_{Conventional} = \frac{\text{Active Time}}{\text{Cycle Time}} = \frac{\text{Active Time}}{\text{Active Time} + \text{Return Time} + \text{Charge Time}}$$

A simple equation that can be used for determining the Uptime of a Swappable Battery Drone is:

$$Uptime_{Swappable} = \frac{\text{Active Time}}{\text{Cycle Time}} = \frac{\text{Active Time}}{\text{Active Time} + \text{Return Time}}$$

The Drone Efficiency Improvement for similarly configured Conventional vs Swappable Drones can be calculated by:

$$\text{Drone Efficiency Improvement} = \frac{Uptime_{Swappable}}{Uptime_{Conventional}} - 1 = \frac{\text{Active Time} + \text{Return Time} + \text{Charge Time}}{\text{Active Time} + \text{Return Time}} - 1$$

Because Charge Time is greater than Active Time+Return Time, a Swappable Battery Drone will always be able to perform the same amount of work as at least two, if not more Conventional Drones. Since drones that do automated tasks are typically quite expensive, using Swappable Battery Drones is more economical than automatically charged Conventional Drones, so long as the battery swapping mechanisms are not more expensive than an entire drone. The mechanisms should not add much to the cost of a drone because they do not require moving parts.

It should also be noted that a Charge Station capable of charging multiple Conventional Drones to match the total Uptime of a Swap Station would require nearly all the same electronic components and mechanical components. It would have to be larger, however, because it would need to accommodate multiple landed drones.

A Swappable Drone would, therefore, require additional mechanisms and batteries that would be insignificant against the cost of an industrial drone.

The batteries could be encased in a cylindrical housing with contours on the cylindrical exterior to form the Latch portion of the Rotating Tension Latch. If a battery as a Male Latch was used, the drone would simply need a hole with 3 pins to act as a Female Hook to pick up and release the batteries.

This is particularly advantageous if the drone is using as Rotating Tension Latch for moving payloads ("Functional Latch"). The portion of the drone that receives the batteries can be vertically higher than the "Functional Latch" used for move payloads. The batteries can be positioned higher up on the Swap Station so that the "Functional Latch" does not crash into the Swap Station during Drone Swap Mode. Alternatively, the Battery could be the male Hook of the Rotating Tension Latch.

While it is not absolutely required, the use of a Rotating Tension Latch for the swappable batteries would benefit from the use of springs to assist gravity for the axial force. This would keep the batteries stable in flight and ensure good electrical contact against the batter leads.

The springs can be located on the drone or on the battery. The springs could be part of the contact pins that make the electrical connections between the battery and the drone.

The leads for the battery contacts could go through the cam pins of the latch. The Lower Vertical Limit of the cam surface of the latch would need to be a mating contact point for each pin. Because the battery can be inserted at any rotation, this means the leads need to be adjusted with electronic switch system or somehow otherwise compensate for the change in orientation of the leads. A marker can be placed on the top of the battery that helps the system identify orientation.

The top and/or bottom of the battery could have the contact points. They could have protruding pins, but it is more beneficial to have simple surface contacts on the battery and pins (spring or otherwise) on the drone.

While any geometry of contacts could work, ideally the contacts on the battery would be concentric rings (one contact in the middle could be a filled circle). If 3 leads are desired, the battery would have 3 concentric rings (one could be filled in the center). The mating portion would have 3 pins configured to mate with each ring, regardless of the angular orientation of the battery. This configuration does not require the drone to identify which lead is which and adjust, because it will always be the same.

This configuration can be replicated on the bottom of the battery so that the Charge Station can charge the battery in the same way.

Both methods listed above could be used: a contact on the top and bottom could be used along with the contacts on the pins. The contact on the top could be positive, the one on the pins could be negative (or vice versa), so a correct orientation would not be required.

Wireless power transfer (WPT) methods have several advantages over electrical contact for power transfer. The primary advantage for this application is that they can be made weather-proof so that exposure to rain does not short leads on the battery, drone, or swap station. WPT methods are also more reliable in a couple of ways: contact cannot be "missed" so alignment of the electrical leads does not need to be as precise, contact will not fail from fatigue or repetitive use or from debris or corrosion. WPT methods for this application include Inductive coupling (including resonant inductive coupling), capacitive coupling, or even far-field methods like microwave or laser transmission. Currently, inductive coupling is the most likely method to be used for this application. The term inductive coupling will be used with the understanding that it includes resonant inductive coupling.

Inductive coupling can be achieved using traditional coils by putting a transmitting coil on the top of the battery and the receiving coil configured to be right above transmitting coil. The receiving coil could be integrated into the spring system that retains the battery in the Lower Vertical Limit when using the rotating tension latch configuration for closest possible positioning.

A possible advantage for this system would be using concentric coils because the battery will at least partially be inserted into the drone's receptacle. Rather two coils with similar shape and circumferences, the battery could have a coil positioned anywhere, such that there is a larger coil within the drone that would surround the battery and be positioned so it is spaced vertically optimally when the battery is at the Lower Vertical Limit when using a rotating tension latch battery. This method could also provide positional feedback of the pins with respect to the vertical limits. As the coils change vertical spacing, the magnetic fields will change. These changes can be evaluated based on the configuration to determine the approximate, vertical relative position of the latch and hook. If this is not sensitive enough to determine actual position, change in relative position could be used. When the drone senses that the magnetic field is not changing as it lowers or raises, it can be assumed that the latch system has reached a Vertical Limit. Multiple coil pairs could be used in this configuration to potentially optimize power transmission.

As of this date, WPT is not as efficient as tradition electrical contact power transfer. Current techniques are roughly ~85% efficient, though efficiency can increase as the technology is optimized. Because efficiency is important to drone performance, this system may only be viable in conditions where reliability and weather considerations are of primary importance over flight time and/or efficiency. Defense systems could a viable application.

While the main battery power for most of the function of the drones will come from Swappable Batteries, a small internal battery may be used for a few functions.

An internal battery could keep some functions running if the external batteries malfunction or come lose. If a drone does an Emergency Landing, it could send coordinates of its location. Its cameras could remain active, etc.

Depending on the Battery Swap Method used, an internal battery could allow the drone to complete a Battery Swap without having any (or less than maximum) external batteries in place. It could release all (or some) of its batteries, then use the internal battery to move a short distance to pick up and engage the new batteries.

Once the new batteries are engaged, they can recharge the internal battery while in flight.

Remote Swap Stations can be deployed with renewable charging methods so that they can operate off the grid. They could also have larger batteries. They can be used stand-alone or in conjunction with other power sources. Potentially, the Swap Stations could be powered by a generator. Drones could even refuel the generators. Swap Stations could also be connected to the "grid".

Drones are typically designed to be balanced such that the COM is centered with respect to the propellers. Because the battery or batteries account for a significant portion of the drone's weight, the effect of the battery or batteries on the COM of a drone should be considered.

Exchange methods where the drone drops a battery and moves to pick up a new battery will require Imbalanced Flight unless the battery is in the center of the drone. Centering the battery on the drone is not always ideal, so if the drone is not capable of Imbalanced Flight, a different solution is needed.

Two batteries can be used, positioned on opposite sides and equidistant from the COM (two differently sized batteries can be used, and their position would be on opposite sides of the COM, but at distances proportional to respective masses to balance the drone.) When both batteries are engaged or released, the COM should be consistent.

Four battery receptacles could be used to limit how much flight (if any) is required to be powered by the internal battery. They would be configured in pairs, each pair configured as described above. When the drone reaches a charge station it will land so that it engages two new batteries in the empty receptacles, and releases its spent batteries into the charging docks of the Swap Station at the same time. Any number of pairs could be used. They would not need to be equally angularly spaced. Unequal spacing allows for the drone to land at different angles to perform a different function (like pick up a payload).

A Swap Station can include robotics to move batteries from the swapping area to a charging area. This is beneficial for a Swap Station that is servicing many drones and/or where space is limited. For example, if a Base Delivery Vehicle is using drones to finish delivery of payloads, it may be beneficial to have a single landing location for all drones. The drones would exchange batteries, then the spent batteries would be transferred robotically to be charged, and recharged batteries would be placed in the landing location for the next drone to pick up. This is a Mass Swap Station.

A Small Swap Station is a station without robotics. The drones will exchange batteries, and the batteries will charge in the location they are dropped off.

The rotating tension latch design for the battery exchange has been described above. The benefits of this are that no additional springs are required (gravity is the driving force for the latch), and it does not require as much precision (especially in terms of rotation). It also fits well around a cylindrical battery pack.

A spring actuated cam system can be used to latch the battery to the drone and drop it off, similarly to the rotating tension latch. This would require more precise rotational orientation than a rotating tension latch. This could be configured around a rectangular (prismatic) battery pack, or a cylindrical battery pack.

The batteries could be actively latched with actuators on the drone or in the Swap Station using any number of latching mechanisms.

Rain could be problematic for external batteries. If the leads get wet, they could short the circuitry. One option is to use wireless charging and/or induction power transfer on the batteries so there are no exposed contacts. Another is to ensure the batteries are not exposed to the elements when they are in the drone. Flaps or covers for the batteries can engage when the drone is in flight, and disengage when it lands. This can be done actively or with mechanisms that are activated during landing by the weight of the drone. Swap Stations could be covered, drones could enter a drying area where they would remain in place while they dry the bottoms so that water does not drip on the exposed batteries or leads of the swap station. The drying could be done by a separate fan, or even by the airflow from the drone's own propellers.

The openings for the battery receptacles on the drones could be gasketed. This would be particularly viable with a cylindrical battery pack using a rotating tension latch or similar type of engagement mechanism and battery leads on the top of the battery. The gasket could be slightly conical, pointing downwards from the drone. As the battery engages, it would curl the gasket upwards, and then as the battery goes downwards toward the Lower Vertical Limit, it will pull the gasket back down, forming a seal. This would protect the leads from water.

Additional pick-up methods could be used. For example, a slide, glide, and latch method could be used. Rather than simply lowering directly onto a payload to engage the latch, a "Swooping" motion could be used to align the payload with the latch. The drone would be equipped with at least one extension (though probably at least 2) that would hang or be fixed to the bottom of the drone. It could be a leg or pole that could also serve as landing gear. The drone would move down and towards the package such that the extension would contact one side of the package. It would then slide the package as it moves parallel to the ground, thus aligning the package with respect to the drone and its extensions. For example, it could have two extensions that contact to adjacent sides of the package, thus trapping it on a corner. As the drone would move parallel to the ground surface, towards the center of the package, thus aligning the package consistently with the drone. Then the drone would lower to engage the latch and hook, which would be configured to be aligned by this motion. The drone would then raise when the latch system reaches the First Vertical Upper Limit, and lift the payload.

A benefit of this system is that it reduces the accuracy requirements of the drone positioning with respect to the latch and hook without the need for a special landing dock. One requirement is that the package be able to slide along its resting surface and that there be adequate room for the drone to slide the package before lifting. The extenders would also have a secondary benefit of limiting the rotation of the package in flight.

A disadvantage of this system is that the drone would be configured to lift a specific configuration of payloads where the hook or latch that is on the payload is a specific distance from a corner or whatever feature is being located by the extensions. This can be remedied slightly by having several extenders of different lengths at different distances from the latch so that the drone can pick up several configurations of packages.

For example, one drone could have two sets of extenders: one set configured to engage a payload that is 300 mm×300 mm×300 mm and another to for a payload that is 600 mm×600 mm×600 mm. The extenders or the latch could be on spring loaded mounts that allow them to retract upwards towards the drone. The springs would be just strong enough to ensure that the extenders or latch system are fully extended when they are not being acted on by any other force (so just enough to overcome friction). This way, if the drone is picking up the larger payload, the extenders configured to engage the small package would be pushed upwards by the payload. They could have wheels or low friction nubs so that they would slide along to the top surface of the payload. This allows the extenders for the larger payload to engage the payload. Alternatively, if the drone is picking up the smaller package, the extenders configured to engage the larger payload might be retracted as they contact the ground surface, allowing the drone to lower to the necessary position.

It may be beneficial to have retracting extenders even if they are configured for one payload size. This would allow the extenders to reach further down along the side of the package, avoiding tipping. Since they are able to retract, they can reach further down so that the extenders do not block the drone from lowering further down to engage the latch once it is aligned.

For cardboard pick-up methods, the cardboard may contain the hook or the latch. For example, the hook can be formed from cardboard. It might be preferable to have an even number of "pins" because they would be folded, thin cardboard, and maintaining another angle would require additional bends. This method would not work well with heavier payloads because cardboard would not support much weight. This method is ideal for very light packages. It would function similarly to a standard latch, in that it can pick up at any rotational orientation.

Alternatively, a female latch may be integrated into a cardboard package can be formed by perforating and cutting patterns into the package. These patterns could be added direction to a standard package, or raised so that when the hook inserts, it does not interfere with the contents of the package.

Such a configuration reduces package cost by not requiring additional parts (a plastic hook), and minimizing assembly efforts. The drawback to this method is that the drone needs to be relatively aligned with the latch for pickup. This can be accomplished with precise drone control or landing features that help align the drone on pickup. The hook would be attached to the drone in such a way that when it is not holding a package it will return to the same rotational orientation with respect to the drone. One option is to put the hook on a rotational bearing that is spiraled so that gravity will rotate the hook to the known orientation. Another option is to use a spring that returns the hook to the same known orientation.

The cam surfaces would be cut into the cardboard. The cam surface would need to be cut into the cardboard, and then folded. It could be folded during package assembly, or the force of the hook coming down on the package could fold the contours far enough to engage the hook.

Because drones are technically capable for rotating precisely, some latches can be designed that do not automatically release using the contours. A drone could lower into position, rotate, and raise up to engage and pick up a package. Then it could lower until the package touches the ground, continue lowering and rotate back the other direction to disengage a latch.

This method simplifies the latch, but complicates the drone movement. It also requires higher degrees of control and time to release packages. It also requires precise pickup orientation with respect to a package without the assistance of a landing assistance jig that would hinder rotation.

A different kind of latch using cardboard could be configured to use the cardboard to hook into a fixed hook on the drone. The drone would lower onto the package, and then raise up. As it lowers, flaps in the cardboard would be bent down and over a ridge on the hook attached to the drone. When the drone raises up, that flap would be configured to hook onto the ridge, so that the package is lifted. When the package is lowered again, it could be lowered further down and the drone would be configured to break the flaps or rotate to release the package. The different heights for pickup and drop off can be set by a landing jig that stops the drone from lowering too far, or it can be precisely controlled by the drone.

Release could be accomplished by pulling the hook up, breaking or disengaging the flaps. The hook could be pulled up by an actuator on the drone (disadvantageous because it adds an actuator and thus weight). Or it could be configured so that as the drone continues lowing, the bottom of the hook hits a stop in the package, pushing the hook up. The hook would be configured to move linearly up towards the drone. As the hook moves up, the top of the package hits a feature on the drone, stopping the package from moving relative to the drone. As the drone continues to lower, the hook will push up and out of the latch, breaking or otherwise disengaging from the cardboard flaps.

Turning to FIG. 29, illustrated is one embodiment of a Package Attachment 2900 designed, manufactured and operated according to one or more embodiments of the disclosure. The hook 2910 snaps into the cut out in the package 2920 and is rotated (counter-clockwise in image above). The snaps 2930 extended outwards, locking rotation. The radial extensions 2940 of the hook hold the hook to the cardboard axially and angularly. They could squeeze the package slightly on rotation. Package shown here is simplified as a cylinder to show the cut out. FIGS. 30 and 31 illustrate the hook 2910 and the package 2920 separate from one another.

Turning to FIGS. 32-36 illustrated is a slide and tape method 3200 for coupling a hook member 3210 to a package 3220. This method shows the top of a package 3220 that traps the hook member 3210 using the cut outs shown so that when tape 3230 is applied along the seam 3225 of the package 3220, it retains the hook member 3210. This tape 3230 could be the same tape closing the package 3220.

Turning to FIG. 37, illustrated is an alternative embodiment of a rotating latch member 3700 designed, manufactured and operated according to one or more embodiments of the disclosure. A key concern with drone delivery is safety, specifically with carrying packages over public areas. A reliable system of holding the package is required. The standard latch contours with one bottom vertical limit is reliable. The package can only be dislodged if it moves upwards relative to drone. A spring system can be used to push down on the package during flight so that an upward force on the package must abruptly overcome the weight of the package and the force of the spring to dislodge the package.

However, in order to further improve the reliability of the latch, multiple locking contours can be added. Thus, FIG. 37 illustrates the standard configuration with an additional lower vertical limit. This, ultimately leads to an additional upper vertical limit in certain applications. The contour 3700 of FIG. 37 includes an upper portion 3710 and a lower portion 3750. While not illustrated, the lower portion 3750 may include a first lower portion 3750a and a second lower portion 3750b. In the illustrated embodiment, the upper portion 3710 and the lower portion 3750 cooperate to form at least first and second channels. In the illustrated embodiment, only the first channel is shown. Each of the first and second channels include in order a first upwardly sloping path 3720 defined by a respective first upwardly slanting guide surface 3725 (and optional first upper limit surface [A]) of the upper portion 3710, a first downwardly sloping path 3760 defined by a respective first downwardly slanting guide surface 3765 and a first lower limit surface [B] of a respective lower portion 3750a, a second upwardly sloping path 3730 defined by a respective second upwardly slanting guide surface 3735 (and optional first upper limit surface [C]) of the upper portion 3710, a second downwardly sloping path 3770 defined by a respective second downwardly slanting guide surface 3775 and a second lower limit surface [D] of the respective lower portion 3750a, a third upwardly sloping path 3740 defined by a respective third upwardly slanting guide surface 3745 (and optional first upper limit surface [E]) of the upper portion 3710.

The motion of the pin would be to first fall to the first upper vertical limit [A] (e.g., if it existed), as the hook engages the latch. Then, as the drone lifts up, the pins would reach the first lower vertical limit [B] and lift the package. This is the same as the standard configuration. However, with a second locking contour in place, when the hook is pushed upwards with respect to the latch (either by landing or through some error or turbulence, the pin would go towards the second upper vertical limit [C] (e.g., if it existed), and then down to the second lower vertical limit [D]. It is also possible that in such an error or turbulence, the pin could fall back to the first lower vertical limit [B], in which case the package is still retained safely. Finally, in the case of the double lock, the pin would move towards the third upper vertical limit [E] and then release.

In certain embodiments, no physical upper limits exist, as shown by the dotted lines 3790 in FIG. 37. In said embodiment, the theoretical upper limits are thus set by how far the rotating latch member is allowed to drop in each one of the channels. For instance, in the embodiment of FIG. 37, if the pins were in the first theoretical Upper Vertical Limit [A], the rotating latch member 3700 would be allowed to drop further than if the pins were in the second theoretical Upper Vertical Limit [C] or third theoretical Upper Vertical Limit [E]. In the illustrated embodiment having no physical upper limit, the upper portion 3710 includes at least a first upper portion 3710a, second upper portion 3710b, and a third upper portion 3710c.

Advantages: The level of reliability against an accidental disengagement is squared using a double lock (additional locks continue to increase the reliability exponentially).

Disadvantages: The package must be "dropped" twice in order to disengage normally. Additionally, the diameter of the latch and hook will increase in order to add the additional locking contours without changing pin size or performance.

In certain embodiments, the rotating tension latch employs a tether designed. The tethered design, in one embodiment, employs a collapsing cone, as discussed below. The tethered design, in one or more other embodiments, may employ a catch for the tether. In certain embodiments, the process of picking up a package with the tether may be conducted without a sensor. Using a rotating tension latch on a tether may allow for a drone to use it to pick up and drop off a package without a sensor to detect the pins' relative locations to the upper and vertical limits.

If the approximate distance from the drone to the hook is known or can be estimated, the tethered latch can be lowered further than required and given slack. So long as the latch is lowered far enough to engage or disengage the latch, it can be reasonably assumed that the package was released. A camera can be used to confirm attachment or detachment of the package.

For the engagement, the maximum vertical distance from the first Upper Vertical Limit of the latch to the pins should be calculated ("MVD"). If this is an estimation or if there is some amount of error, this distance value should include the error. So if the nominal distance is estimated to be 20 m, but there is a possibility of +/−20 cm of error, the MVD as described would be 20.2 m.

The drone would either lower itself or lower the tether via a winch or other method by the calculated MVD, and then lift tether. The drone can either self-align to the latch, or it can use an alignment jig. As the drone lifts the tether (again, either by flying higher or by using a winch) first, any slack in the tether will be lifted, and then the package will be lifted while engaging the latch. A camera can be used to confirm attachment of the package.

In the example above, there could be as much as 40 cm of slack in the given in the tether.

For the disengagement, the MVD is calculated as the maximum vertical distance from the second Upper Vertical Limit plus the height of the pins of the hook relative to the bottom of the package. Again, the maximum amount of error must be added to ensure disengagement.

The drone would lower by this MVD as described in the Engagement method. It would then lift the tether, and after the slack has been taken up, it will release the package. A camera can be used to confirm detachment of the package.

The above method has the advantage that is does not require a sensor to detect state of the latch. However, it may be a less reliable engagement and disengagement method. Additionally, it requires the ability to detect and confirm the engagement and disengagement visually and accurately. Moreover, once the package is retracted, the drone cannot confirm it is still holding the package. An accidental drop would go unnoticed. Furthermore, allowing slack in the tether could tangle with some component and lead to a failure, and this method is likely slower than using a sensor to detect engagement. For example, the tether must be lifted slowly until it is known that line is taught to prevent jerking. A sensor would allow for minimal slack and speed up the pickup and drop off process.

In certain embodiments, a split cone design may be used assist in connecting/disconnecting a drone or other device to the package. In at least one embodiment, a catching structure is used. The catching structure can be formed out of a metal rod (like a coat hanger) to achieve the desired shape. It can be made in many ways, so long as the receiving angle allows the tether to constantly slide to be located above the alignment cone. FIG. 38 illustrates one embodiment of this receiving angle.

The drone, crane, or robot will tether towards the concave of the alignment structure and will then move away in the same direction when it has engaged the package. The slotted cone design (e.g., where the cone does not come apart, but rather has an opening for the tether to pass through on exit) can be used with the alignment structure as well. This method uses a simpler pick-up station, but requires the drone to lift the package in such a way that it does not crash into the cone.

Delivery companies are struggling to find good methods of landing a package in a specific, safe place, due to wind, etc. Using a base station designed for pick-up or drop-off instead could allow for precise drop-off. For home delivery, recipients would have a simple base station (for example, the station with 3 cones to receive the drone legs, or 3 extensions to receive the drone cone. The deliverer can supply guidelines for location of the base station, such as clear view of the sky, clear of trees, cables, and other obstacles, and/or safely away from pets or wildlife. The base station could have visual features for a drone to detect, or some sort of electronic beacon for guidance. A human could help locate the base station remotely on the first or all deliveries. Packages would then be delivered to the exact location the recipient desires, and features in the base station can be included to protect the package until the recipient as retrieved it.

For more advanced home delivery, a base station could be built into a roof or a wall of a house. The base station could open as the drone approaches, so it is otherwise protected from the elements. Once the drone as successful dropped the package of, the base station can close, and also bring the package into the house. It could elevator down, the bottom could pull down and the package could move along a slide. This could be actively or passively automated or done manually by a recipient.

Delivery companies may prefer to deliver to a locker or a separate station where customers can pick up their packages, or where an automated cart can completely delivery. A base station like this would receive the package and place with enough precision to be acted on automatically by another robot. The base station could scan a barcode, image, or electronic signature on the package to identify it and/or its next or final destination, but a computer system could track deliveries across drones and know or expect what package has been placed. Scanning could be done to confirm the correct package is in place.

In one example, the base station could be configured so that the packages is placed directly on a conveyor, which then moves the package away from the base station. It could be dropped into a bin, possibly for later sorting, or it could then be acted on by another robot. Similarly, the base station landing area could have low enough friction with the package the base station could automatically slide the package from the landing position onto a slope where it could slide, or simply onto a flat surface that is clear of the landing station.

In another example, the hook on the package used by the rotating tension latch on the drone could be used again by a robotic arm to initially move the package, or it could be used after the conveyor or slide described above. This arm could place the package into a locker, onto an automated cart, into a bin, or it could be built into an automated cart to transport further.

The rotating tension latch allows for simple, automated pickup and drop off, which allows for additional uses for delivery drones. In one example, provided is a point-to-point delivery method. For extremely fast deliveries from sender to receiver, a drone could pick up the package directly from the sender and transport it to the receiver directly. The sender would likely need a base station for pick up, though an advanced drone with good control could conceivably pick up a package without assistance. The sender would likely need a package or container configured with a hook to engage the latch. Container could be reusable, it could be rigid plastic with a built in or attached hook. It could also be a pre-fabricated cardboard package, either fully assembled, partially assembled, or simply an unfolded cardboard package with separate hooks and instructions for assembly and packaging. It may be advantageous to use specific colors on the packages for contrast. The sender may need to provide information about the package, like weight, size, etc. The base station or the drone could measure the mass before pick-up or after latch engagement.

When the drone reaches the base station for pick-up, it can use a camera to ensure a package is correctly in place before attempting pickup. The base station would likely need physical guides to ensure the package is placed in the correct location with enough precision for the latch to engage. This method could be used to return items that were delivered (if they were damaged or otherwise unwanted). This could also be used by a delivery company to pick up packages from the sender and bring them to their facility for further delivery.

In at least one embodiment, the method taught herein provides a delivery confirmation. For example, on-board cameras could be used to take pictures of the delivered package for confirmation and to notify the receiver.

A method according to the present disclosure could also be used for Mobile Ground Control and/or Assistive Device for Remote Payload Pickup in Unknown Terrain. The purpose of this design is to ease the process of remote collection of payloads when these payloads must be collected in, among other conditions in which the user lacks information about the conditions at the pickup location, new/unknown terrain, orientations, unknown weather conditions, are of unknown weight or unknown shape etc. Potential applications include the return of packages from homes, collection of lost materials in remote areas, collection of payloads in conditions dangerous to humans and more. The exact location of the payload is not always necessary in order to collect the payload. The scouts and collectors can potentially be vastly different devices with different strengths, weaknesses and associated costs and thus will be able to minimize the weaknesses of each other.

The design involves three major systems interacting together in these unknown conditions. First, the payload to be collected, second the "scout" or "scouts", a drone(s) or other device(s) that travel(s) to the pickup location prior to the arrival of the third system the "collector" or "collectors", which is/are the device(s) that will ultimately collect the payload. Scouts and collectors could both be equipped with sensors and control systems that allow them to navigate to the location of the payload. Scouts may also have components that allow them to reposition the payload prior to the arrival of the collector, which could use information from the scout, including live feedback from sensors on the scout, which can serve as a ground control station, to collect the payload.

The process of this system's functioning is outlined briefly below. This process can be conducted autonomously, with manual assistance/control or a combination of such. Payload collection request submitted with location information. Scouts and Collectors travel/are transported to payload. These may be scrambled from different positions, controlled autonomously or manually and a combination of such. The number and type of scouts and collectors could depend on the area being surveyed, the payload to be collected and other information. The scouts and collectors may transport themselves the entire distance or they may be transported by another subsystem, such as a helicopter, truck etc. or may arrive at the site via a combination of such.

In one embodiment, the scouts arrive at payload. The scout(s) will first search for and identify the payload, if the location is unknown. Scouts can send information on site to collectors. The collectors could follow the optimum path to the pickup site based on information sent by the scouts. Then, the Scouts can prepare pickup site for collectors. Prior to the arrive of the collectors the scouts may make adjustments to the site and payload to make collection easier, such as clearing debris, repositioning the payload, affixing new means of collecting the payload to the payload and more. This will not always be necessary. Thereafter, the collectors arrive at payload. The collectors will use information relayed by the scouts to travel to the location of the payload as efficiently as possible. The scouts may then assist with collector collection of payload. Scouts may remain at the site after the arrival of the collector to relay live information such as relative position of the payload and collector to the collector in order to assist with the pickup process. They may also remain to actively assist with the pickup via use of onboard actuators or other components. With this accomplished, the collector may collect the payload. With the assistance of the scouts and any onboard sensors the collector successfully collects the payload. Finally, the Collectors and Scouts may return with payload. For example, after securing the payload the collectors and scouts travel to their planned final destinations.

In at least one embodiment, the scouts may continue to provide information such as wind speed, objects in the way of the collector, other moving objects, weather information and more, for concurrent or later use.

Turning to FIGS. 39 and 40, illustrated is one embodiment of a split cone design 3900 designed, manufactured and operated according to one or more embodiments of the disclosure. The split cone design, in at least one embodiment, is composed of a catching structure (shown here built out of PVC pipe and fittings) to catch a tether with the hook attached to it, two halves of a split alignment cone on hinges, and a baseboard that everything sits on. The catching structure is used as a barrier to catch and align the tether so that the lifter is held directly above the center of the split cones. The drone, crane, or robot would move the tether into the concave of the catching structure and continue moving so that the latch is positioned above the alignment cone. As the tether is lowered, the lifter will be guided down into the split cones. As the tether continues to lower, the lifter will slide through the cones and onto the hook that is attached to the package. Once fully lowered, the tether will then be pulled back upwards and the cone halves will pivot on their hinges to allow the package to be lifted out and away. This allows for a drone with a tether and a lifter attached to it to easily pick up a package without the need for high precision. The drone, crane, or robot can simply use GPS coordinates to locate, attach, and pick up a package.

The present disclosure has recognized that Jamming and Peak Sticking are the most likely reasons for Engagement Failure. Once the Pins have vertically passed the Peaks and begun to urge rotation, failures would require outside forces to disrupt the natural motion of the Pins through the cam surfaces. Jamming and Peak Sticking can also lead to Topping Out, and since simple Engagement Sensors could be falsely triggered in those events, the system could lift away without Engaging the Hook. This would require a repeated attempt to Engage, or it could lead to further issues.

Rotational Alignment is ideally allowed to be random between a given Hook and Latch, meaning frequency of Engagement Failures will depend on the range of Rotational Alignment angles that will lead to Jamming and Peak Sticking given an allowable Radial and Angular Misalignment.

It should be noted that Jamming is a major concern with Rotating Tension Latch systems with only 2 Pins and contour sets. Very slight Radial Misalignment and close Rotational Alignment may lead to Jamming. Often, adding additional force to the Latch will allow a 3 or more Pinned system to correct itself though tilting and small deformations in the pins. However, for 2 Pinned systems, such additional force to the Latch will not correct itself, and in fact can lead to damage. In at least one embodiment, the pins capable of deforming even 0.25 degrees from their original position when experiencing a load of 0.5 Newtons or more could prevent sticking.

By using at least one Offset Peak, you can prevent jamming, even when only two Pins and contour sets are used For example, the Offset Peak may be minimally offset (e.g., where the different vertical distances differ from about 1% to about 5% of the Standard Contour Height), substantially offset (e.g., where the different vertical distances differ from about 5% to about 30% of the Standard Contour Height), or extremely substantially offset (e.g., where the different vertical distances differ by greater than 30% of the Standard Contour Height). When a Pin interacts with the First Peak, it will urge rotation. If the First Peak is offset enough from the next Peak, the rotation will move the remaining Pins with respect to their Peaks to the correct side such that Jamming will be prevented.

FIGS. 41A and 41B illustrate Offset Peak Geometry Drawings, for example to show the geometry of how offset peaks can be configured to prevent Jamming. The contour 4100 of FIGS. 41A and 41B includes an upper portion 4110 and a lower portion 4150. Further to the embodiment of FIGS. 41A and 41B, the lower portion 4150 may include a first lower portion 4150*a* and a second lower portion 4150*b*. In the illustrated embodiment, the upper portion 4110 and the lower portion 4150 cooperate to form at least first and second channels. Each of the first and second channels, in accordance with one embodiment, include in order a first upwardly sloping path 4120 defined by a respective first upwardly slanting guide surface 4125 (and optional first upper limit surface [A]) of the upper portion 4110, a first downwardly sloping path 4160 defined by a respective first downwardly slanting guide surface 4165 and a first lower limit surface [B] of a respective lower portion 4150*a*, a second upwardly sloping path 4130 defined by a respective second upwardly slanting guide surface 4135 (and optional first upper limit surface [C]) of the upper portion 3710. FIG. 41C illustrates the contour 4100 of FIG. 41B, but with first tangent lines 4154*a*, 4155*a* of the two first opposing surfaces 4152*a*, 4153*a* angled relative to one another, and tangent lines 4154*b*, 4155*b* of the two second opposing surfaces 4152*b*, 4153*b*, are angled relative to one another.

In at least one embodiment, the first lower portion 4150*a* has a first upper most point 4151*a* (e.g., which also forms a first upper most edge coming out of the page) located proximate the upper portion 4110 and two first opposing surfaces 4152*a*, 4153*a*, wherein the two first opposing surfaces 4152*a*, 4153*a* are angled relative to one another or wherein first tangent lines 4154*a*, 4155*a* of the two first opposing surfaces 4152*a*, 4153*a* are angled relative to one another, the two first opposing surfaces 4152*a*, 4153*a* defining a first lower most point (e.g., first leading peak 4170*a*, which also forms a first lower most edge coming out of the page) located therebetween and located distal the upper portion 4110. In at least one embodiment, the second lower portion 4150*b* has a second upper most point 4151*b* (e.g., which also forms a second upper most edge coming out of the page) located proximate the upper portion 4110 and two second opposing surfaces 4152*b*, 4153*b*, wherein the two second opposing surfaces 4152*b*, 4153*b*, are angled relative to one another or wherein second tangent lines 4154*b*, 4155*b* of the two second opposing surfaces 4152*b*, 4153*b*, are angled relative to one another, the two second opposing surfaces 4152*b*, 4153*b*, defining a second lower most point (e.g., second leading peak 4170*b*, which also forms a second lower most edge coming out of the page) located therebetween and located distal the upper portion 4110. In the illustrated embodiment, the first lower most point (e.g., first leading peak 4170*a* and first lower most edge) and the second lower most point (e.g., second leading peak 4170*b* and second lower most edge) are opposite the first lower limit [B]. In at least one embodiment, the first lower most point (e.g., first leading peak 4170*a* and first lower most edge) is axially offset from the second lower most point (e.g., second leading peak 4170*b* and second lower most edge) by a peak offset distance (D). In at least one embodiment, a standard contour height (SCH) exists between the second lower most point (e.g., second leading peak 4170*b* and second lower most edge) and the first lower limit surfaces [B] of the first and second lower portions 4150*a*, 4150*b* and an offset contour height (OCH) exists between the first lower most point (e.g., first leading peak 4170*a* and first lower most edge) and the first limit surfaces [B] of the first and second lower portions 4150*a*, 4150*b*. In at least one embodiment, the offset contour height (OCH) is at least 1% greater than the standard contour height (SCH). In at least one other embodiment, the offset contour height (OCH) is at least 5% greater than the standard contour height (SCH). In yet at least one other embodiment, the offset contour height (OCH) is at least 30% greater than the standard contour height (SCH). As further understood by FIGS. 41A and 41B, the first and second channels are configured to each receive one of two pins of a related hook member and cause the latch member to rotate relative to the hook member, wherein the latch member and the hook member are configured to alternate between latched and unlatched configurations as the latch member reciprocates substantially along the central axis relative to the hook member, the latch member and the hook member configured to temporarily engage one another when latched. As further understood by FIGS. 41A and 41B, the peak offset distance (D) is configured to prevent the two pins from simultaneously encountering respective ones of the first lower most point and the second lower most point at a same time to prevent a jamming between the two pins and the first and second lower portions."

The motion of the pin would be to first fall to the first upper vertical limit [A] (e.g., if it existed), as the hook engages the latch. Then, as the drone lifts up, the pins would reach the first lower vertical limit [B] and lift the package. This is the same as the standard configuration. However, with a second locking contour in place, when the hook is pushed upwards with respect to the latch (either by landing or through some error or turbulence, the pin would go towards the second upper vertical limit [C] (e.g., if it existed), and then down to the second lower vertical limit [D]. It is also possible that in such an error or turbulence, the pin could fall back to the first lower vertical limit [B], in which case the package is still retained safely. Finally, in the case of the double lock, the pin would move towards the third upper vertical limit [E] and then release.

FIGS. 42A and 42B illustrate Offset Peak with Changing Slope contour 4200, showing how one (or both) of the surfaces leading to the Offset Peak can change slope. It shows how by having a shallower slope leading to Point A, the Peak Offset can be reduced. The slopes do not need to change abruptly, as shown, but can change gradually. As shown in FIG. 42, the contour may have a height offset required for maximum tilt (MT), a height offset required for rotational deviation (RD) and a maximum rotational deviation (MRD). Each of the values may be calculated based upon the typical angular separation between the contours, which in a two-pin system would be about 180 degrees. In the embodiment of FIG. 42, the typical angular separation is set forth with lines 4210 and 4220.

Offset Peaks can also help prevent Engagement Failures due to Peak Sticking. Because only a single Pin will stick on the First Peak, the latch with tilt with respect to the hook. If a Switch Array is configured so that it is not fully engaged if the latch is tilted more than the Maximum Detection Tilt, the system will continue to move the Latch down. Additional downward force during Peak Sticking on only one Pin leads to it snapping to one direction and continuing natural motion of the mechanism. In order for Offset peaks to avoid falsely triggering the Engagement Sensor, the angle of tilt the Latch would need to touch the First Peak and the next Peak must be greater than the Maximum Detection Tilt, but less than the Maximum Latch Tilt.

The Offset Peak does not need to be equally rotationally spaced from the other peaks. It could be beneficial to maintain equal slopes on either side of the offset peak, and it may also be beneficial to bias the First Peak to have one slope much steeper than another. The importance of the Offset Peak geometry is that A' be vertically aligned or to the right of (as shown in the drawings) of the next Peak, even in Worst Case Hook Offset and Maximum Tilt. Note that the Pins/Hook can be offset to the other side of the Peaks and make contact with the shorter surface leading to the Peak.

Note that calculations of the Worst Case Hook Offset should and Maximum Tilt should accommodate for deviations in geometry of the Hook, Latch, and Bearing. For example, Worst Case Hook Offset should take into account the largest value possible for LCD and lowest value HCD given manufacturing tolerances. Maximum Tilt will also be affected by manufacturing tolerances.

The shape of the First Peak does not need to be similar to the others. The First Peak must simply be configured to engage with a Pin before the remaining Peaks. Since Offset Peaks can prevent Jamming and dramatically limit Peak Sticking, a 2 Hook system is viable with Offset Peaks. FIG. 43 illustrates one example of Jamming and Peak Sticking, as described above, for a three pin hook. FIG. 44 illustrates yet another example of possible Jamming or Peak Sticking, as might be found in a two pin hook.

In at least one embodiment, the present disclosure employs deformable pins. While the Pins are naturally deformable to some degree, especially if they are made of plastic, using pins that are configured to deform (e.g., intentionally deform) as they engage a Peak can be used to prevent sticking, but still support the natural motion of the system.

Turning to FIG. 45, illustrated is one embodiment of pins according to the disclosure. One way to add this ability to deform is to add thin flaps that extend upwards from the Pins. These flaps can be added to the Hook. For example, a strip of tape wrapped around the pins is very effective. The flaps could also be manufactured as part of the Pins. For example, they could be molded as part of a plastic Hook. As long as these flaps are allowed to deform relatively easily, they will prevent Peak Sticking. In one embodiment, the Flaps come to a relatively sharp edge.

These flaps can do two things to prevent Peak Sticking. First, if the Rotational Alignment is very close to zero and a flap hits the very edge of a Peak, it will deform, and either (e.g., immediately) urge rotation to one direction or the other, or it will continue to deform and then snap the latch to rotate after further compression. The flap could also simply contact the Peak just on one side of the very edge, thus (e.g., immediately) supporting rotation, where, without the flap, the Pin might have gotten stuck.

While sharp, rigid Pins can help with Peak Sticking, they may not be as effective, particularly with larger Radial Offsets. The deformable flap will help more when the contacting edge of the Pin and the Peak are not aligned and "cross" each other.

It should be noted that the Peaks could also have deformable portions, or only the Peaks could be deformable. In fact, only one Peak would need a deformable Peak to engage the Pin, so long as it engages before the other Peaks/Pins. However, because the Latch will likely be reusable in most applications, this is not as ideal.

Note: Only one Pin needs a deformable portion, but if such Pins will be used in conjunction with Offset Peaks, all Pins might have deformable portions.

The deformable flaps do not need to be pointing straight up. In fact, biasing them to one side can help urge rotation more easily. More importantly, biasing them such that in worst case Radial Misalignment the flaps begin rotation before the more rigid portions of the Pins (or Peaks) engage with the Peaks (or Pins), Jamming can be avoided, even without Offset Peaks.

Deformable Pins, either in combination with Offset Peaks and/or biased flaps, further increases the engagement success rate of the system, particularly with a 2 Pinned system. This could be extremely valuable, which will be described below.

As stated previously, Jamming and Peak Sticking may make a 2 Pinned Rotating Latch System unreliable because they will occasionally have Engagement Failures. However, Offset Peaks and Deformable pins provide an opportunity to use 2 Pinned Systems with high reliability.

2 Pinned Systems allow for a smaller latch with the similar performance. The same Latch contour geometry can be used on a latch with for example two-thirds of the diameter. This also means the Hook can be similarly smaller, which reduces material needs and manufacturing cost.

Additionally, quite different geometries can be used. In at least one embodiment, a Flat Hook is used, as shown in FIG. 45. A 2 Pinned Hook can be less three-dimensional. It can be manufactured as a flat part, which makes it cheaper, specifically from a tooling standpoint. It could even be stamped, punched, routed, laser-cut, plasma cut, or otherwise manufactured in a more two or two-and-a-half dimensional fabrication method.

A Flat Hook can also be attached to a cardboard (or similar) package in more ways than a Hook with 3 or more Pins. For example, it could be slipped through a slot if it has an anchor on one end, and maybe a snapping feature on the opposite side to prevent getting pushed back into the package. It could also be attached at the seam of a standard cardboard package, or on an edge. It could be mostly recessed within the package, with a tab or hole for it to be easily pulled out.

A Flat Hook can also support some bending in the hook, either through its body, its anchor point to the package, or through a living hinge in the Hook. This allows some level of center-of-mass correction.

A Flat Hook could also be made of the same material as the rest of the package. If the package is made of cardboard, an additional flap could be added and folded upwards to act as a Flat Hook. If needed, this flap could be epoxied or otherwise strengthened. Plastic, folded packages, such as retail packages that hang from hooks in stores can form hooks similarly that engage with a Latch. This would allow a retail package to be directly attached to a Latch.

A Flat Hook also allows for better packing of all packages. Depending on where the Hook is located, packages can still be stacked and pushed together.

A Flat Hook can easily be stapled, glued, or otherwise attached to a closed paper (or other material) bag. This would be specifically beneficial for grocery delivery. Groceries could be packed into a standard bag, stapled or otherwise fixed shut, along with a simple, Flat Hook.

A drawback of a 2 Pinned System is that when a Payload is lifted, the hook can still Swing. There are a few ways to prevent or limit swinging. A spring loaded contact can be used between either the Latch and the Hook or the Drone (or other robot/operator) and the Payload to add stability. The Pins could be made to be longer, and the Lower Vertical Limit could be made to be a tighter channel that prevents rotation within the channel, thus limiting Swinging.

Turning to FIG. 46, illustrated is an alternative embodiment of a three pin hook.

Additionally, the Hook could be configured to receive an alignment post (different from the defined Pins that extend radially from the Hook) that extends axially down from the latch. The Hook could have an axial hole in the middle that could be counter sunk or chamfered to allow for some Radial Misalignment. As it engages with the latch, it would receive the alignment post. The alignment post should be long enough that it is still sufficiently engaged with the Hook that it will prevent or sufficiently limit swinging. It should also be short enough that the Hook is sufficiently aligned within the Latch before it engages with the alignment post.

It should be noted that the alignment post could be on the hook and the receiving hole could be on the latch, but this is not as beneficial because it would make the geometries larger than necessary.

In yet another embodiment, even pins are used. A latch could have four or more, even numbered contour sets, so that it can engage with a 2 Pinned Hook, and also, a four or more Pinned Hook. This could be beneficial if a certain Payload needs additional stability and are therefore, fitted with a four or more Pinned Hook, while other Payloads do not require as much stability and can be fitted with a 2 Pinned Hook. So long as a set of contours is rotationally spaced approximately 180 degrees apart, a 2 Pinned Hook should be able to engage. In order to use Offset Peaks effectively, every Peak could be progressively offset. Or, Peaks opposite each other could be offset from each other. Even more reliability can be added by having one pair have a Peak that is offset higher than the rest.

While complex sensor systems can be used to detect Engagement and Disengagement, such as cameras with image recognition or proximity sensors, in one embodiment it is preferable to use a simple system that is economical, robust, and easy to implement, like a Switch or Switch Array.

A single Switch can be used, but a Switch Array has the benefit of helping reduce Engagement Failures by increasing the Maximum Detection Tilt. The Maximum Detection Tilt can be easily calculated from the Switch Depression Distance, Switch Activation Distance, and their spacing. An array also allows the Switches to be the part that the Inner Bearing presses on when it is Topping Out. Three Switches is the ideal amount because it is the lowest number that allows a stable Topping Out surface.

Other kinds of Switches, like limit switches, can be used in conjunction with a separate surface that stops the Inner Bearing when it is Topping Out. This could be beneficially because it would prevent excessive force on the Switches.

Very small/light packages may not be able to trigger the Package Detection Sensor, so a camera or other sensor could be used to visually confirm the presence of the Payload.

A Switch or sensor could be placed inside the latch. If it could detect when the pins reach the Upper Vertical Limits, it could help prevent Engagement Errors, specifically related to Peak Sticking. A sensor within the Latch will not falsely suggest the Pins had reached the Upper Vertical Limit on Peak Sticking.

Additional Landing Concepts are also contemplated herein, as shown in FIGS. 47A through 47D. Poles that are received by apertures on the Drone may be used to aid in landing and aligning to the Hook. A single Pole could be used to insert into a single aperture. The drone could then use this pivot point to align to the Hook more easily than without its support. This could be particularly helpful if the Drone had a horizontally oriented propeller, like a Copter/Plane hybrid.

The pole could also not be entirely round. It could be thin and round at the end, and it could progressively increase in diameter and/or change shape to guide rotation along the pivot. This could further help alignment to the Latch. The aperture would need a similar shape to mate to the pole and urge rotation.

The apertures on the Drone could also not be entirely round. It could have varying receiving slopes. Since drones might be better at positional alignment than rotational alignment, an aperture with increased area along the drone's yaw axis could improve reliability while optimizing its size.

A Release Assistant Exit Slope is also contemplated herein. A toothed Bearing prevents unwanted spinning of a Payload while it is being carried by the Latch. However, these teeth can prevent the Latch from spinning as the Pins progress through the contours. A solution is to lift the Inner Bearing with a spring and a low-friction bearing, such that sufficient force to prevent the teeth on the Bearing from engaging in one or both of these situations: when the Latch has dropped a Payload and is releasing it and when the Latch is lifting a Payload as the Pin moves from the First Upper Vertical Limit and the Bottom Vertical Limit.

In the first case, the Pin needs to move from the Second Upper Vertical Limit to the exit the latch contours. It will (without outside forces supporting rotation) slide along the Exit Surface. If the Latch is not able to rotate, it will require that the Payload lift and spin out, which could be problematic for some delivery situations.

In the second case, the Pin needs to move from the First Upper Vertical Limit to the Second Upper Vertical Limit. It will (without outside forces supporting rotation) slide along the Catch Surface to reach the Lower Vertical Limit. If the latch is not able to rate, it will require that the payload rotate as it is lifted because it will lift, and then fall further as it leaves the ground and is able to rotate. This could be problematic depending on the configuration of the pickup station.

In order for the Latch to be able to rotate without requiring the Payload to rotate, the slope of the Exit Surface and the Catch Surface (θ) as well as the static friction coefficients of the Pin to Surface ($\mu_{Pin}$) interaction and the Bearing ($\mu_{Bearing}$). The following must be true to urge rotation of the latch:

$$\theta > \tan^{-1}\left(\frac{\mu_{Bearing} + \mu_{Pin}}{1 - \mu_{Bearing} * \mu_{Pin}}\right)$$

A slope (θ) of 90 degrees would be a fully vertical slope, whereas an angle of 0 would be fully horizontal.

The force required of a spring system to suspend the Inner Bearing from engaging with the teeth on the Outer Bearing is largely dependent on the desired upward acceleration of the Drone.

Teeth can be replaced with a high-friction surface. Also, the Catch Surface and Exit Surface do not need to have a constant slope. The slope defined above is what is required to begin motion.

While the term "Pin" implies a round profile, the shape of the Pin does not have to be round. In fact, it might be beneficial to use pointed ends. The slopes could match or be close to the slopes of the surfaces on the Latch. The Vertical Limits on the latch can be configured to receive these shapes. The drawings show the Lower Vertical Limit as round, and the Upper Vertical Limits as pointed, but they can be either shape depending on the shape of the pin.

The face or faces that touch are configured to touch the HCD can be rounded as shown in Other Possible Variations to Pin and Hook Shapes. This helps prevent the edges of the pins from contacting the HCD. These edges could also be radiused to accomplish the same goal. The pins could also have a radius where the Pins meets the HRD surface(s) of the Hook to increase mechanical strength. It could be beneficial to break the edges of the latch counters along the LRD so to accommodate for this radius. The Radius or chamfer that breaks the edges described should be greater than the radius added to the Pin/HRD interface.

The Hooks do not need to have a vertical extension of the HRD above the Pins as shown in previous embodiments. The Pins can help align the Hook and the Latch by contacting the LCD surface(s) of the Latch. Removing the vertical extension described above reduces the need for chamfering the points of the Peaks.

The maximum angle of the Bell with respect to the central axis of the Latch should be such that even at Maximum Tilt, the Pin can slide along the Bells surface towards the center of the Latch. This can either shift the Latch within the Bearing, shift the Payload, tilt the Payload, tilt the Hook, or any combination of the four, to align the Latch and the Hook. The maximum angle of the Bell can be approximated by this equation ($\mu_{Bell \& Pin}$ is the coefficient of static friction between the Bell surface and the Pins: Maximum Angle of Bell=$\tan^{-1} \mu_{Bell \& Pin}$-Maximum Tilt Turning now to FIG. 48A, illustrated is an alternative embodiment of a latch assembly designed, manufactured and operated according to one or more embodiments of the disclosure. The latch assembly illustrated in FIG. 48A, without limitation, has the features illustrated therein.

In at least one embodiment, as shown in FIG. 48B, the rotating latch assembly does not include upper limits for each of the channels, and thus may include a pathway instead. In at least one embodiment, the hook pins do not need to reach a first upper limit for the latch to operate. The latch can be moved to specific vertical locations with position control so that the only necessary vertical limit is the bottom vertical limit on which the pins reset when the payload is being carried.

This could be particularly helpful when the latch is being operated using position control because it limits the possibility of putting excessive downward force on the pins if the position control is not sufficiently accurate.

One configuration shows a pathway through which the pins can pass and there is no vertical limit at all. This pathway precedes the lower vertical limit. As the latch engages the hook, the pins can pass through this pathway and move freely upwards. When the latch is pulled back upwards, it will be guided by slopes on the top surfaces, and the pins will engage with the bottom vertical limit. When the latch is pushed back downwards, the pins will be guided towards and open area with an upper vertical limiting surface, but it does not need to reach that surface to successfully disengage. Once the latch is lifted upwards again, the pins will escape the latch and the hook will be released.

An alternative configuration could have a limiting surface that precedes the bottom vertical limit, and a pathway that the pins can freely pass through that succeeds the bottom vertical limit. Or, there can be limiting surfaces on both, or pathways that allow the pins to pass freely for both. The benefit of only having one channel is that the pins will predictably re-enter the same relative position no matter how far the latch descends past the pins. If the pins rotate to any position relative to the channel, they will be guided back towards the channel as the latch is lifted. If both vertical areas have pathways with no vertical limit, the pins could reenter in a different relative pathway, and the latch could behave unpredictably. The configuration shown in FIG. 48 is that of a male latch member, but the same contours can be used in a female latch configuration.

Turning to FIGS. 49 through 51, illustrated is one embodiment of a hook assembly having an axial alignment hole (e.g., anti-tilt hole) therein, manufactured and operated according to one or more embodiments of the disclosure. FIG. 49 illustrates the hook assembly having the axial alignment hole, apart from the package or latch assembly. FIG. 50 illustrates the hook assembly positioned within a hole in the package, but having not yet been rotated. FIG. 51 illustrates the hook assembly rotated within the package, and thus in an engaged orientation.

In the illustrated embodiments of FIGS. 49 through 51, the hook assembly has axial alignment hole to receive a possible alignment post (e.g., anti-tilt post). In at least one embodiment, the axial alignment hole is positioned substantially along the central axis of the core of the hook, the axial alignment hole configured to engage with an axial alignment post in a related latch member. It has optional strengthening flaps along where the pins are. The base holds the package by squeezing the cardboard (or other material) between the retention tabs and the base. The retention tabs are approximately the same profile (when looking down on the hook) as the pins, so that they fit snugly into the slots of the cutout. The hook is inserted into the slot until the base contacts the cardboard. Then it is rotated 90 degrees. Small chamfers/ramps on the retention tabs allow for the rotation to start easily. The anti-rotation tabs will squeeze the cardboard as they are rotated in place, but once they reach the slot portion, they will resist further rotation. This makes assembly easy, and it prevents the hook for rotating out of the slot. The configuration shown requires slight deformation of the package material for this to work properly. An alternative configuration could allow slight deflection in the plastic.

Turning to FIGS. 52 through 54, illustrated is one embodiment of a rotating latch assembly having an anti-tilt post configured to engage with an anti-tilt opening in the hook assembly, manufactured and operated according to one or more embodiments of the disclosure. FIG. 49 illustrates the rotating latch assembly having the anti-tilt post, apart from the hook assembly. FIG. 50 illustrates the rotating tension latch assembly topped out, such that the latch assembly cannot move any further toward the hook assembly (e.g., because of the pins in the hook assembly engage the vertical upper limits in the latch assembly). FIG. 51 illustrates the rotating tension latch assembly in an engaged orientation, such as might be the instance if the rotating tension latch assembly and the hook assembly were being lifted into the air.

In at least one embodiment, a soft release may be used to disengage the rotating tension latch assembly from the hook assembly. When a sufficiently light payload is released from the latch, it can be lifted off of it's resting as the pins rotate out of the latch. This rotational movement, along with any non-vertical movement of the latch during release, can lead to inaccuracies in the final placement of the payload. This can complicate how the payload is picked up by another robot. If the payload can be accurately placed in a known position, the same or different robot can pick it up without relearning its position.

A solution is for the robot to lift the latch only high enough to release the pins and either slow down or fully stop for a short time so the payload can be released from a very short distance above the resting surface. This waiting time can be determined and optimized through experimentation or analysis, or a sensor can be used to detect the release of the package before continuing to move. The latch can then continue moving up at whatever speed is desired, and the package will be accurately placed.

In at least one other embodiment of the disclosure, actuator locking may be employed. Since the latch system does not require fine precision in vertical movement for reliable operation, linear actuators that lift and drop packages do not need to be as precise as traditional lead-screw driven actuators. Actuators can be driven by other methods, such as timing belts. These can be less expensive and much faster.

A shaft can be attached to a timing belt (or other belt drive), and held radially with a bearing. A latch can be attached to the bottom of the shaft. The timing belt can be driven by a motor, this moving the latch up and down. The system can use limit switches and sensors associated with the latch to detect its general position. An encoder or indicator of the position can be used to move the latch to relatively specific positions.

One disadvantage of a belt driven actuator is that the motors must stay engaged to hold the package. This can waste power, which could be especially disadvantageous if it is being used by a battery-operated robot. A solution for this is to use a latch and hook system affixed to the top of the drive shaft. When the shaft rises to a top limit (probably determined by a limit switch or with position control or both), it engages the latch. When it descends slightly, the pins will engage the bottom vertical limit of the latch. The motors can release, and the payload will be held by the pins, thus saving power. To release the payload, the actuator lifts back up to release the top latch, and then descends to release the package.

Aspects disclosed herein include:

A. A latch member, the latch member including: 1) an upper portion and a lower portion extending from one or more surfaces and defining a central axis, the lower portion including first and second lower portions circumferentially spaced from one another and axially spaced from the upper portion, guide and limit surfaces of the first and second lower portions facing respective guide surfaces of the upper portion that cooperate to form first and second channels, each of the first and second channels having in order a first upwardly sloping path defined by a respective first upwardly slanting guide surface of the upper portion, a first downwardly sloping path defined by a respective first downwardly slanting guide surface and a first lower limit surface of a respective lower portion, and a second upwardly sloping path defined by a respective second upwardly slanting guide surface of the upper portion, wherein the first and second lower portions have respective first and second leading peaks opposite the first lower limit, the first leading peak axially offset from the second leading peak by a peak offset distance (D); and 2) wherein the first and second channels are configured to each receive one of two pins of a related hook member and cause the latch member to rotate relative to the hook member, wherein the latch member and the hook member are configured to alternate between latched and unlatched configurations as the latch member reciprocates substantially along the central axis relative to the hook member, the latch member and the hook member configured to temporarily engage one another when latched.

B. A hook member, the hook member including: 1) a core having a central axis; 2) an axial alignment hole positioned substantially along the central axis, the axial alignment hole configured to engage with an axial alignment post in a related latch member; and 3) two pins extending radially outward from the core, the two pins configured to engage with first and second channels of the related latch member and cause the related latch member to rotate relative to the hook member, wherein the related latch member and the hook member are configured to alternate between latched and unlatched configurations as the hook member reciprocates substantially along the central axis relative to the related latch member, the related latch member and the hook member configured to temporarily engage one another when latched.

C. A pick-and-place system, the pick-and-place system including: 1) a hook member including two pins; and 2) a latch member having an upper portion and a lower portion extending from one or more surfaces and defining a central axis, the lower portion including first and second lower portions circumferentially spaced from one another and axially spaced from the upper portion, guide and limit surfaces of the first and second lower portions facing respective guide surfaces of the upper portion that cooperate to form first and second channels, each of the first and second channels having in order a first upwardly sloping path defined by a respective first upwardly slanting guide surface of the upper portion, a first downwardly sloping path defined by a respective first downwardly slanting guide surface and a first lower limit surface of a respective lower portion, and a second upwardly sloping path defined by a respective second upwardly slanting guide surface of the upper portion, wherein the first and second lower portions have respective first and second leading peaks opposite the first lower limit, the first leading peak axially offset from the second leading peak by a peak offset distance (D), the first and second channels configured to each receive one of the two pins of the hook member and cause the latch member to rotate relative to the hook member, wherein the latch member and the hook member alternate between latched and unlatched configurations as the latch member reciprocates substantially along the central axis relative to the hook member, the latch member and the hook member configured to temporarily engage one another when latched.

Aspects A, B, and C may have one or more of the following additional elements in combination: Element 1: wherein a standard contour height (SCH) exists between the second leading peak and the limit surfaces of the first and second lower portions and an offset contour height (OCH) exists between the first leading peak and the limit surfaces of the first and second lower portions, and further wherein the offset contour height (OCH) is at least 1% greater than the standard contour height (SCH). Element 2: wherein a standard contour height (SCH) exists between the second leading peak and the limit surfaces of the first and second lower portions and an offset contour height (OCH) exists between the first leading peak and the limit surfaces of the first and second lower portions, and further wherein the offset contour height (OCH) is at least 5% greater than the standard contour height (SCH). Element 3: wherein a standard contour height (SCH) exists between the second leading peak and the limit surfaces of the first and second lower portions and an offset contour height (OCH) exists between the first leading peak and the limit surfaces of the first and second lower portions, and further wherein the offset contour height (OCH) is at least 30% greater than the standard contour height (SCH). Element 4: further including an axial alignment post positioned substantially along the central axis, the axial alignment post configured to engage with an axial alignment hole in the related hook member. Element 5: wherein the axial alignment post has a length such that the axial alignment post remains engaged with the axial alignment hole in the related hook member as the latch member and the related hook member alternate between latched and unlatched configurations as the latch member reciprocates substantially along the central axis relative to the related hook member. Element 6: wherein the axial alignment post has a length such that the axial alignment post engages the axial alignment hole after at least one of the two pins of the related hook member has engaged the first or second lower portions. Element 7: wherein the one or more surfaces are an inside surface of an aperture, thereby causing the latch member to be a female latch member. Element 8: further including an axial alignment post positioned substantially along the central axis, the axial alignment post configured to engage with an axial alignment hole in the related hook member. Element 9: wherein the one or more surfaces are an outside surface of a core, thereby causing the latch member to be a male latch member. Element 10: wherein the lower portion includes first, second, and third lower portions circumferentially spaced from one another and axially spaced from the upper portion to form first, second and third channels, and further wherein the first, second and third channels are configured to each receive one of three pins of a related hook member and cause the latch member to rotate relative to the hook member. Element 11: wherein at least one of the two pins is operable to deform to align the at least one of the two pins with one of the first and second channel and prevent peak sticking. Element 12: wherein both of the two pins are operable to deform to align the two pins with the first and second channel and prevent peak sticking. Element 13: further including two or more flaps extending from the core, the two or more flaps operable to deform to align with the first and second channels and prevent peak sticking. Element 14: wherein the two or more flaps are substantially parallel with the central axis. Element 15: wherein the two or more flaps are angled relative to the central axis. Element 16: wherein a standard contour height (SCH) exists between the second leading peak and the limit surfaces of the first and second lower portions and an offset contour height (OCH) exists between the first leading peak and the limit surfaces of the first and second lower portions, and further wherein the offset contour height (OCH) is at least 5% greater than the standard contour height (SCH). Element 17: wherein a standard contour height (SCH) exists between the second leading peak and the limit surfaces of the first and second lower portions and an offset contour height (OCH) exists between the first leading peak and the limit surfaces of the first and second lower portions, and further wherein the offset contour height (OCH) is at least 30% greater than the standard contour height (SCH). Element 18: wherein the latch member is a female latch member and the hook member is a male latch member, and further wherein the two pins extend radially outward from the male latch member. Element 19: wherein the latch member is a male latch member and the hook member is a female latch member, and further wherein the two pins extend radially inward from the female latch member. Element 20: wherein the hook member including three pins, and further wherein the lower portion includes first, second, and third lower portions circumferentially spaced from one another and axially spaced from the upper portion to form first, second and third channels, and further wherein the first, second and third channels are configured to each receive one of the three pins of the hook member and cause the latch member to rotate relative to the hook member.

Those skilled in the art to which this application relates will appreciate that other and further additions, deletions, substitutions, and modifications may be made to the described embodiments.

What is claimed is:

1. A latch member, comprising:
a surface defining a central axis; and
an upper portion and a lower portion extending from the surface, the lower portion including first and second lower portions circumferentially spaced from one another and axially spaced from the upper portion, guide and limit surfaces of the first and second lower portions facing respective guide surfaces of the upper portion that cooperate to form first and second channels, each of the first and second channels having in order a first upwardly sloping path defined by a respective first upwardly slanting guide surface of the upper portion, a first downwardly sloping path defined by a respective first downwardly slanting guide surface of a respective lower portion and a first lower limit surface of the respective lower portion, and a second upwardly sloping path defined by a respective second upwardly slanting guide surface of the upper portion, wherein:
the first lower portion has a first upper most point located proximate the upper portion and two first opposing surfaces, wherein the two first opposing surfaces are angled relative to one another or wherein first tangent lines of the two first opposing surfaces are angled relative to one another, the two first opposing surfaces defining a first lower most point located therebetween and located distal the upper portion;
the second lower portion has a second upper most point located proximate the upper portion and two second opposing surfaces, wherein the two second opposing surfaces are angled relative to one another or wherein second tangent lines of the two second opposing surfaces are angled relative to one another, the two second opposing surfaces defining a second lower most point located therebetween and located distal the upper portion;

the first lowest most point is axially offset from the second lowest most point by a peak offset distance (D);

the first and second channels are configured to each receive one of two pins of a related hook member and cause the latch member to rotate relative to the hook member, wherein the latch member and the hook member are configured to alternate between latched and unlatched configurations as the latch member reciprocates substantially along the central axis relative to the hook member, the latch member and the hook member configured to temporarily engage one another when latched; and the peak offset distance (D) is configured to prevent the two pins from simultaneously encountering respective ones of the first lower most point and the second lower most point at a same time to prevent a jamming between the two pins and the first and second lower portions.

2. The latch member as recited in claim 1, wherein a standard contour height (SCH) exists between the second lowest most point and the limit surfaces of the first and second lower portions and an offset contour height (OCH) exists between the first lowest most point and the limit surfaces of the first and second lower portions, and further wherein the offset contour height (OCH) is at least 1% greater than the standard contour height (SCH).

3. The latch member as recited in claim 1, wherein a standard contour height (SCH) exists between the second lowest most point and the limit surfaces of the first and second lower portions and an offset contour height (OCH) exists between the first lowest most point and the limit surfaces of the first and second lower portions, and further wherein the offset contour height (OCH) is at least 5% greater than the standard contour height (SCH).

4. The latch member as recited in claim 1, wherein a standard contour height (SCH) exists between the second lowest most point and the limit surfaces of the first and second lower portions and an offset contour height (OCH) exists between the first lowest most point and the limit surfaces of the first and second lower portions, and further wherein the offset contour height (OCH) is at least 30% greater than the standard contour height (SCH).

5. The latch member as recited in claim 1, further including an axial alignment post extending from the surface defining the central axis and positioned substantially along the central axis, the axial alignment post configured to engage with an axial alignment hole in the related hook member.

6. The latch member as recited in claim 5, wherein the axial alignment post has a length such that the axial alignment post remains engaged with the axial alignment hole in the related hook member as the latch member and the related hook member alternate between latched and unlatched configurations as the latch member reciprocates substantially along the central axis relative to the related hook member.

7. The latch member as recited in claim 6, wherein the axial alignment post has a length such that the axial alignment post engages the axial alignment hole after at least one of the two pins of the related hook member has engaged the first or second lower portions.

8. The latch member as recited in claim 1, wherein the surface is an inside surface of an aperture, thereby causing the latch member to be a female latch member.

9. The latch member as recited in claim 8, further including an axial alignment post extending from the surface defining the central axis and positioned substantially along the central axis, the axial alignment post configured to engage with an axial alignment hole in the related hook member.

10. The latch member as recited in claim 1, wherein the surface is an outside surface of a core, thereby causing the latch member to be a male latch member.

11. The latch member as recited in claim 1, wherein the lower portion includes first, second, and third lower portions circumferentially spaced from one another and axially spaced from the upper portion to form first, second and third channels, and further wherein the first, second and third channels are configured to each receive one of three pins of a related hook member and cause the latch member to rotate relative to the hook member.

12. The latch member as recited in claim 1, wherein:
the two first opposing surfaces are angled relative to one another; and
the two second opposing surfaces are angled relative to one another.

13. A pick-and-place system, comprising:
a hook member including two pins; and
a latch member comprising a surface defining a central axis, the surface having a latch member having an upper portion and a lower portion extending therefrom, the lower portion including first and second lower portions circumferentially spaced from one another and axially spaced from the upper portion, guide and limit surfaces of the first and second lower portions facing respective guide surfaces of the upper portion that cooperate to form first and second channels, each of the first and second channels having in order a first upwardly sloping path defined by a respective first upwardly slanting guide surface of the upper portion, a first downwardly sloping path defined by a respective first downwardly slanting guide surface of a respective lower portion and a first lower limit surface of the respective lower portion, and a second upwardly sloping path defined by a respective second upwardly slanting guide surface of the upper portion, wherein:

the first lower portion has a first upper most point located proximate the upper portion and two first opposing surfaces, wherein the two first opposing surfaces are angled relative to one another or wherein first tangent lines of the two first opposing surfaces are angled relative to one another, the two first opposing surfaces defining a first lower most point located therebetween and located distal the upper portion;

the second lower portion has a second upper most point located proximate the upper portion and two second opposing surfaces, wherein the two second opposing surfaces are angled relative to one another or wherein second tangent lines of the two second opposing surfaces are angled relative to one another, the two second opposing surfaces defining a second lower most point located therebetween and located distal the upper portion;

the first lowest most point is axially offset from the second lowest most point by a peak offset distance (D);

the first and second channels configured to each receive one of the two pins of the hook member and cause the latch member to rotate relative to the hook member, wherein the latch member and the hook member are configured to alternate between latched and unlatched configurations as the latch member reciprocates substantially along the central axis relative to the hook member, the latch member and the hook member configured to temporarily engage one another when latched; and the peak offset distance (D) is configured to prevent the two pins from simultaneously encountering respective ones of the first lower most point and the second lower most point at a same time to prevent a jamming between the two pins and the first and second lower portions.

14. The pick-and-place system as recited in claim 13, wherein a standard contour height (SCH) exists between the second lowest most point and the limit surfaces of the first and second lower portions and an offset contour height (OCH) exists between the first lowest most point and the limit surfaces of the first and second lower portions, and further wherein the offset contour height (OCH) is at least 5% greater than the standard contour height (SCH).

15. The pick-and-place system as recited in claim 13, wherein a standard contour height (SCH) exists between the second lowest most point and the limit surfaces of the first and second lower portions and an offset contour height (OCH) exists between the first lowest most point and the limit surfaces of the first and second lower portions, and further wherein the offset contour height (OCH) is at least 30% greater than the standard contour height (SCH).

16. The pick-and-place system as recited in claim 13, wherein the latch member is a female latch member and the hook member is a male latch member, and further wherein the two pins extend radially outward from the male latch member.

17. The pick-and-place system as recited in claim 13, wherein the latch member is a male latch member and the hook member is a female latch member, and further wherein the two pins extend radially inward from the female latch member.

18. The pick-and-place system as recited in claim 13, wherein the hook member including three pins, and further wherein the lower portion includes first, second, and third lower portions circumferentially spaced from one another and axially spaced from the upper portion to form first, second and third channels, and further wherein the first, second and third channels are configured to each receive one of the three pins of the hook member and cause the latch member to rotate relative to the hook member.

19. The pick-and-place system as recited in claim 13, wherein:
the two first opposing surfaces are angled relative to one another; and
the two second opposing surfaces are angled relative to one another.

20. A latch member, comprising:
a surface defining a central axis; and
an upper portion and a lower portion extending from the surface, the lower portion including first and second lower portions circumferentially spaced from one another and axially spaced from the upper portion, guide and limit surfaces of the first and second lower portions facing respective guide surfaces of the upper portion that cooperate to form first and second channels, each of the first and second channels having in order a first upwardly sloping path defined by a respective first upwardly slanting guide surface of the upper portion, a first downwardly sloping path defined by a respective first downwardly slanting guide surface of a respective lower portion and a first lower limit surface of the respective lower portion, and a second upwardly sloping path defined by a respective second upwardly slanting guide surface of the upper portion, wherein:
the first lower portion has a first upper most edge located proximate the upper portion and two first opposing surfaces, wherein the two first opposing surfaces are angled relative to one another or wherein first tangent lines of the two first opposing surfaces are angled relative to one another, the two first opposing surfaces defining a first lower most edge located therebetween and located distal the upper portion;
the second lower portion has a second upper most edge located proximate the upper portion and two second opposing surfaces, wherein the two second opposing surfaces are angled relative to one another or wherein second tangent lines of the two second opposing surfaces are angled relative to one another, the two second opposing surfaces defining a second lower most edge located therebetween and located distal the upper portion;
the first lowest most edge is axially offset from the second lowest most edge by a peak offset distance (D);
the first and second channels are configured to each receive one of two pins of a related hook member and cause the latch member to rotate relative to the hook member, wherein the latch member and the hook member are configured to alternate between latched and unlatched configurations as the latch member reciprocates substantially along the central axis relative to the hook member, the latch member and the hook member configured to temporarily engage one another when latched; and
the peak offset distance (D) is configured to prevent the two pins from simultaneously encountering respective ones of the first lower most edge and the second lower most edge at a same time to prevent a jamming between the two pins and the first and second lower portions.

* * * * *